(12) United States Patent
Sun et al.

(10) Patent No.: US 12,189,936 B2
(45) Date of Patent: Jan. 7, 2025

(54) PRIVACY INFORMATION GENERATION METHOD AND TERMINAL DEVICE

(71) Applicant: HUAWEI TECHNOLOGIES CO., LTD., Guangdong (CN)

(72) Inventors: Xiaokang Sun, Lund (SE); Simon Ekstrand, Lund (SE); Zongbo Wang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/311,872

(22) Filed: May 3, 2023

(65) Prior Publication Data
US 2023/0315277 A1 Oct. 5, 2023

Related U.S. Application Data

(63) Continuation of application No. PCT/CN2021/095827, filed on May 25, 2021.

(30) Foreign Application Priority Data

Nov. 5, 2020 (CN) .......................... 202011221289.1

(51) Int. Cl.
G06F 3/048 (2013.01)
G06F 3/04847 (2022.01)
G06F 3/04883 (2022.01)

(52) U.S. Cl.
CPC ...... G06F 3/04847 (2013.01); G06F 3/04883 (2013.01)

(58) Field of Classification Search
CPC .......................... G06F 3/04587; G06F 3/0483
See application file for complete search history.

(56) References Cited

U.S. PATENT DOCUMENTS

| 6,750,883 | B1 | 6/2004 | Parupudi et al. | |
| 8,832,567 | B1 * | 9/2014 | Jing | G06Q 50/01 726/28 |
| 11,212,606 | B1 * | 12/2021 | Oishi | H04R 1/347 |
| 11,493,291 | B2 * | 11/2022 | Koehler | F41A 3/20 |

(Continued)

FOREIGN PATENT DOCUMENTS

| CN | 104581625 A | 4/2015 |
| CN | 106228086 A | 12/2016 |

(Continued)

OTHER PUBLICATIONS

Tiago et al., Model of Location-Sharing-Based Services with Privacy Guarantee, 2014, IEEE, 8 pages. (Year: 2014).*

(Continued)

Primary Examiner — Linh K Pham

(57) ABSTRACT

In a privacy information generation method, a terminal device displays on a display an interactive element of a privacy settings page for a target application. The terminal device responds to a first gesture operation performed by a user on the interactive element of the privacy settings page, and determines a privacy precision for the target application according to the first gesture operation. The terminal device then generates privacy information based on the privacy precision for the target application when the target application requests the privacy information from the terminal device.

16 Claims, 54 Drawing Sheets

(56) References Cited

U.S. PATENT DOCUMENTS

| | | | |
|---|---|---|---|
| 2004/0198386 A1* | 10/2004 | Dupray | G01S 5/02 455/456.1 |
| 2007/0252821 A1* | 11/2007 | Hollemans | G06F 3/0488 345/173 |
| 2008/0046976 A1* | 2/2008 | Zuckerberg | H04L 63/102 726/4 |
| 2009/0070334 A1* | 3/2009 | Callahan | H04L 67/306 707/999.009 |
| 2009/0265319 A1* | 10/2009 | Lehrman | G06F 16/9535 707/999.009 |
| 2009/0265326 A1* | 10/2009 | Lehrman | G06F 16/9535 |
| 2010/0275266 A1* | 10/2010 | Jakobson | G09G 5/00 726/26 |
| 2011/0022307 A1* | 1/2011 | Lee | G01C 21/3664 345/173 |
| 2011/0148796 A1* | 6/2011 | Hollemans | G06F 3/04883 345/173 |
| 2011/0190009 A1* | 8/2011 | Gerber, Jr. | H04W 12/02 455/456.3 |
| 2012/0009897 A1* | 1/2012 | Kasad | H04L 63/107 455/411 |
| 2012/0192247 A1 | 7/2012 | Oliver et al. | |
| 2013/0014279 A1* | 1/2013 | Leland | G06F 21/6245 726/28 |
| 2013/0298248 A1* | 11/2013 | Boldrev | G06F 21/6245 726/26 |
| 2013/0340086 A1* | 12/2013 | Blom | G06F 21/6245 726/26 |
| 2014/0199970 A1* | 7/2014 | Klotz | H04W 4/029 455/411 |
| 2018/0054727 A1* | 2/2018 | Gerber, Jr. | H04L 67/52 |

FOREIGN PATENT DOCUMENTS

| | | |
|---|---|---|
| CN | 110837654 A | 2/2020 |
| CN | 112329060 A | 2/2021 |

OTHER PUBLICATIONS

Merrill et al., Privacy through Uncertainty in Location-Based Services, 2013, IEEE, 6 pages. (Year: 2013).*

Zheng et al., Service Recommendation Middleware Based on Location Privacy Protection in BANET, 2020, IEEE, 16 pages (Year: 2020).*

Moro et al., A System-Level Architecture for Fine-Grained Privacy Control in Location-Based Services, 2016, IEEE, 12 pages (Year: 2016).*

* cited by examiner

Permission manager page

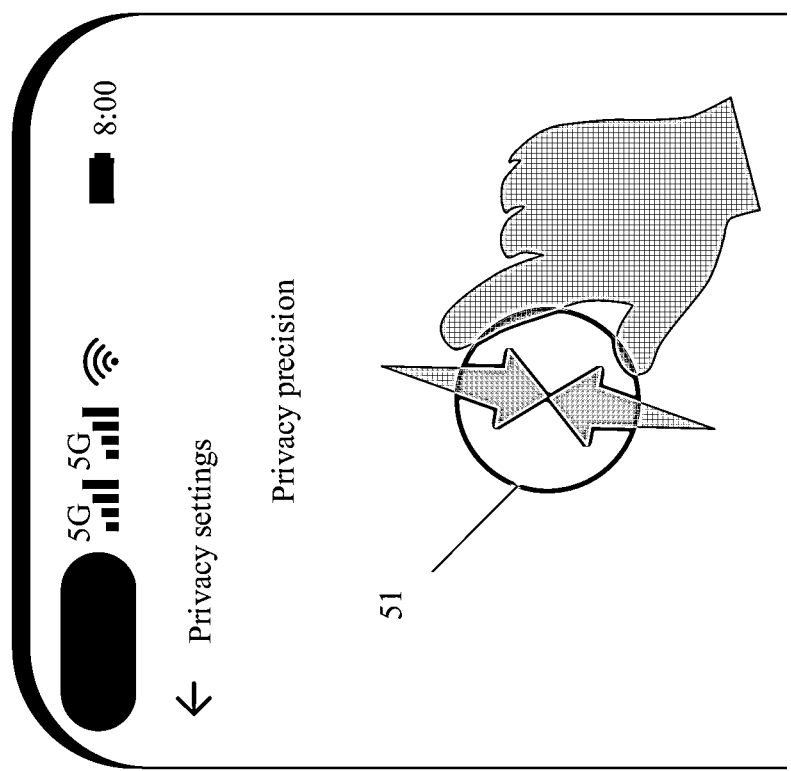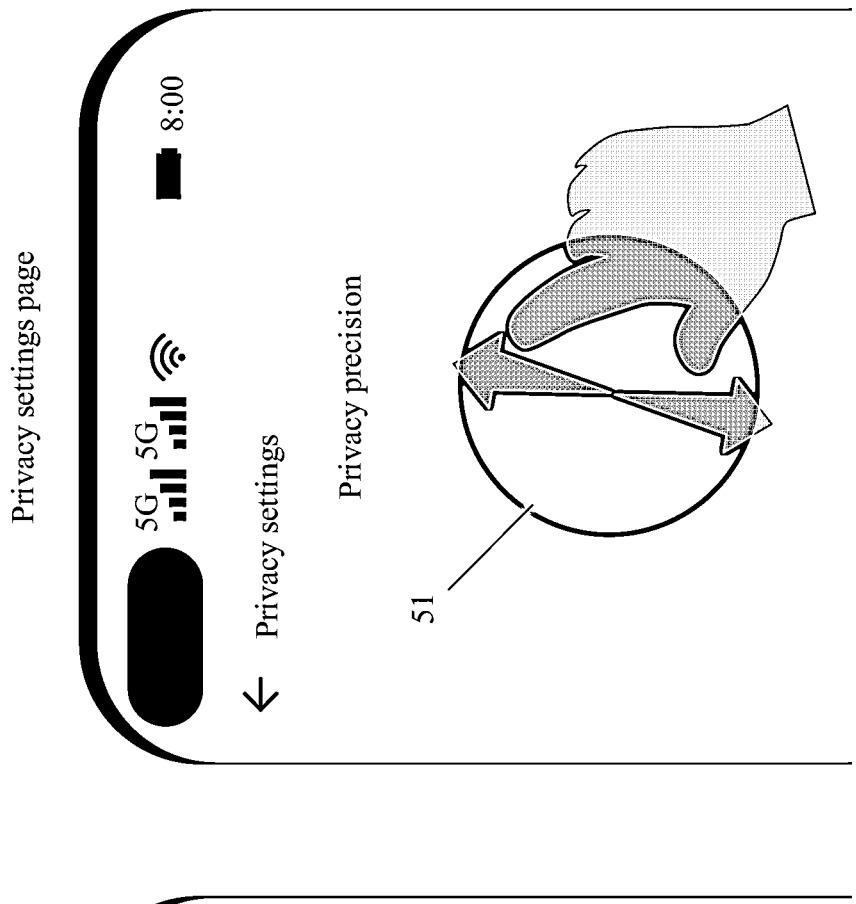
FIG. 8

Location information details page

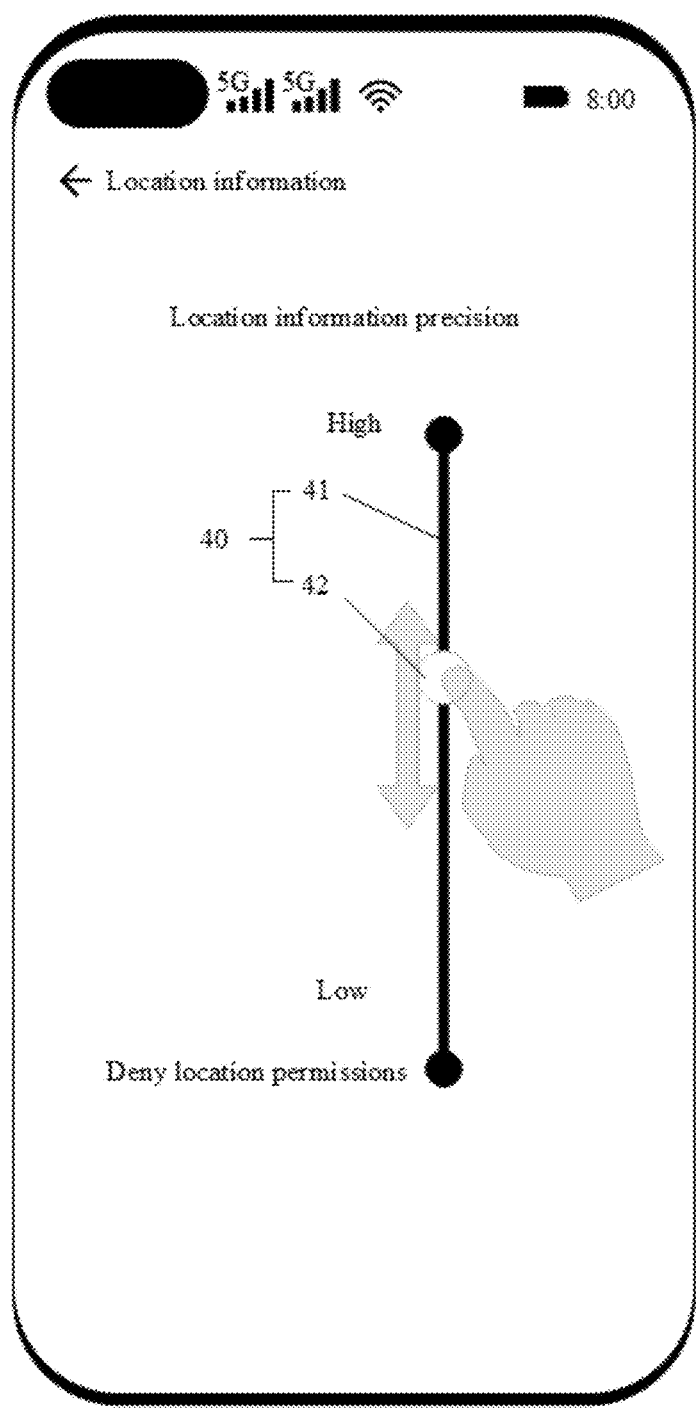

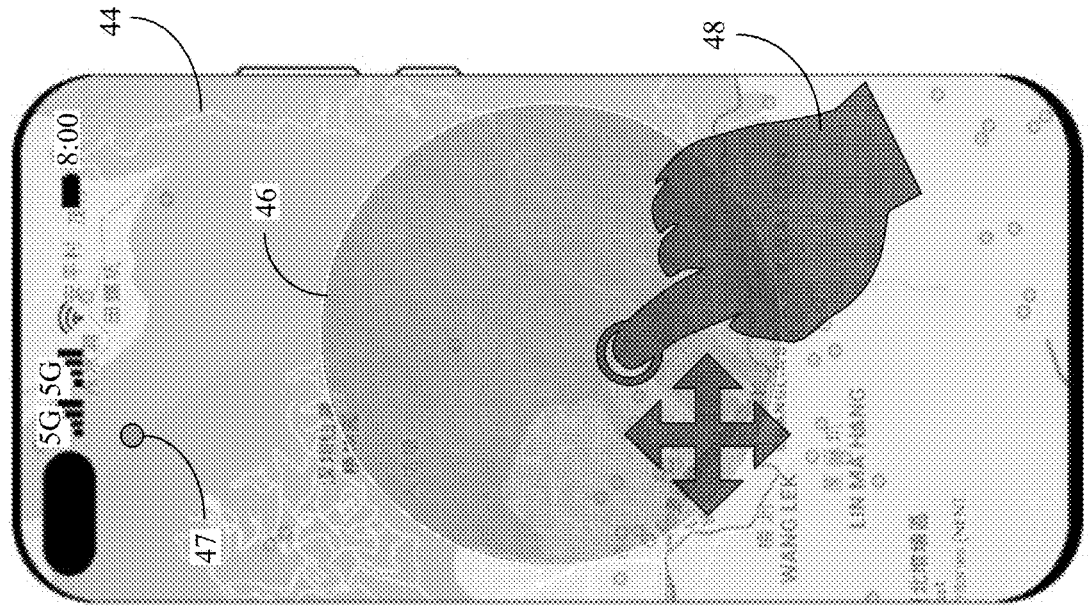
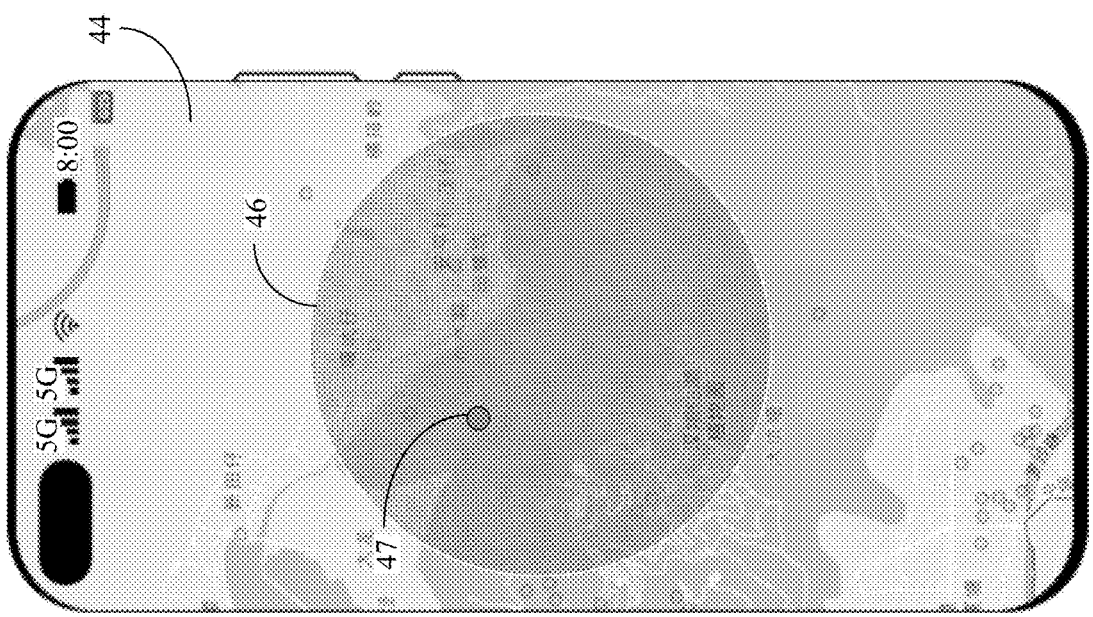
FIG. 19

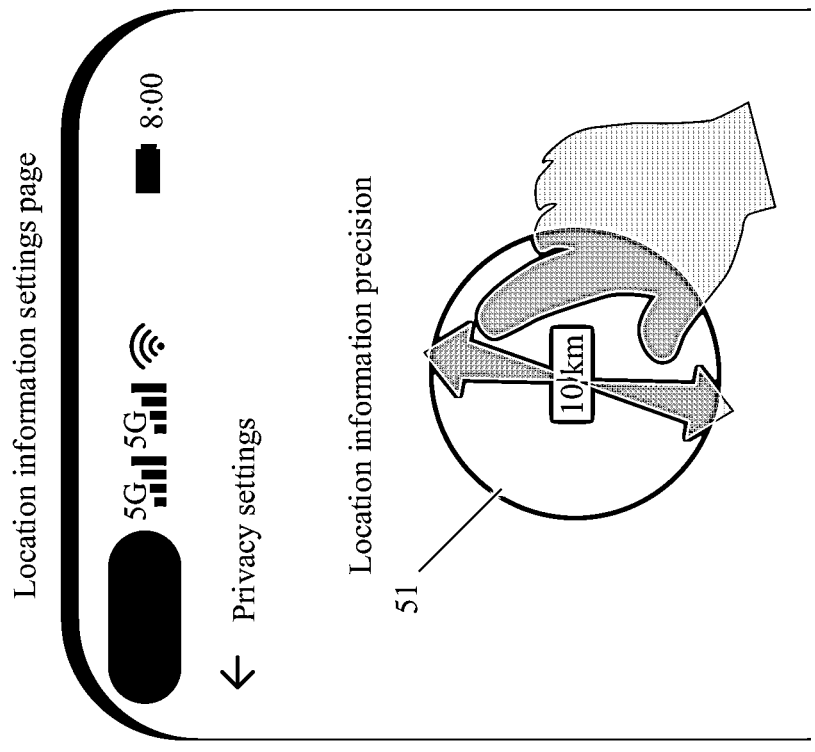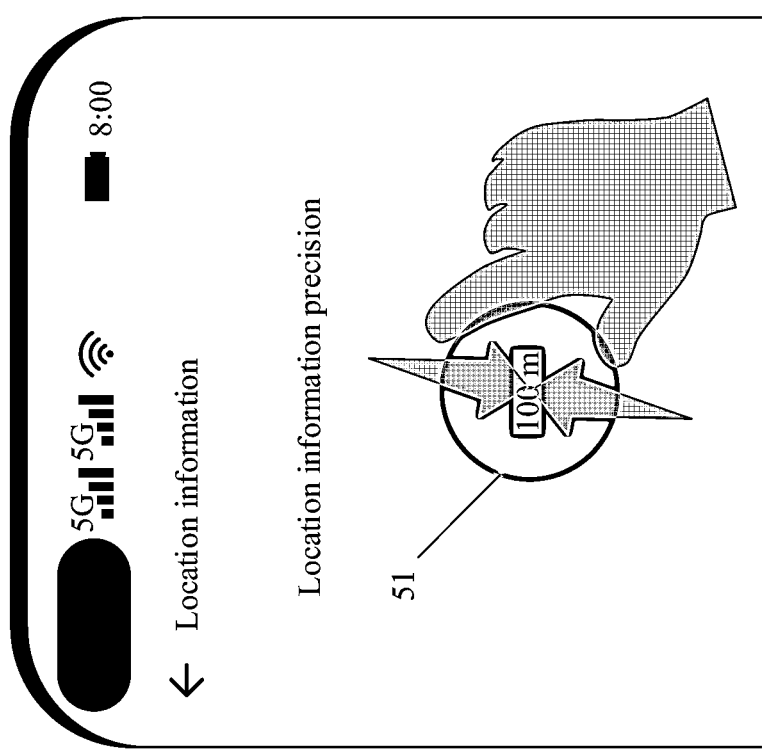
FIG. 20

Two-finger zoom out

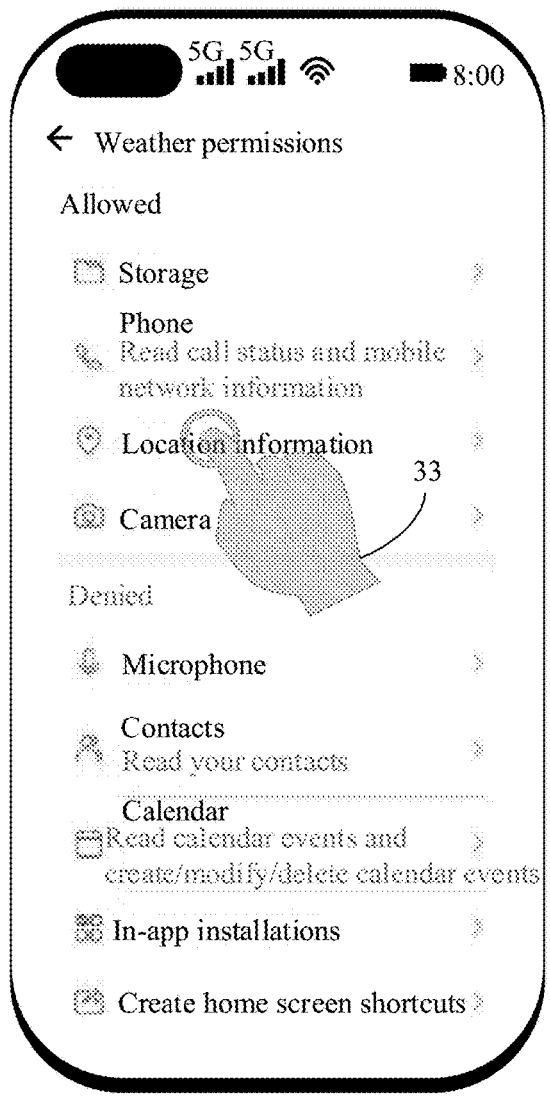
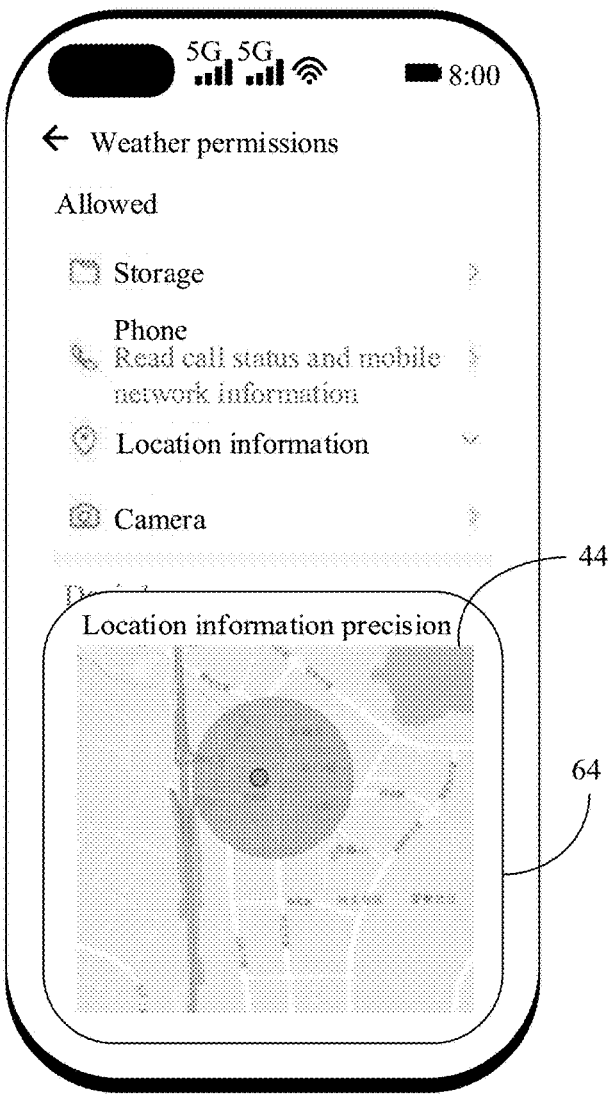
FIG. 32

PRIVACY INFORMATION GENERATION METHOD AND TERMINAL DEVICE

CROSS-REFERENCE TO RELATED APPLICATIONS

This disclosure is a continuation of International Application PCT/CN2021/095827, filed on May 25, 2021, which claims priority to Chinese Patent Application 202011221289.1, filed on Nov. 5, 2020. The disclosures of the aforementioned applications are hereby incorporated by reference in their entirety.

TECHNICAL FIELD

This disclosure relates to the field of terminal technologies, and in particular, to a privacy information generation method and a terminal device.

BACKGROUND

To implement functions and services, some applications installed on a terminal device request to obtain privacy information in the terminal device, such as location information, phone information, phone owner information, storage content, application list, calendar and schedules, phone account, body sensor information, physical activity information, and clipboard information.

Generally, an operating system of the terminal device provides a unified interface for obtaining the privacy information. After the operating system opens the privacy information interface, the applications may obtain very precise privacy information. In an example of location information, with relatively good positioning conditions, location information obtained by the terminal device may be a geographic coordinate value or a coordinate range, a longitude and latitude value or a longitude and latitude range, or the like with a precision of a dozen or even several meters.

However, some applications do not require particularly precise privacy information to satisfy their service requirements. Still in the example of location information, navigation and ride-hailing applications have high requirements on the precision of location information, otherwise route planning may be inaccurate, and an online ride-hailing driver may not successfully find a passenger. However, weather applications have low requirements on the precision of location information, and usually require only information about a district, county, or city in which a user is located to provide services for the user.

However, because precisions of privacy information provided by a current terminal device for all applications are indiscriminate, a precision of privacy obtained by some applications is higher than that required by the applications. For example, even weather applications may obtain the user's specific latitude and longitude information or geographic coordinate information. Excessive obtaining of privacy information by the applications brings a great hidden danger to the user's privacy and security, and increases a risk of user privacy leakage.

SUMMARY

Embodiments of this disclosure provide a privacy information generation method and a terminal device, so as to protect user privacy and reduce a risk of user privacy leakage.

According to a first aspect, an embodiment of this disclosure provides a privacy information generation method. The method may be applied to a terminal device and includes: responding, by a terminal device, to a first gesture operation performed by a user on a privacy settings page of a target application, and determining a privacy precision for the target application, where the privacy settings page includes an interactive element for setting the privacy precision, and the first gesture operation includes at least one gesture operation performed by the user on the interactive element; and generating, by the terminal device, privacy information based on the privacy precision for the target application when the target application requests the privacy information from the terminal device.

According to the foregoing technical solution, the terminal device adds an interactive element for adjusting a privacy precision for an application in a privacy settings page of the application, so that the user can set, according to their own will, a precision for privacy information provided by the terminal device for the application. In this way, a specific precision of privacy information that can be obtained by the application is under the control of the user, thereby preventing the application from excessively obtaining privacy information against the will of the user or without the knowledge of the user, and reducing a risk of disclosure of privacy information of the user.

In an optional implementation, the interactive element includes a slider assembly; the slider assembly includes a slider and a knob provided on the slider; and the slider corresponds to a preset privacy precision interval, one end of the slider corresponds to the lowest privacy precision, and the other end corresponds to the highest privacy precision; the terminal device moves the knob to a first target position in response to an operation of dragging the knob by the user; and the terminal device determines a privacy precision corresponding to the first target position as the privacy precision for the target application. In this way, the terminal device allows the user to freely set the privacy precision for the application by operating the slider assembly, and the operation is simple, intuitive, and convenient.

In an optional implementation, the slider includes a plurality of stops, the plurality of stops are distributed at intervals on the slider, and each stop corresponds to one preset privacy precision; the terminal device moves the knob to a first target stop in response to the operation of dragging the knob by the user; and the terminal device determines the privacy precision corresponding to the first target stop as the privacy precision for the target application. In this way, the terminal device allows the user to set the privacy precision for the application to any preset privacy precision by operating the slider assembly, and the operation is simple, intuitive, and convenient, and helps reduce learning costs of the user's operation.

In an optional implementation, the interactive element includes a first circular color block with a variable radius, and the radius of the first circular color block corresponds to the privacy precision, where a larger radius of the first circular color block corresponds to a lower privacy precision, or a larger radius of the first circular color block corresponds to a higher privacy precision; the terminal device adjusts the first circular color block to a first target radius in response to a two-finger zoom operation performed by the user on the first circular color block; and the terminal device determines a privacy precision corresponding to the first target radius as the privacy precision for the target application. In this way, the terminal device allows the user to set the privacy precision for the application by operating the first circular color block, and the privacy precision can be intuitively presented to the user in the form of the radius of the first circular color block, which helps improve user experience.

In an optional implementation, the interactive element includes a second circular color block with a fixed radius, the second circular color block includes a central circular region and at least one annular region concentric with the central circular region in a radius direction, and each region corresponds to one preset privacy precision; the terminal device lightens or darkens at least one region in the second circular color block in response to a two-finger zoom operation performed by the user on the second circular color block; and the terminal device uses the preset privacy precision corresponding to the outermost lightened region in the second circular color block as the privacy precision for the target application. In this way, the terminal device allows the user to set the privacy precision for the application to any preset privacy precision by operating the second circular color block, and the privacy precision can be intuitively presented to the user in the form of a size of the lightened region of the second circular color block, which helps improve user experience.

In an optional implementation, the lightening or darkening, by the terminal device, at least one region in the second circular color block in response to the two-finger zoom operation includes: when it is detected that the user performs a two-finger zoom-in operation on a lightened region of the second circular color block, sequentially lightening, by the terminal device from the inside to the outside, regions passed by the user's fingers.

In an optional implementation, the lightening or darkening, by the terminal device, at least one region in the third circular color block in response to the two-finger zoom operation includes: when it is detected that the user performs a two-finger zoom-out operation on a lightened region of the second circular color block, sequentially darkening, by the terminal device from the outside to the inside, regions outside a region passed by the user's fingers.

In an optional implementation, the interactive element includes a slider assembly and a first circular color block with a variable radius; the slider assembly includes a slider and a knob provided on the slider; different positions of the slider correspond to different radii of the first circular color block, one end of the slider corresponds to the smallest radius of the first circular color block, and the other end corresponds to the largest radius of the first circular color block; the radius of the first circular color block corresponds to the privacy precision, where a larger radius of the first circular color block corresponds to a lower privacy precision, or a larger radius of the first circular color block corresponds to a higher privacy precision; the terminal device adjusts the first circular color block to a second target radius in response to an operation of dragging the knob by the user; and the terminal device determines a privacy precision corresponding to the second target radius as the privacy precision for the target application. In this way, the terminal device allows the user to set the privacy precision for the application to any privacy precision by operating the slider assembly, and the privacy precision can be intuitively presented to the user in the form of a size of the lightened region of the first circular color block, which helps improve user experience.

In an optional implementation, the privacy information includes location information, the privacy settings page includes a location information settings page, and the privacy precision includes a location information precision; and the location information settings page further includes a map window, the map window includes a map of a region around an actual location of the terminal device, and the map includes a marker used to indicate the actual location. In this way, the terminal device adds an interactive element for adjusting a location information precision for an application in a location information settings page of the application, so that the user can set, according to their own will, a precision for location information provided by the terminal device for the application. A specific precision of location information that can be obtained by the application is under the control of the user, thereby preventing the application from excessively obtaining location information against the will of the user or without the knowledge of the user, and reducing a risk of disclosure of location information of the user.

In an optional implementation, the location information precision is a distance precision, and the distance precision represents a maximum error distance between location information generated by the terminal device and the actual location. In this way, the terminal device can adjust, based on a location information precision set by the user, a maximum error distance between location information generated by the terminal device and the actual location of the terminal device. If the location information precision is relatively low, the terminal device may generate and provide location information with a relatively large error distance for an application, which makes it difficult for the application to obtain the actual location of the terminal device, thereby reducing a risk of disclosure of location information of the user.

In an optional implementation, the map window further includes a first shaded region with the actual location as a center and with the distance precision for the target application as a radius, and the first shaded region indicates an error range of the location information generated by the terminal device relative to the actual location. In this way, an error range of the location information relative to the actual location can be intuitively presented to the user in the form of the first shaded region, so that the user intuitively understands the location information precision currently set for the application.

In an optional implementation, the location information precision is a geographic range precision; and the map window further includes a second shaded region corresponding to the geographic precision, the second shaded region has a fixed pixel size, and the second shaded region indicates a geographic range for the location information generated by the terminal device; and the terminal device adjusts a scale of the map in response to a two-finger zoom operation performed by the user in the map window. In this way, when the scale of the map becomes larger, a geographic range covered by the second shaded region on the map becomes smaller, which means that the terminal device may generate location information in a smaller geographic range, indicating that the location information precision is increased; when the scale of the map becomes smaller, a geographic range covered by the second shaded region on the map becomes larger, which means that the terminal device may generate location information in a larger geographic range, indicating that the location information precision is reduced.

In an optional implementation, the terminal device increases the scale of the map in response to a two-finger zoom-in operation performed by the user in the map window.

In an optional implementation, the terminal device reduces the scale of the map in response to a two-finger zoom-out operation performed by the user in the map window.

In an optional implementation, the terminal device pans the map in a dragging direction of the user's finger in response to a one-finger drag operation by the user in the map window. In this way, the terminal device can adjust a geographic range covered by the second shaded region without changing the scale of the map. When the geographic range covered by the second shaded region is away from the actual location of the terminal device, it indicates that the location information precision is reduced. When the geographic range covered by the second shaded region is close to the actual location of the terminal device, it indicates that the location information precision is increased.

In an optional implementation, the terminal device uses, in response to a one-finger or multi-finger smudge operation by the user in the map window, a preset pattern to cover a region that is smudged by the user's finger.

In an optional implementation, when the target application requests the location information, the terminal device determines and selects geographic coordinates or a coordinate range from the region that is smudged by the user's finger as the location information provided for the target application. In this way, if it is expected that an application can obtain location information of a specific region, the user may smudge the corresponding region on the map, such that the location information obtained by the application is not related to the actual location of the terminal device, which helps protect user privacy.

In an optional implementation, when the target application requests the location information, the terminal device determines and selects geographic coordinates or a coordinate range from the region that is not smudged by the user's finger as the location information provided for the target application. In this way, if it is not expected that the application can obtain location information of a specific region, such as a home address, the user may smudge the corresponding region on the map, such that the application cannot obtain sensitive address information of the user, which helps protect user privacy.

In an optional implementation, the map window is displayed in full screen on a display of the terminal device.

In an optional implementation, the terminal device generates a blurring parameter Z based on the location information precision, where the blurring parameter is a distance value; the terminal device adds the blurring parameter Z to each of an X-axis coordinate and a Y-axis coordinate of two-dimensional planar coordinates (X, Y) corresponding to the actual location, to obtain two-dimensional planar coordinates (X+Z, Y+Z); and the terminal device uses the two-dimensional planar coordinates (X+Z, Y+Z) as the location information provided for the target application. In this way, the terminal device blurs an actual location by using the blurring parameter, which can prevent an application from obtaining actual location information, so as to protect user privacy.

In an optional implementation, the terminal device determines a radius R based on the location information precision for the target application; the terminal device establishes a two-dimensional planar coordinate system by using a center point of a display as a coordinate origin; the terminal device selects any coordinate point as a center from a region of which a coordinate range is within (±NR, ±NR) in the two-dimensional planar coordinate system, to determine a circular region with the radius R, where N is a real number greater than or equal to 1; the terminal device determines whether the actual location is within the circular region; and if the actual location is within the circular region, the terminal device uses a coordinate range of the circular region as the location information provided for the target application; or if the actual location is outside the circular region, the terminal device reselects the circular region. In this way, the terminal device randomly generates location information based on a location information precision, which can prevent an application from reversely calculating the actual location of the terminal device, and more reliably protect user privacy.

According to a second aspect, an embodiment of this disclosure provides a terminal device, including: a memory and a processor. The memory stores computer program instructions. When the program instructions are executed by the processor, the terminal device is enabled to implement the following method steps: responding to a first gesture operation performed by a user on a privacy settings page of a target application, and determining a privacy precision for the target application, where the privacy settings page includes an interactive element for setting the privacy precision, and the first gesture operation includes at least one gesture operation performed by the user on the interactive element; and generating privacy information based on the privacy precision for the target application when the target application requests the privacy information.

According to the foregoing technical solution, the terminal device adds an interactive element for adjusting a privacy precision for an application in a privacy settings page of the application, so that the user can set, according to their own will, a precision for privacy information provided by the terminal device for the application. In this way, a specific precision of privacy information that can be obtained by the application is under the control of the user, thereby preventing the application from excessively obtaining privacy information against the will of the user or without the knowledge of the user, and reducing a risk of disclosure of privacy information of the user.

In an optional implementation, the interactive element includes a slider assembly; the slider assembly includes a slider and a knob provided on the slider; and the slider corresponds to a preset privacy precision interval, one end of the slider corresponds to the lowest privacy precision, and the other end corresponds to the highest privacy precision; and when the program instructions are executed by the processor, the terminal device is enabled to specifically implement the following method steps: moving the knob to a first target position in response to an operation of dragging the knob by the user; and determining a privacy precision corresponding to the first target position as the privacy precision for the target application. In this way, the terminal device allows the user to freely set the privacy precision for the application by operating the slider assembly, and the operation is simple, intuitive, and convenient.

In an optional implementation, the slider includes a plurality of stops, the plurality of stops are distributed at intervals on the slider, and each stop corresponds to one preset privacy precision; and when the program instructions are executed by the processor, the terminal device is enabled to specifically implement the following method steps: moving the knob to a first target stop in response to the operation of dragging the knob by the user; and determining the preset privacy precision corresponding to the first target stop as the privacy precision for the target application. In this way, the terminal device allows the user to set the privacy precision for the application to any preset privacy precision by operating the slider assembly, and the operation is simple, intuitive, and convenient, and helps reduce learning costs of the user's operation.

In an optional implementation, the interactive element includes a first circular color block with a variable radius, and the radius of the first circular color block corresponds to the privacy precision, where a larger radius of the first circular color block corresponds to a lower privacy precision, or a larger radius of the first circular color block corresponds to a higher privacy precision; and when the program instructions are executed by the processor, the terminal device is enabled to specifically implement the following method steps: adjusting the first circular color block to a first target radius in response to a two-finger zoom operation performed by the user on the first circular color block; and determining a privacy precision corresponding to the first target radius as the privacy precision for the target application. In this way, the terminal device allows the user to set the privacy precision for the application by operating the first circular color block, and the privacy precision can be intuitively presented to the user in the form of the radius of the first circular color block, which helps improve user experience.

In an optional implementation, the interactive element includes a second circular color block with a fixed radius, the second circular color block includes a central circular region and at least one annular region concentric with the central circular region in a radius direction, and each region corresponds to one preset privacy precision; and when the program instructions are executed by the processor, the terminal device is enabled to specifically implement the following method steps: lightening or darkening at least one region in the second circular color block in response to a two-finger zoom operation performed by the user on the second circular color block; and using the preset privacy precision corresponding to the outermost lightened region in the second circular color block as the privacy precision for the target application. In this way, the terminal device allows the user to set the privacy precision for the application to any preset privacy precision by operating the second circular color block, and the privacy precision can be intuitively presented to the user in the form of a size of the lightened region of the second circular color block, which helps improve user experience.

In an optional implementation, when the program instructions are executed by the processor, the terminal device is enabled to specifically implement the following method step: when it is detected that the user performs a two-finger zoom-in operation on a lightened region of the second circular color block, sequentially lightening, from the inside to the outside, regions passed by the user's fingers.

In an optional implementation, when the program instructions are executed by the processor, the terminal device is enabled to specifically implement the following method step: when it is detected that the user performs a two-finger zoom-out operation on a lightened region of the second circular color block, sequentially darkening, from the outside to the inside, regions outside a region passed by the user's fingers.

In an optional implementation, the interactive element includes a slider assembly and a first circular color block with a variable radius; the slider assembly includes a slider and a knob provided on the slider; different positions of the slider correspond to different radii of the first circular color block, one end of the slider corresponds to the smallest radius of the first circular color block, and the other end corresponds to the largest radius of the first circular color block; the radius of the first circular color block corresponds to the privacy precision, where a larger radius of the first circular color block corresponds to a lower privacy precision, or a larger radius of the first circular color block corresponds to a higher privacy precision; and when the program instructions are executed by the processor, the terminal device is enabled to specifically implement the following method steps: adjusting the first circular color block to a second target radius in response to an operation of dragging the knob by the user; and determining a privacy precision corresponding to the second target radius as the privacy precision for the target application. In this way, the terminal device allows the user to set the privacy precision for the application to any privacy precision by operating the slider assembly, and the privacy precision can be intuitively presented to the user in the form of a size of the lightened region of the first circular color block, which helps improve user experience.

In an optional implementation, the privacy information includes location information, the privacy settings page includes a location information settings page, and the privacy precision includes a location information precision; and the location information settings page further includes a map window, the map window includes a map of a region around an actual location of the terminal device, and the map includes a marker used to indicate the actual location. In this way, the terminal device adds an interactive element for adjusting a location information precision for an application in a location information settings page of the application, so that the user can set, according to their own will, a precision for location information provided by the terminal device for the application. A specific precision of location information that can be obtained by the application is under the control of the user, thereby preventing the application from excessively obtaining location information against the will of the user or without the knowledge of the user, and reducing a risk of disclosure of location information of the user.

In an optional implementation, the location information precision is a distance precision, and the distance precision represents a maximum error distance between location information generated by the terminal device and the actual location. In this way, the terminal device can adjust, based on a location precision set by the user, a maximum error distance between location information generated by the terminal device and the actual location of the terminal device. If the location information precision is relatively low, the terminal device may generate and provide location information with a relatively large error distance for an application, which makes it difficult for the application to obtain the actual location of the terminal device, thereby reducing a risk of disclosure of location information of the user.

In an optional implementation, the map window further includes a first shaded region with the actual location as a center and with the distance precision for the target application as a radius, and the first shaded region indicates an error range of the location information generated by the terminal device relative to the actual location. In this way, an error range of the location information relative to the actual location can be intuitively presented to the user in the form of the first shaded region, so that the user intuitively understands the location information precision currently set for the application.

In an optional implementation, the location information precision is a geographic range precision; and the map window further includes a second shaded region corresponding to the geographic precision, the second shaded region has a fixed pixel size, and the second shaded region indicates a geographic range for the location information generated by the terminal device; and when the program instructions are executed by the processor, the terminal device is enabled to specifically implement the following method step: adjusting a scale of the map in response to a two-finger zoom operation performed by the user in the map window. In this way, when the scale of the map becomes larger, a geographic range covered by the second shaded region on the map becomes smaller, which means that the terminal device may generate location information in a smaller geographic range, indicating that the location information precision is increased; when the scale of the map becomes smaller, a geographic range covered by the second shaded region on the map becomes larger, which means that the terminal device may generate location information in a larger geographic range, indicating that the location information precision is reduced.

In an optional implementation, when the program instructions are executed by the processor, the terminal device is enabled to specifically implement the following method step: increasing the scale of the map in response to a two-finger zoom-in operation performed by the user in the map window.

In an optional implementation, when the program instructions are executed by the processor, the terminal device is enabled to specifically implement the following method step: reducing the scale of the map in response to a two-finger zoom-out operation performed by the user in the map window.

In an optional implementation, when the program instructions are executed by the processor, the terminal device is enabled to specifically implement the following method step: panning the map in a dragging direction of the user's finger in response to a one-finger drag operation by the user in the map window. In this way, the terminal device can adjust a geographic range covered by the second shaded region without changing the scale of the map. When the geographic range covered by the second shaded region is away from the actual location of the terminal device, it indicates that the location information precision is reduced. When the geographic range covered by the second shaded region is close to the actual location of the terminal device, it indicates that the location information precision is increased.

In an optional implementation, when the program instructions are executed by the processor, the terminal device is enabled to specifically implement the following method step: using, in response to a one-finger or multi-finger smudge operation by the user in the map window, a preset pattern to cover a region that is smudged by the user's finger.

In an optional implementation, when the program instructions are executed by the processor, the terminal device is further enabled to implement the following method step: when the target application requests the location information, determining and selecting geographic coordinates or a coordinate range from the region that is smudged by the user's finger as the location information provided for the target application. In this way, if it is expected that an application can obtain location information of a specific region, the user may smudge the corresponding region on the map, such that the location information obtained by the application is not related to the actual location of the terminal device, which helps protect user privacy.

In an optional implementation, when the program instructions are executed by the processor, the terminal device is further enabled to implement the following method step: when the target application requests the location information, determining and selecting geographic coordinates or a coordinate range from a region that is not smudged by the user's finger as the location information provided for the target application. In this way, if it is not expected that the application can obtain location information of a specific region, such as a home address, the user may smudge the corresponding region on the map, such that the application cannot obtain sensitive address information of the user, which helps protect user privacy.

In an optional implementation, the map window is displayed in full screen on a display of the terminal device.

In an optional implementation, when the program instructions are executed by the processor, the terminal device is enabled to specifically implement the following method steps: generating a blurring parameter Z based on the location information precision, where the blurring parameter is a distance value; adding the blurring parameter Z to each of an X-axis coordinate and a Y-axis coordinate of two-dimensional planar coordinates (X, Y) corresponding to the actual location, to obtain two-dimensional planar coordinates (X+Z, Y+Z); and using the two-dimensional planar coordinates (X+Z, Y+Z) as the location information provided for the target application. In this way, the terminal device blurs an actual location by using the blurring parameter, which can prevent an application from obtaining actual location information, so as to protect user privacy.

In an optional implementation, when the program instructions are executed by the processor, the terminal device is enabled to specifically implement the following method steps: determining a radius R based on the location information precision for the target application; establishing a two-dimensional planar coordinate system by using a center point of a display as a coordinate origin; selecting any coordinate point as a center from a region of which a coordinate range is within ($\pm$NR, $\pm$NR) in the two-dimensional planar coordinate system, to determine a circular region with the radius R, where N is a real number greater than or equal to 1; determining whether the actual location is within the circular region; and if the actual location is within the circular region, using a coordinate range of the circular region as the location information provided for the target application; or if the actual location is outside the circular region, reselecting the circular region. In this way, the terminal device randomly generates location information based on a location information precision, which can prevent an application from reversely calculating the actual location of the terminal device, and more reliably protect user privacy.

According to a third aspect, an embodiment of this disclosure further provides a computer-readable storage medium, where the computer-readable storage medium stores instructions. When the instructions are run on a computer, the computer is enabled to perform the methods in the foregoing aspects and implementations thereof.

According to a fourth aspect, an embodiment of this disclosure further provides a computer program product including instructions. When the computer program product runs on a computer, the computer is enabled to perform methods in the foregoing aspects and implementations thereof.

According to a fifth aspect, an embodiment of this disclosure further provides a chip system. The chip system includes a processor, configured to support the terminal device to implement the functions in the foregoing aspects, for example, generating or processing the information in the foregoing methods.

BRIEF DESCRIPTION OF DRAWINGS

FIG. 8 is a schematic diagram of another privacy settings page according to an embodiment of this disclosure;

FIG. 16 is a schematic diagram of another location information settings page according to an embodiment of this disclosure;

FIG. 19 is another schematic diagram of adjusting a location information precision in a map window according to an embodiment of this disclosure;

FIG. 20 is a schematic diagram of another location information settings page according to an embodiment of this disclosure;

FIG. 32 is a schematic diagram of another location information settings page shown in a pop-up window according to an embodiment of this disclosure;

DESCRIPTION OF EMBODIMENTS

The popularization and development of terminal devices such as mobile phones and tablet computers are gradually enriching people's lives. By installing various applications, terminal devices can provide users with various functions and services in aspects such as work, education, catering, travel, sports, social networking, shopping, and personal assistants. When providing some functions and services, applications request to obtain privacy information in the terminal devices. To obtain more personalized services, the users need to authorize the applications to use the privacy information. Generally, the privacy information that may be obtained by the applications includes location information, phone information, phone owner information, storage content, application list, calendar and schedules, phone account, body sensor information, physical activity information, clipboard information, and the like.

For example, when a user uses a catering services app to find a restaurant near the user, the user needs to authorize the app to use location information of the user; when the user uses a ride-hailing app, the user also needs to authorize the app to use the location information of the user; when the user is to use an education app for learning, the user may authorize the app to use information such as age, education background, and major of the user, to obtain corresponding education resources; when the user is to send pictures in social software, the user needs to authorize the application to access photos and files; and when the user is to use a copy and paste function in an application, the user needs to authorize the application to access the clipboard.

Figure 1:
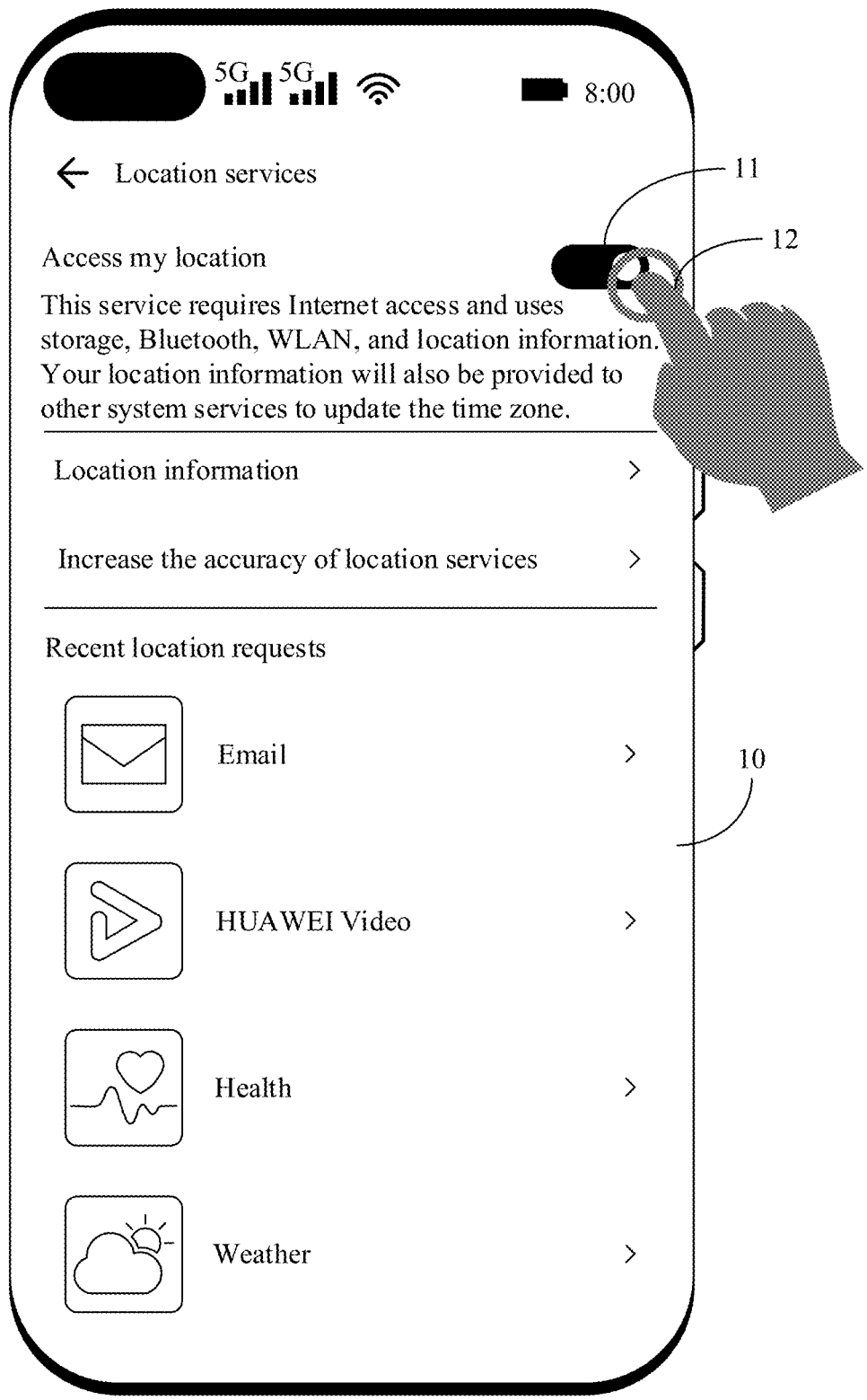
FIG. 1 is a schematic diagram of a location services settings page of a current terminal device.

Generally, an operating system of a terminal device provides a unified interface for obtaining the foregoing privacy information, and the terminal device can obtain the privacy information by using the interface provided by the operating system. The operating system includes, but is not limited to, an Android operating system, an iOS operating system, an iPad OS, a Harmony operating system, a Windows operating system, a Linux operating system, a macOS operating system, or the like. The user may set, in the operating system, whether to open a privacy information interface to an application, so as to determine whether to provide privacy information to the application. In an example of location information, as shown in FIG. 1, the user may enter a location services settings page 10 from a settings menu of the operating system. The location services settings page 10 may include an authorization switch button 11 for location information. The authorization switch button allows the user to switch between on and off states by operations such as tapping 12 and sliding. When the authorization switch is in an on state, an interface for providing location information in the operating system is opened to the application. When the authorization switch is in an off state, the interface for providing location information in the operating system is closed to the application. Generally, the terminal device may determine the location information of the user based on one or more manners such as a global navigation satellite system (GNSS), Bluetooth, a wireless local area network (WLAN), and base station positioning, and provides the location information to the user when an application requests the location information.

After the operating system opens the privacy information interface, the applications may obtain very precise privacy information. In an example of location information, with relatively good positioning conditions, location information obtained by the terminal device may be a geographic coordinate value or a coordinate range, a longitude and latitude value or a longitude and latitude range, or the like with a precision of a dozen or even several meters. However, some applications do not require particularly precise privacy information to satisfy their service requirements. Still in the example of location information, navigation and ride-hailing applications have high requirements on a precision of location information. Otherwise, route planning may be inaccurate, and an online ride-hailing driver may not successfully find a passenger. However, weather applications have low requirements on a precision of location information, and usually require only information about a district, county, or city in which a user is located to provide services for the user.

However, because precisions of privacy information provided by the terminal device for all applications are indiscriminate, a precision of privacy obtained by some applications is higher than that required by the applications. For example, even weather applications may obtain the user's specific latitude and longitude information or geographic coordinate information. Excessive obtaining of privacy information by the applications brings a great hidden danger to the user's privacy and security.

In addition, excessive disclosure of the user's privacy information to applications may further cause the privacy information to be abused by the applications. For example, a video app recommends video content to the user based on the user's city, age, clipboard information, and the like, making the user have a strong sense of insecurity.

Figure 2:
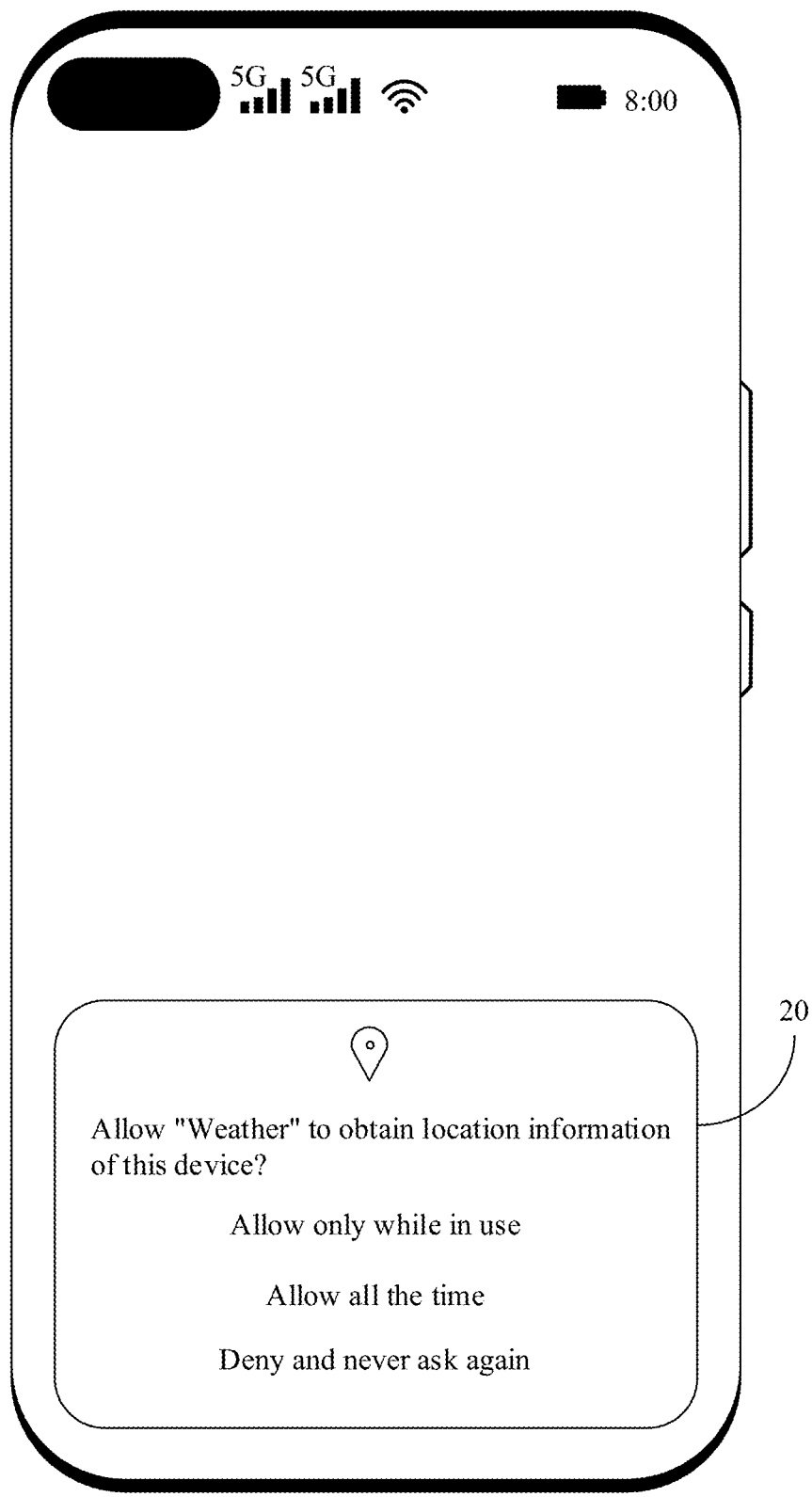
FIG. 2 is a schematic diagram of a dialog box for an application requesting location permissions.

To reduce a risk of disclosure of the user's privacy information, currently, some terminal devices may set privacy permissions for each application in a time dimension. In an example of location information, as shown in FIG. 2, when an application requests to obtain the location information permission from the user the first time, a dialog box 20 pops up on a display of the terminal device, asking whether the user allows the application to obtain the location information. The dialog box may further include different options divided in the time dimension, for example, Allow only while in use (of the application), Allow all the time, Deny this time, and Deny and never ask again. When the user selects "Allow only while in use", the application of the terminal device obtains the location information while the user is using the application, thereby reducing time periods during which the application obtains the location information. Although setting privacy permissions for each application based on the time dimension can reduce the time periods during which the application obtains the privacy information, and can reduce, to some extent, a risk of disclosure of the user's privacy information, the privacy information can still be obtained by the application, or even abused by a malicious program within a time period during which the application is allowed to obtain the privacy information.

To prevent an application from excessively obtaining privacy information of a user, and further reduce a risk of disclosure of privacy information of the user, the embodiments of this disclosure provide a privacy information generation method.

The method according to the embodiments of this disclosure may be applied to a terminal device. The terminal device includes, but is not limited to, a mobile phone, a tablet computer, a personal computer, a workstation device, a large-screen device (such as a smart screen or a smart television), a wearable device (such as a smart band or a smart watch), a handheld game console, a home game console, a virtual reality device, an augmented reality device, a mixed reality device, a vehicle-mounted intelligent terminal, or the like.

Figure 3:
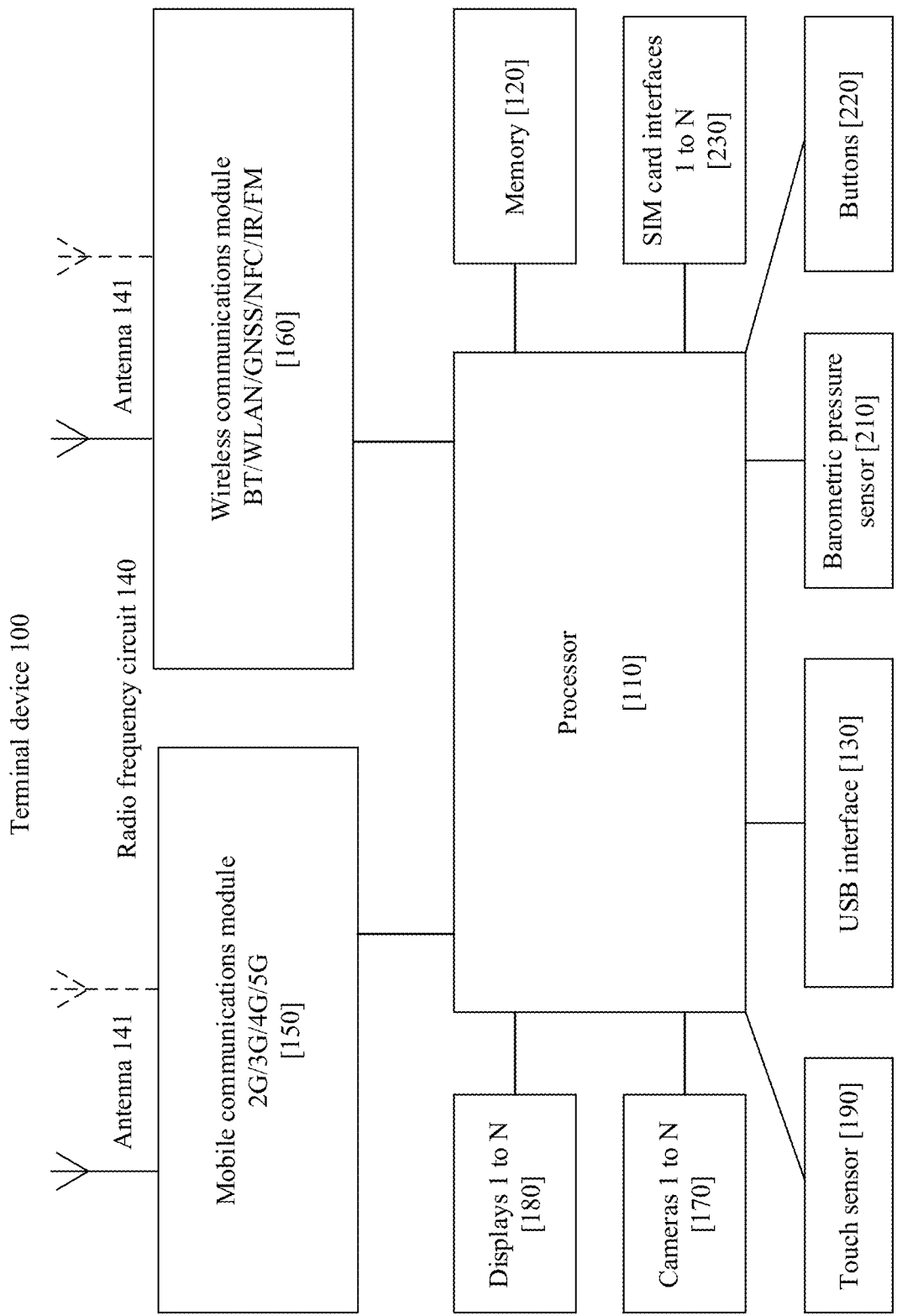
FIG. 3 is a schematic diagram of a hardware structure of a terminal device according to an embodiment of this disclosure.

FIG. 3 is a schematic diagram of a hardware structure of a terminal device according to an embodiment of this disclosure. As shown in FIG. 3, the terminal device 100 may include a processor 110, a memory 120, a universal serial bus (USB) interface 130, a radio frequency circuit 140, a mobile communications module 150, a wireless communications module 160, a camera 170, a display 180, a touch sensor 190, a barometric pressure sensor 210, buttons 220 or the like, and a subscriber identity module (SIM) card interface 230.

The processor 110 may include one or more processing units. For example, the processor 110 may include an application processor (AP), a modem processor, a graphics processing unit (GPU), an image signal processor (ISP), a video codec, a digital signal processor (DSP), a baseband processor, a neural-network processing unit (NPU), and/or the like. Different processing units may be independent components, or may be integrated in one or more processors, for example, integrated in a system on a chip (SoC). A memory may be further disposed in the processor 110, and is configured to store instructions and data. In some embodiments, the memory in the processor 110 is a cache memory. The memory may store instructions or data that has just been used or is cyclically used by the processor 110.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The memory 120 may be configured to store computer-executable program code, and the executable program code includes instructions. The memory 120 may include a program storage area and a data storage area. The program storage area may store an operating system, an application required by at least one function (for example, a voice playing function or an image playing function), and the like. The data storage area may store data (for example, audio data and a phone book) and the like created during use of the terminal device 100. In addition, the memory 120 may include one or more storage units, for example, may include a volatile memory, such as a dynamic random access memory (DRAM) or a static random access memory (SRAM); or may include a non-volatile memory (NVM), such as a read-only memory (ROM) or a flash memory. The processor 110 runs the instructions stored in the memory 120 and/or the instructions stored in the memory disposed in the processor, to perform various function applications of the terminal device 100 and data processing.

A wireless communications function of the terminal device 100 may be implemented by using the radio frequency circuit 140, the mobile communications module 150, the wireless communications module 160, the modem processor, the baseband processor, and the like.

The radio frequency circuit 140 may include at least one antenna 141 for transmitting and receiving electromagnetic wave signals. Each antenna in the terminal device 100 may be configured to cover one or more communications frequency bands. In some embodiments, the antenna may be used in combination with a tuning switch.

The mobile communications module 150 may provide a wireless communications solution that includes 2G/3G/4G/5G or the like and that is applied to the terminal device 100. The mobile communications module 150 may include at least one filter, a switch, a power amplifier, a low noise amplifier (LNA), and the like. The mobile communications module 150 may receive an electromagnetic wave through the antenna 141, perform processing such as filtering and amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 141. In some embodiments, at least some functional modules in the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which includes but is not limited to a speaker, a receiver, or the like), or displays an image or a video on the display 180. In some embodiments, the modem processor may be an independent component. In some other embodiments, the modem processor may be independent of the processor 110, and is disposed in a same device as the mobile communications module 150 or another functional module.

The wireless communications module 160 may include a wireless fidelity (Wi-Fi) module, a bluetooth (BT) module, a GNSS module, a near field communication (NFC) module, an infrared (IR) module, and the like. The wireless communications module 160 may be one or more components integrating at least one of the foregoing modules. The wireless communications module 160 receives an electromagnetic wave through the antenna 141, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 141.

In the embodiments of this disclosure, the wireless communications function of the terminal device 100 may include, for example, functions such as global system for mobile communications (GSM), general packet radio service (GPRS), code division multiple access (CDMA), wideband code division multiple access (WCDMA), time-division code division multiple access (TD-SCDMA), long term evolution (LTE), 5th generation mobile networks new radio (5G NR), BT, GNSS, WLAN, NFC, FM, IR, and/or the like. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS).

The camera 170 is configured to capture a static image or a video. The camera 170 includes a lens and a photosensitive element, and an optical image of an object is generated through the lens and is projected to the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, an RYYB format, or the like. In some embodiments, the terminal device 100 may include one or N cameras 170, where N is a positive integer greater than 1.

The NPU is a neural-network (NN) computing processor. The NPU quickly processes input information with reference to a structure of a biological neural network, for example, a transfer mode between human brain neurons, and may further continuously perform self-learning. Applications such as intelligent cognition of the terminal device 100, for example, image recognition, facial recognition, voice recognition, and text understanding, may be implemented through the NPU.

The display 180 is configured to display an image, a video, and the like. The display 180 includes a display panel. The display panel may use a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the terminal device 100 may include one or N displays 180, where N is a positive integer greater than 1.

The touch sensor 190 is also referred to as a "touch control component". The touch sensor 190 may be disposed on the display 180, and the touch sensor 190 and the display 180 form a touchscreen. The touch sensor 190 is configured to detect a touch operation on or near the touch sensor. The touch sensor may transfer the detected touch operation to the application processor, to determine a type of a touch event. A visual output related to the touch operation may be provided through the display 180. In some other embodiments, the touch sensor 190 may alternatively be disposed on a surface of the terminal device 100 at a location different from a location of the display 180.

The barometric pressure sensor 210 is configured to measure barometric pressure. In some embodiments, the terminal device 100 calculates an altitude based on a barometric pressure value measured by the barometric pressure sensor 210, to assist in positioning and navigation.

The buttons 220 include a power button, a volume button, and the like. The buttons 220 may be mechanical buttons, or may be touch buttons. The terminal device 100 may receive key input, and generate key signal input related to a user setting and function control of the terminal device 100.

It may be understood that the structure shown in embodiments of this disclosure does not constitute a specific limitation on the terminal device 100. In some other embodiments of this disclosure, the terminal device may include more or fewer components than those shown in the figure, or some components may be combined, or some components may be split, or different component arrangements may be used. The components in the figure may be implemented by hardware, software, or a combination of software and hardware.

Figure 4:
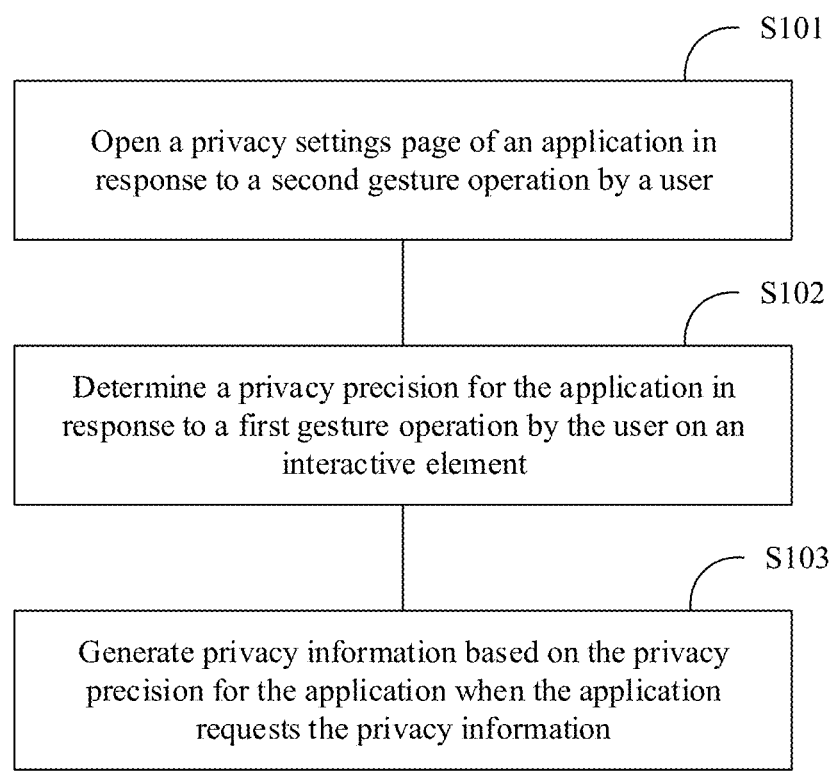
FIG. 4 is a flowchart of a privacy information generation method according to an embodiment of this disclosure.

FIG. 4 is a flowchart of a privacy information generation method according to an embodiment of this disclosure. As shown in FIG. 4, the method includes the following step S101 to step S103. Details are as follows.

Step S101: Open a privacy settings page of an application in response to a second gesture operation by a user.

The second gesture operation includes an operation of operating, by the user, a terminal device to open the privacy settings page of the application. The second gesture operation may be implemented through operations of one or more taps, a long press, and/or swiping performed by the user on a display of the terminal device, or may be implemented by the user through a specific voice command. This is not specifically limited in this embodiment of this disclosure.

The privacy settings page may include but is not limited to: a location information settings page, a storage permission settings page, a phone permission settings page, a camera permission settings page, a microphone permission settings page, a contacts permission settings page, a calendar permission settings page, an application list permission settings page, an in-app installations permission settings page, a clipboard permission settings page, and the like. Which privacy settings pages an application can correspond to may depend on the number and types of privacy permissions requested by the application.

Figure 5A:
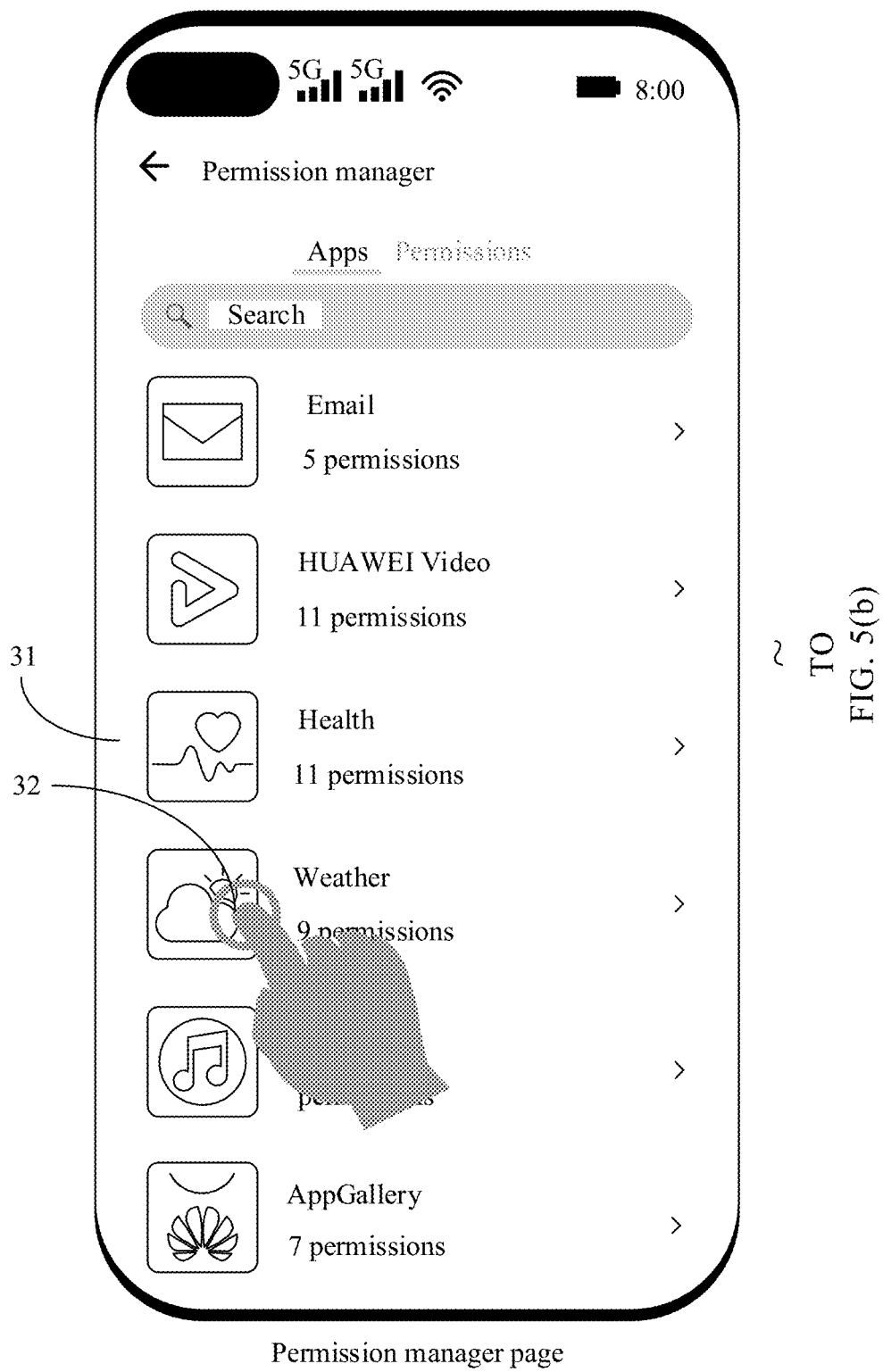
FIG. 5(a) and FIG. 5(b) are a schematic diagram of a terminal device entering a permission status page of an application.
Figure 5B:
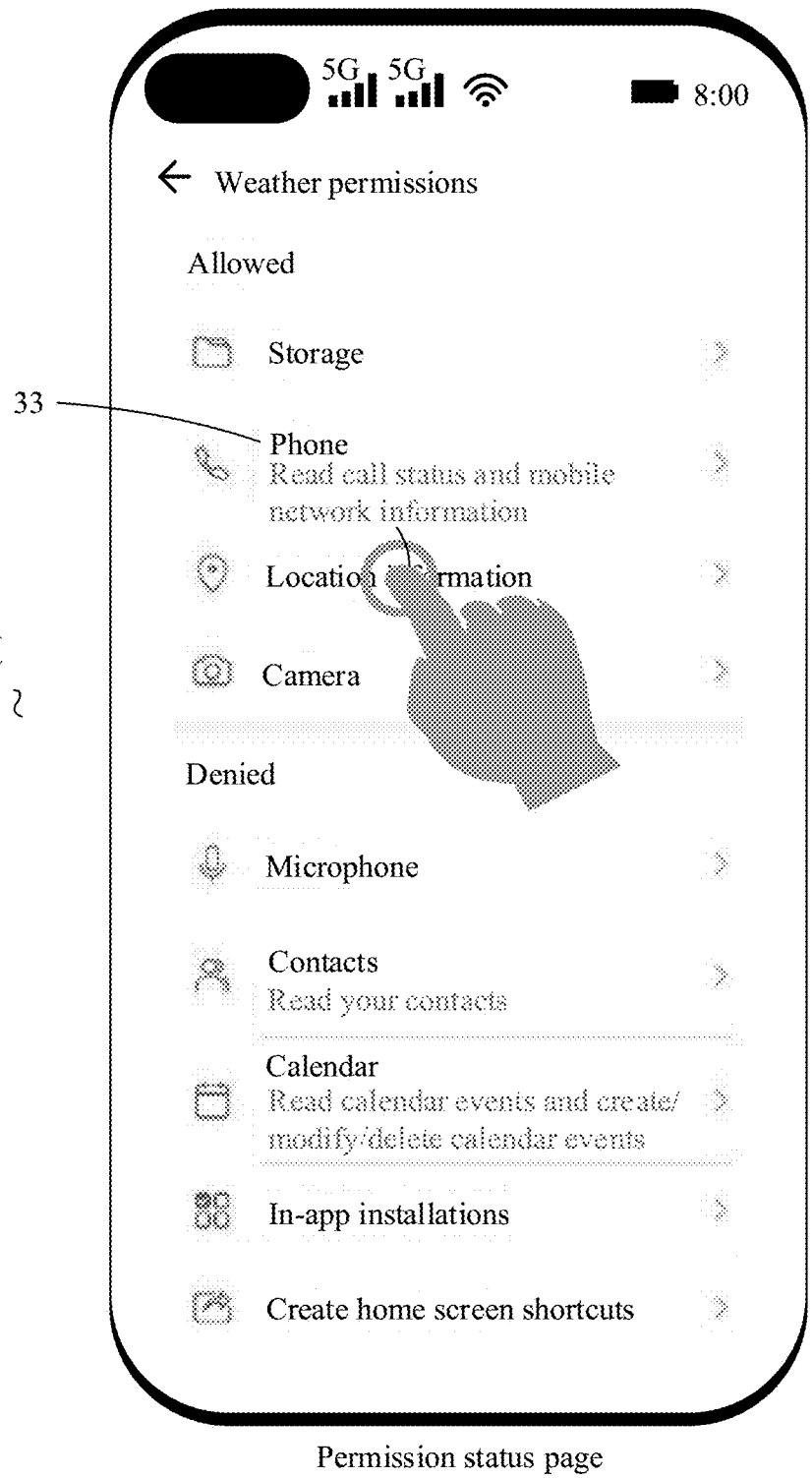

As an example, the user may tap the Settings icon on the home screen of an operating system on the display of the terminal device, to enter a system settings page; next, the user may further perform swipe and tap operations on the display to enter a permission manager page for applications under a secondary menu of the system settings page. The specific operation procedure of entering the permission manager page from the settings page depends on the design logic of the setting menu of different operating systems, which is not limited in this disclosure. For example, in some operating systems, the user may successively tap the "Applications" and "Permission manager" options, or successively tap the "Privacy" and "Permission manager" options on the settings page to enter the permission manager page. As shown in FIG. 5(*a*), the permission manager page may present a list of applications 31 installed on the terminal device. The user taps 32 any application in the list to enter a permission status page of the application. The permission status page presents a privacy permission list of the application. The user taps 33 any privacy permission name in the permission status page to enter a privacy settings page corresponding to this privacy permission.

As an example, the user can also open a privacy settings page of an application through a voice command based on a built-in voice assistant service of the terminal device. For example, the user can say to the terminal device, "Open location permission settings of Huawei AppGallery", "Set location permissions of Huawei AppGallery", or the like, and the voice assistant can open a location information settings page of Huawei AppGallery after understanding the user's speech.

In this embodiment of this disclosure, the privacy settings page may include an interactive element for adjusting a privacy precision for an application, where the privacy precision is a precision of privacy information provided by the terminal device for the application when the application requests the privacy information from the terminal device. For example, the location information settings page may include an interactive element for adjusting a location information precision, and the location precision may be adjusted from high to low. When the location precision is increased, the location information provided by the terminal device for the application has a higher precision. For example, the location information is location coordinates or a relatively small location range. When the location precision is lowered, the location information provided by the terminal device for the application has a lower precision. For example, the location information is a larger location range. For another example, the clipboard permission settings page may include an element for adjusting a clipboard precision, and the clipboard precision may be adjusted from high to low. When the clipboard precision is increased, the terminal device allows the application to access more text content in the clipboard. When the clipboard precision is lowered, the terminal device allows the application to access less text content in the clipboard, for example, allows the application to access only the most recent piece of text information in the clipboard.

Step S102: Determine a privacy precision for the application in response to a first gesture operation by the user on an interactive element.

The first gesture operation includes an operation of adjusting, by the user, the privacy precision on the privacy settings page. The first gesture operation may be implemented through operations of one or more taps, swiping, and zooming performed by the user on the privacy settings page, or may be implemented through a specific voice command. This is not specifically limited in this embodiment of this disclosure.

Figure 6:
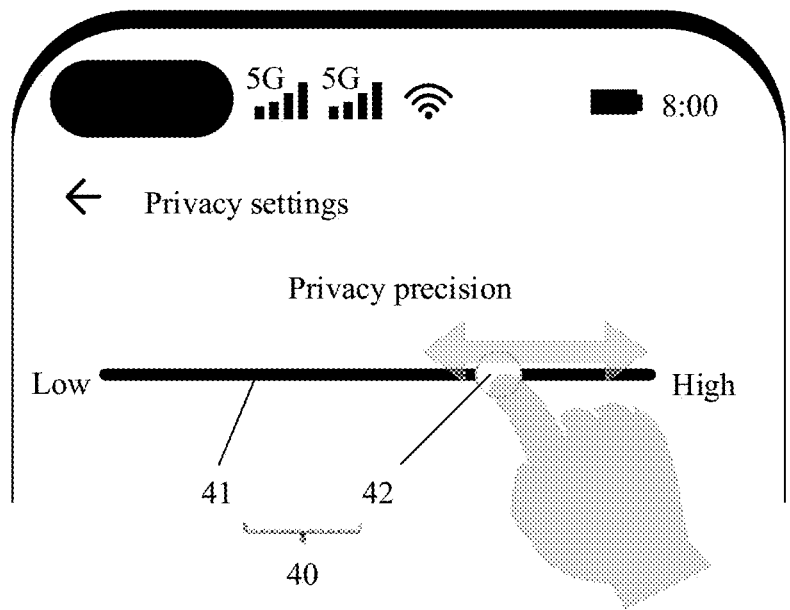
FIG. 6 is a schematic diagram of a privacy settings page according to an embodiment of this disclosure.

For example, as shown in FIG. 6, the privacy settings page may include a slider assembly 40 for adjusting a privacy precision. The slider assembly 40 includes a slider 41 and a knob 42. One end of the slider 41 corresponds to the lowest privacy precision, and the other end corresponds to the highest privacy precision. The user can drag the knob 42 to different positions of the slider 41, so as to set different privacy precisions. The closer the knob 42 is to the end with the highest privacy precision, the higher the corresponding privacy precision. The closer the knob is to the end with the lowest privacy precision, the lower the corresponding privacy precision.

Figure 7:
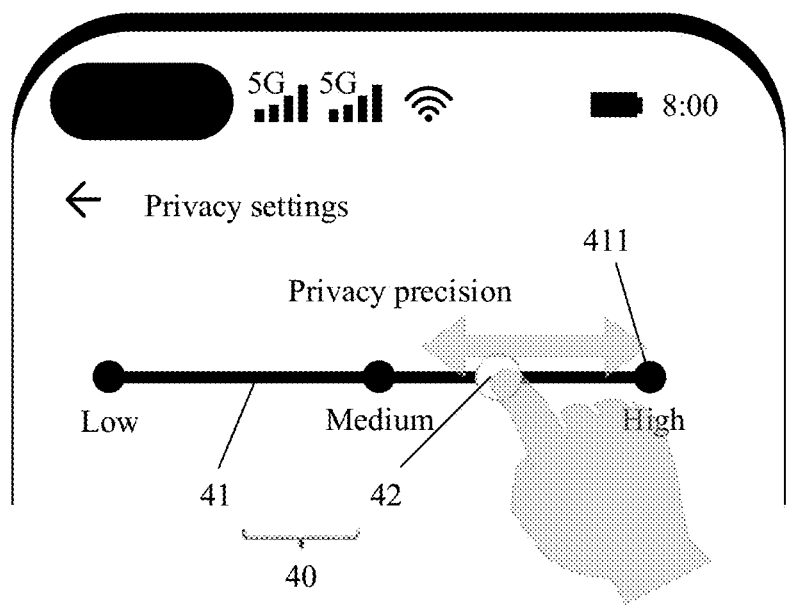
FIG. 7 is a schematic diagram of another privacy settings page according to an embodiment of this disclosure.

For example, as shown in FIG. 7, when the privacy settings page includes the slider assembly 40 for adjusting a privacy precision, the slider 41 may include a plurality of stops 411, each stop 411 corresponds to a specific position on the slider 41, and the slider assembly 40 allows the user to drag the knob 42 to any stop 411. Each stop 411 corresponds to one privacy precision. The closer the stop 411 is to the end with the highest privacy precision, the higher the corresponding privacy precision. The closer the stop 411 is to the end with the lowest privacy precision, the lower the corresponding privacy precision. The number of stops 411 may be determined based on levels of the privacy precision preset by the terminal device. For example, when the privacy precision includes three levels: high, medium, and low, the slider 41 may include three stops 411, of which the first stop 411 is located at one end of the slider, corresponding to the low privacy precision, the second stop 411 is located in the middle of the slider, corresponding to the medium privacy precision, and the third stop 411 is located at the other end of the slider, corresponding to the high privacy precision.

For example, as shown in FIG. 8, in the privacy settings page, the privacy precision may be visualized as a region with a variable area on the display region, such as a circular color block 51 of a specific color. A larger area of the circular color block 51 corresponds to a lower privacy precision, and a smaller area of the circular color block 51 corresponds to a higher privacy precision. The user can adjust the area of the circular color block 51 by performing a two-finger zoom operation on the circular color block 51 to enlarge or reduce the area of the circular color block 51, so as to set different privacy precisions.

Step S103: Generate privacy information based on the privacy precision for the application when the application requests the privacy information.

In a specific implementation, when an application requests privacy information through an interface provided by the operating system, the terminal device may determine, based on current permission settings of the application, whether the application has a permission to obtain the privacy information. If the application has the permission to obtain the privacy information, the terminal device generates corresponding privacy information based on a target precision set by the user, and provides the privacy information for the application. If the application does not have the permission to obtain the privacy information, the terminal device does not provide corresponding privacy information for the application, or provides blank information for the application.

According to the foregoing technical solution, the terminal device adds an element for adjusting a privacy precision for an application in a privacy settings page of the application, so that the user can set, according to their own will, a precision for privacy information provided by the terminal device for the application. In this way, a specific precision of privacy information that can be obtained by the application is under the control of the user, thereby preventing the application from excessively obtaining privacy information against the will of the user or without the knowledge of the user, and reducing a risk of disclosure of privacy information of the user.

The privacy information generation method provided in the embodiments of this disclosure is further exemplified below with reference to some privacy permissions commonly obtained by an application. Due to the limited length, the following example descriptions cannot cover all privacy permissions. For privacy permissions not mentioned in the following example descriptions, a person skilled in the art may refer to the following example descriptions for implementation.

In an example of location information, considering that different terminal devices may run different operating systems and different operating systems may have different operation logic, the terminal device may enter the location information settings page in at least one manner.

A first implementation is to enter a location information settings page of an application through the "Permission manager" function of an operating system. For example, when it is detected that the user taps the Settings icon on the home screen of the operating system on the display, or that the user pulls down on the display to call out the control center of the operating system and taps the Settings icon in the control center, the terminal device may enter the settings page; next, when it is detected that the user successively taps the "Applications" and "Permission manager" options, or successively taps "Privacy" and "Permission manager" on the settings page, the terminal device may enter a permission manager page shown in FIG. 5(a). The permission manager page may present a list of applications installed on the terminal device. When it is detected that the user taps any application in the application list, the terminal device may enter a permission status page of the application. The permission status page presents the privacy permission list of the application. When it is detected that the user has tapped "Location information" in the permission status page, the terminal device enters a location information settings page of the application. For example, when it is detected that the user has tapped the "Weather" application, the terminal device may enter a permission status page of Weather. When it is detected that the user taps "Location information" on the permission status page of "Weather", the terminal device may enter a location information settings page of "Weather".

Figure 9A:
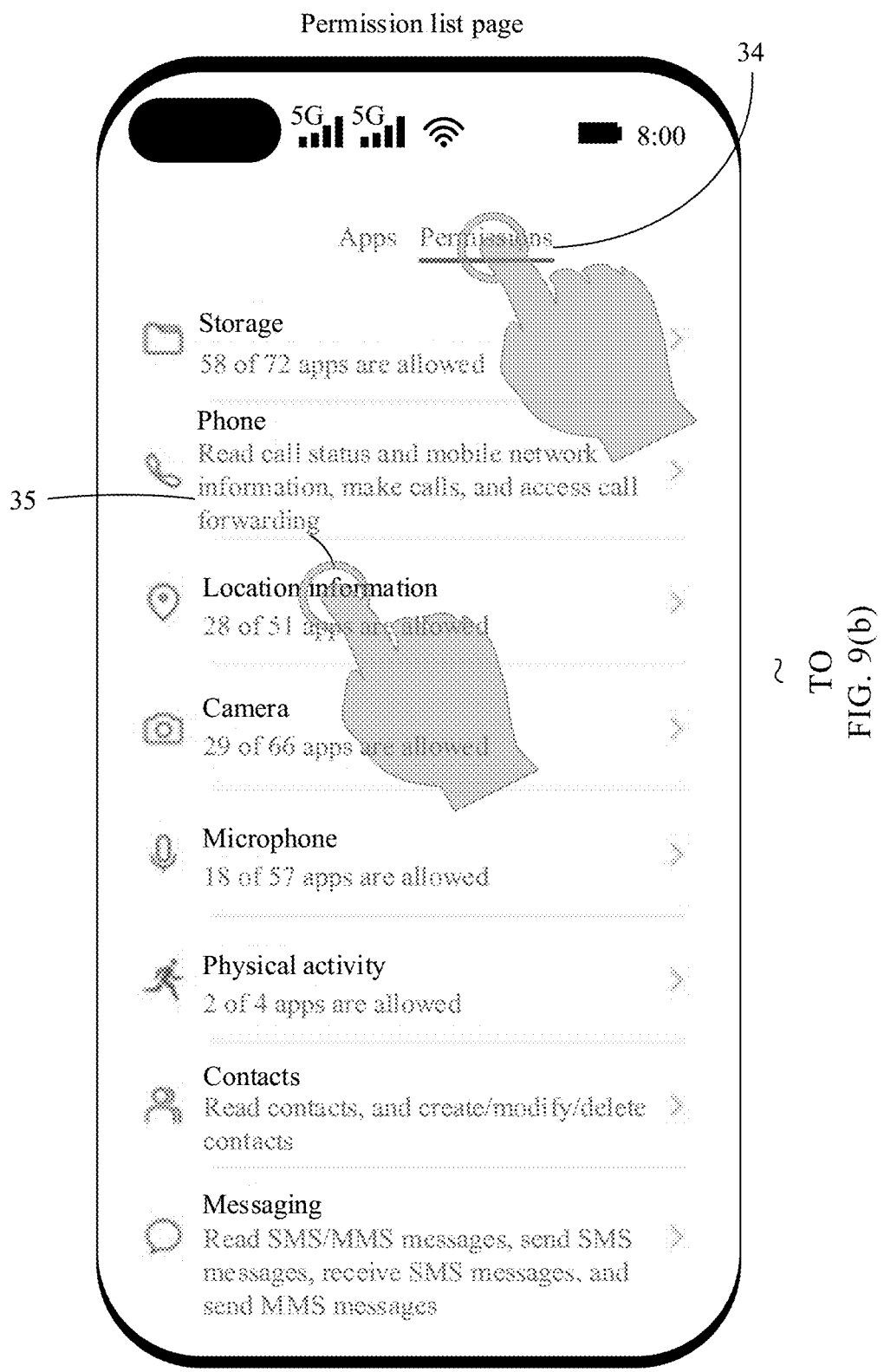
FIG. 9(a) and FIG. 9(b) are a schematic diagram of a terminal device entering a location information page of an application according to an embodiment of this disclosure.
Figure 9B:
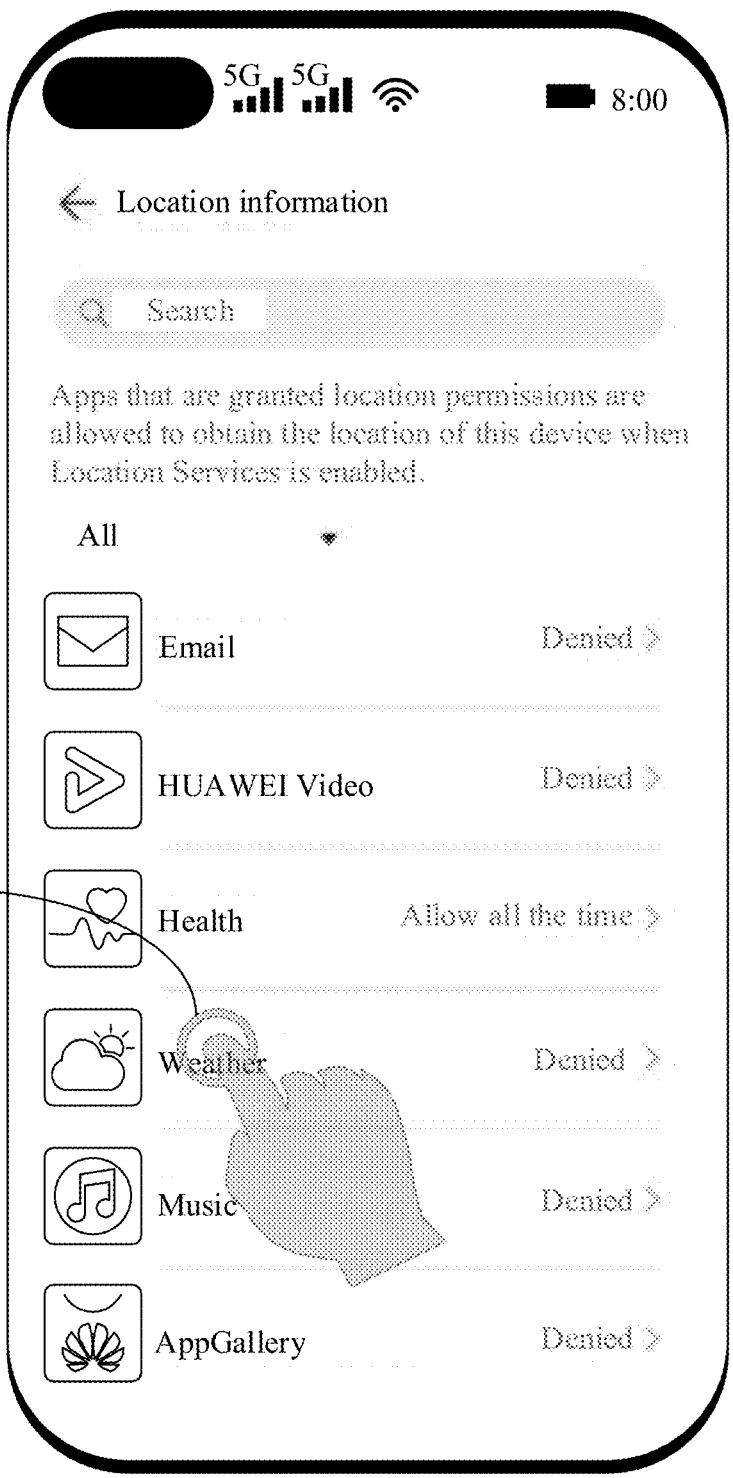

In a second implementation, when it is detected that the user taps 34 the "Permissions" option on the permission manager page, the terminal device may enter a permission list page shown in FIG. 9(*a*). The permission list page presents all privacy permissions that the terminal device can provide for applications, and may further include the number of applications to which a privacy permission has been granted. When it is detected that the user taps 35 the "Location information" option on the permission list page, the terminal device may enter a location information details page. The location information details page presents the list of applications installed on the terminal device, and further presents a location information setting status of each application, such as: allow only while in use, allow all the time, or denied. When it is detected that the user taps an application in the application list, the terminal device may enter a location information settings page of the application. For example, when it is detected that the user taps 36 "Weather" on the location information details page, the terminal device may enter the location information settings page of "Weather".

Figure 10A:
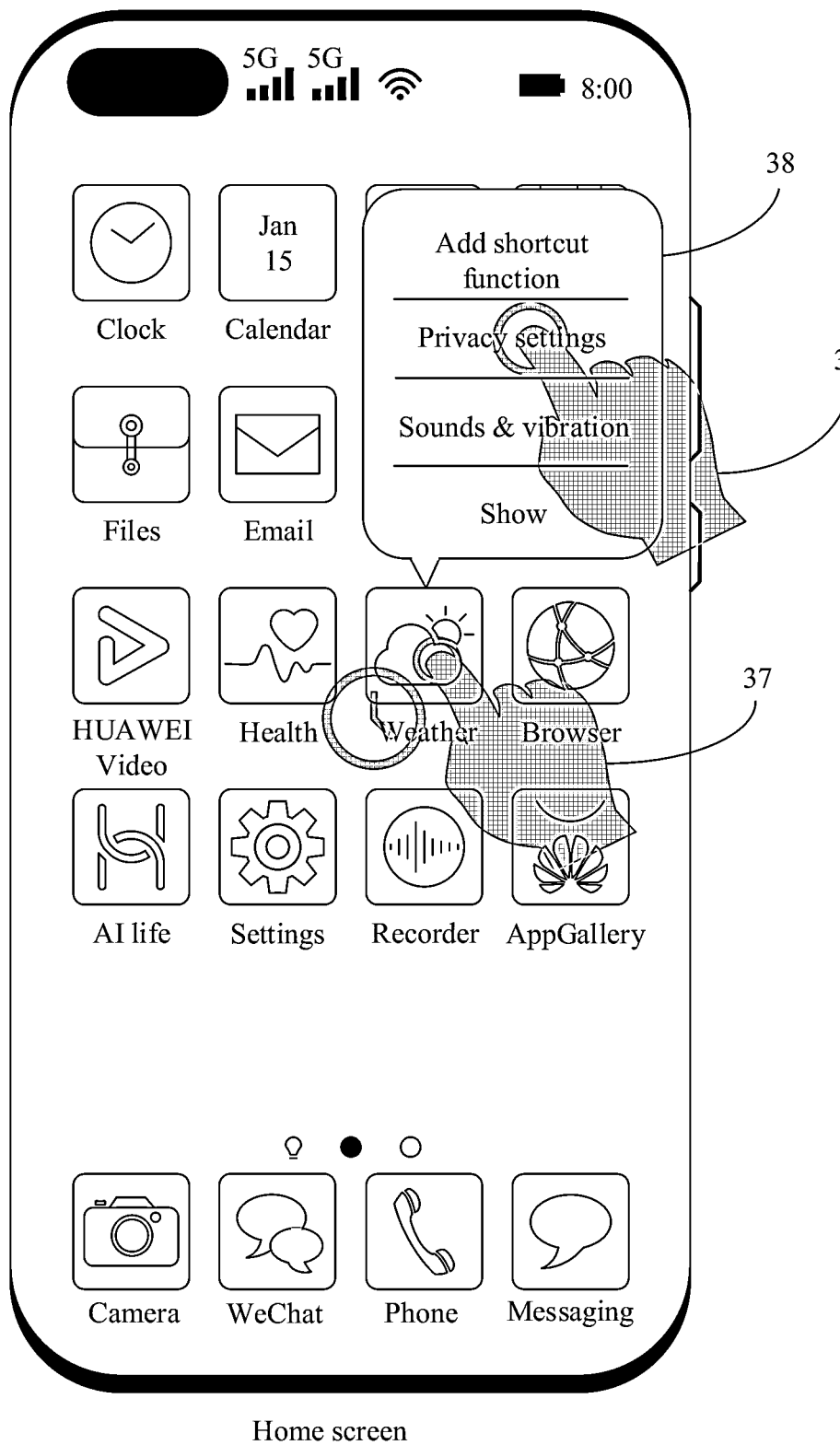
FIG. 10(a) and FIG. 10(b) are a schematic diagram of a terminal device entering a location information page of an application according to an embodiment of this disclosure.
Figure 10B:
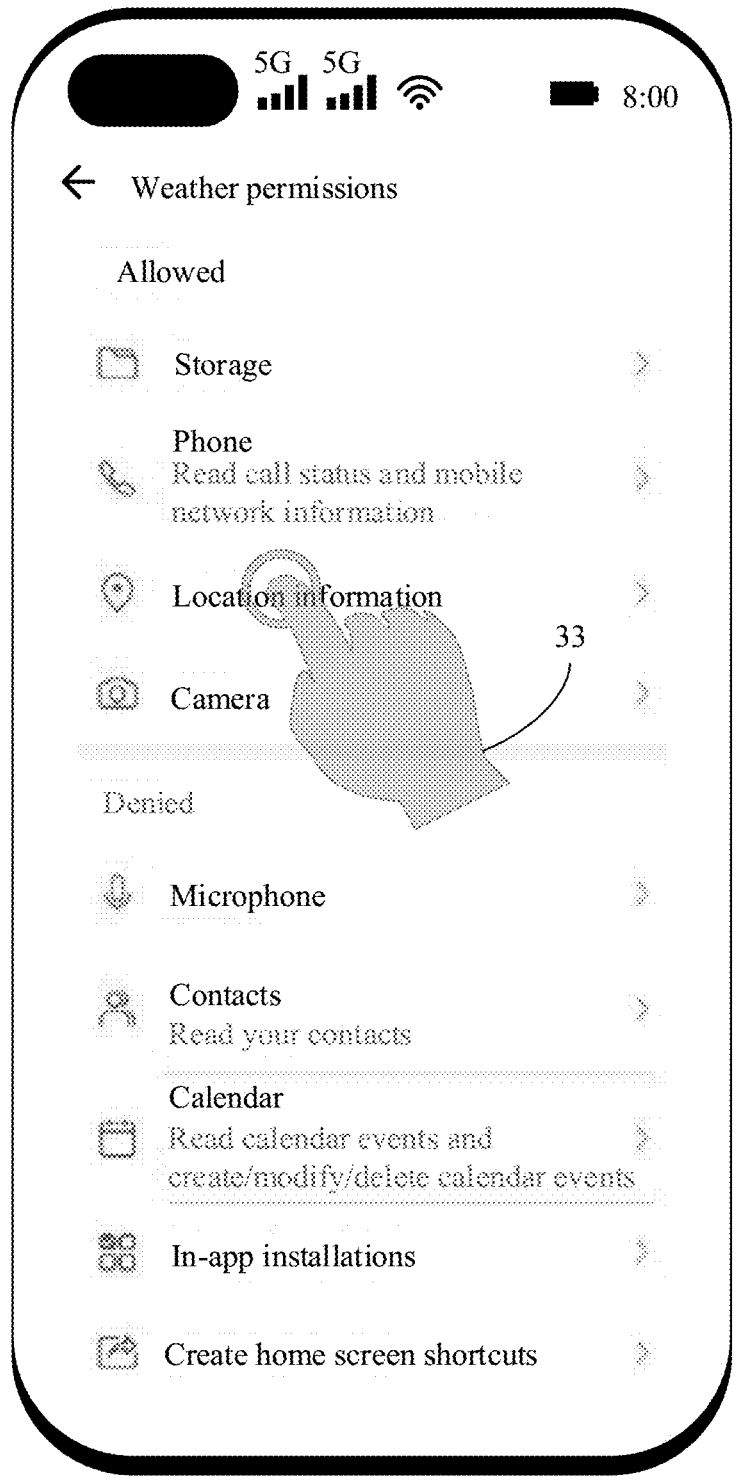

A third implementation is to enter a location information settings page of an application through a shortcut menu function of an icon of the application. As shown in FIG. 10(*a*), when the terminal device detects that the user long-presses or deep-presses 37 an icon of an application on the home screen of the operating system, a shortcut menu 38 may pop up on the side of the application icon. The shortcut menu 38 may include one or more shortcut functions related to the application. These shortcut functions may be preset by the developer of the application, or may be preset by the terminal device for the application, or may be set by the user by tapping the Create function in the shortcut menu 38. In this embodiment of this disclosure, the terminal device may preset a "Privacy settings" option in the shortcut menu 38. When it is detected that the user taps 39 the "Privacy settings" option in the shortcut menu 38, the terminal device directly opens a permission status page of the application; and when it is detected that the user taps 33 "Location information" on the permission status page, the terminal device enters a location information settings page of the application.

Specifically, entering the location information settings page of the "Weather" application is used as an example: When the terminal device detects that the user long-presses the icon of "Weather", a shortcut menu of "Weather" pops up, where the shortcut menu includes the "Privacy settings" option of "Weather". When it is detected that the user taps the "Privacy settings" option, the terminal device opens the permission status page of "Weather". When it is detected that the user taps "Location information" on the permission status page, the terminal device enters the location information settings page of "Weather".

It should be additionally noted herein that the terminal device may determine, based on duration of a single press by the user on the application icon on the display, whether the user long-presses or short-presses the application icon. For example, when it is detected that the duration of the single press by the user on the application icon is greater than a preset duration threshold, the terminal device determines that the user has long-pressed the application icon; or when it is detected that the duration of the single press by the user on the application icon is less than or equal to the preset duration, the terminal device determines that the user has short-pressed the application icon. In addition, when a pressure sensor is mounted under the display of the terminal device, pressure can be detected when the user presses the display, so as to determine whether the user deep-presses or light-presses the application icon. For example, when it is detected that the pressure of the user pressing the application icon is greater than a preset pressure threshold, the terminal device determines that the user has deep-pressed the application icon; or when it is detected that the pressure of the user pressing the application icon is less than or equal to the preset pressure threshold, the terminal device determines that the user has light-pressed the application icon.

Figure 11:
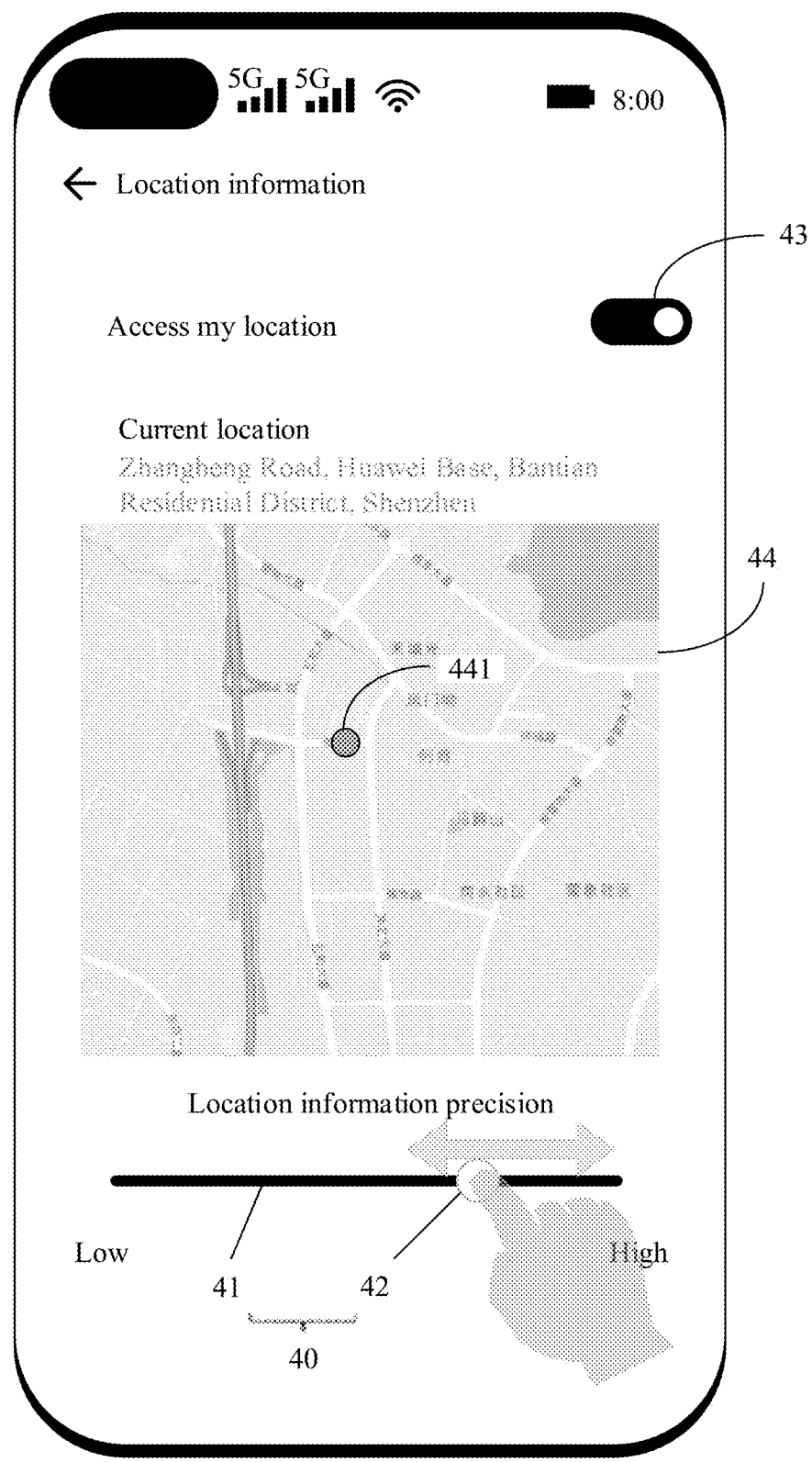
FIG. 11 is a schematic diagram of a location information settings page according to an embodiment of this disclosure.

FIG. 11 is a schematic diagram of a location information settings page according to an embodiment of this disclosure. As shown in FIG. 11, the location information settings page may include a permission switch 43. When it is detected that the user taps the permission switch 43, the terminal device may switch the location information permission for an application to be enabled and disabled. The location information settings page may further present an actual location of the terminal device. For example, FIG. 11 includes a map window 44, and the actual location of the terminal device is marked with a dot 441 (or another marking form) in the map window 44, that is, the map window 44 shows a map of a region around the actual location of the terminal device. The location information settings page may further include a slider assembly 40 for adjusting a location information precision. The slider assembly includes a slider 41 and a knob 42 that can be dragged on the slider. The slider 41 may be arranged horizontally, vertically, or may be arranged in various shapes such as a circle, a fan shape, and a wedge shape. This is not limited in this embodiment of this disclosure.

Different positions on the slider 41 correspond to different location information precisions. For example, when the slider 41 is arranged horizontally, a location information precision corresponding to the left end of the slider 41 is the lowest, and a location information precision corresponding to the right end of the slider 41 is the highest. A correspondence between different positions on the slider 41 and location information precisions may be specifically designed by a person skilled in the art. This is not limited in this embodiment of this disclosure. In this way, the terminal device can adjust the precision of the location information provided for the application based on the user's operation on the slider 41. For example, when the terminal device detects that the user drags the knob 42 on the slider 41 from left to right, the precision of the location information provided by the terminal device for the application is increased; and when the terminal device detects that the user drags the knob 42 on the slider 41 from right to left, the precision of the location information provided by the terminal device for the application is reduced.

In an implementation, the location information precision may be represented by a distance precision, which represents a maximum error distance between location information provided by the terminal device for an application and the actual location of the terminal device. A higher location information precision indicates a smaller maximum error distance between the location information provided by the terminal device for the application and the actual location of the terminal device, and a lower location information precision indicates a larger maximum error distance between the location information provided by the terminal device for the application and the actual location of the terminal device. Therefore, different positions on the slider 41 may correspond to different distance precisions. For example, a distance precision corresponding to the leftmost end of the slider 41 is the highest, a distance precision corresponding to a position closer to the right end of the slider 41 is smaller, and a distance precision corresponding to the rightmost end of the slider 41 is the lowest.

Figure 12:
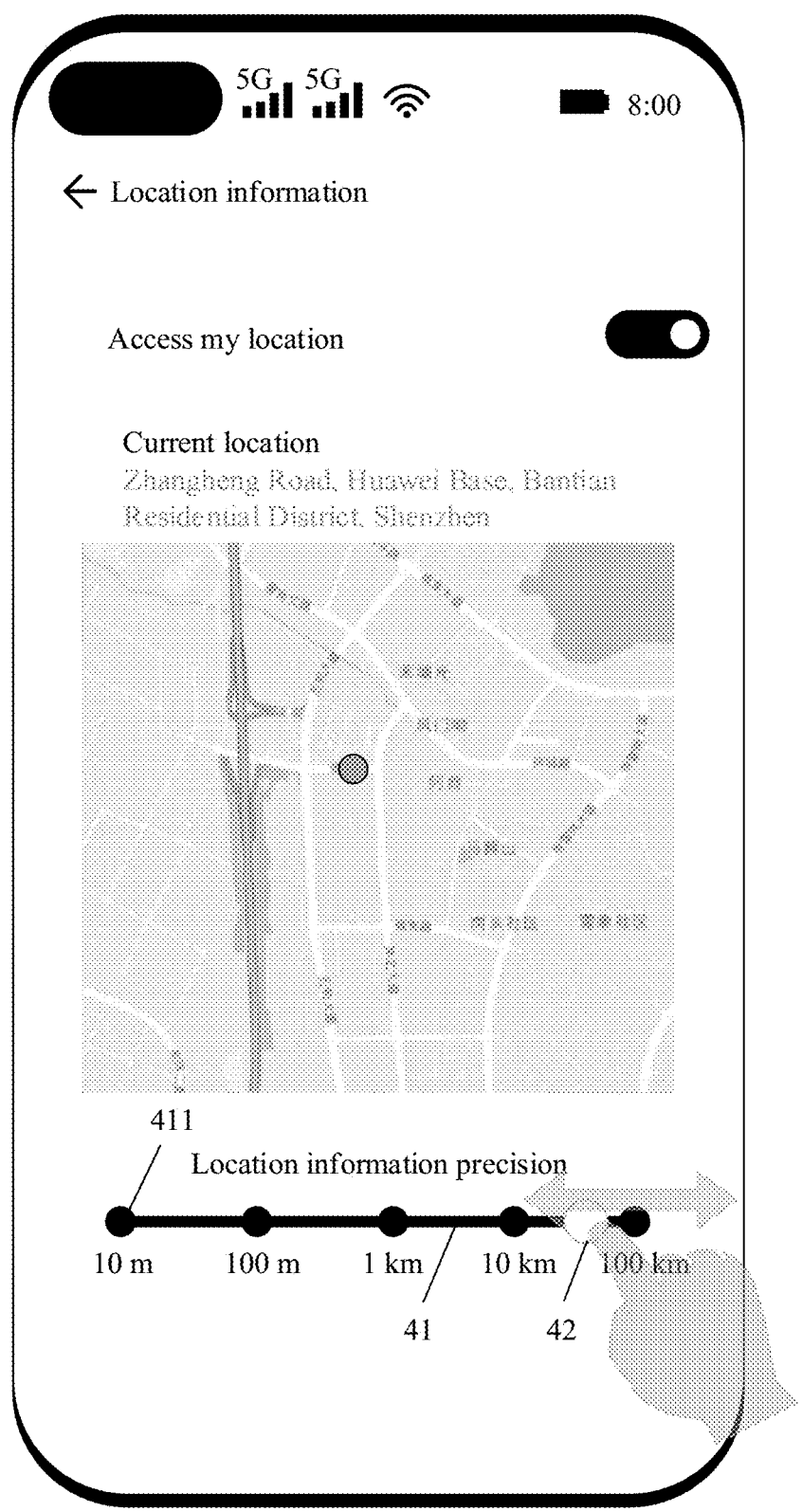
FIG. 12 is a schematic diagram of another location information settings page according to an embodiment of this disclosure.

In an implementation, as shown in FIG. 12, the slider 41 may include a plurality of stops 411, each stop 411 corresponds to a specific position on the slider 41, and the terminal device allows the user to drag the knob 42 to any stop 411. Each stop 411 corresponds to one location information precision. A stop 411 closer to the end of slider with the highest location information precision corresponds to a higher location information precision, and a stop 411 closer to the end of slider with the lowest location information precision corresponds to a lower location information precision. In this embodiment of this disclosure, the terminal device may preset N stops on the slider, where N is a positive integer. In addition, the number of stops may also be adaptively adjusted for different applications, or adjusted based on user configurations. For example, the terminal device may configure more stops for applications such as map and navigation applications, catering services applications, and ride-hailing applications that require high location information precisions. The terminal device may configure fewer stops for applications such as weather applications and social applications that require low location information precisions.

For example, when the location information precision is represented by the distance precision, assuming that the location information precision ranges from 10 m (meters) to 100 km (kilometers), the leftmost end of the slider 41 as a stop 411 may correspond to a precision of 10 m, and the rightmost end of the slider 41 as a stop 411 may correspond to a precision of 100 km. Three stops 411 may be distributed between the two ends of the slider 41, and the three stops 411 may correspond to a precision of 100 m, a precision of 1 km, and a precision of 10 km in sequence from left to right. In this way, the slider 41 includes a total of five stops 411, corresponding to five location information precisions. When the user drags the knob 42, the terminal device can adjust, among the five different precisions, the precision of the location information provided by the terminal device for the application.

In an implementation, when the slider 41 includes a plurality of stops 411, the location information precision may be represented by different administrative region levels. For example, the location information precision is divided in an order from low to high according to structured administrative region levels and addresses, and may include some or all of the following levels: Country—Province (autonomous region)—City—District (county)—Subdistrict (town)—Neighborhood (village)—Community (building, commercial district, enterprise park, or the like).

Figure 13:
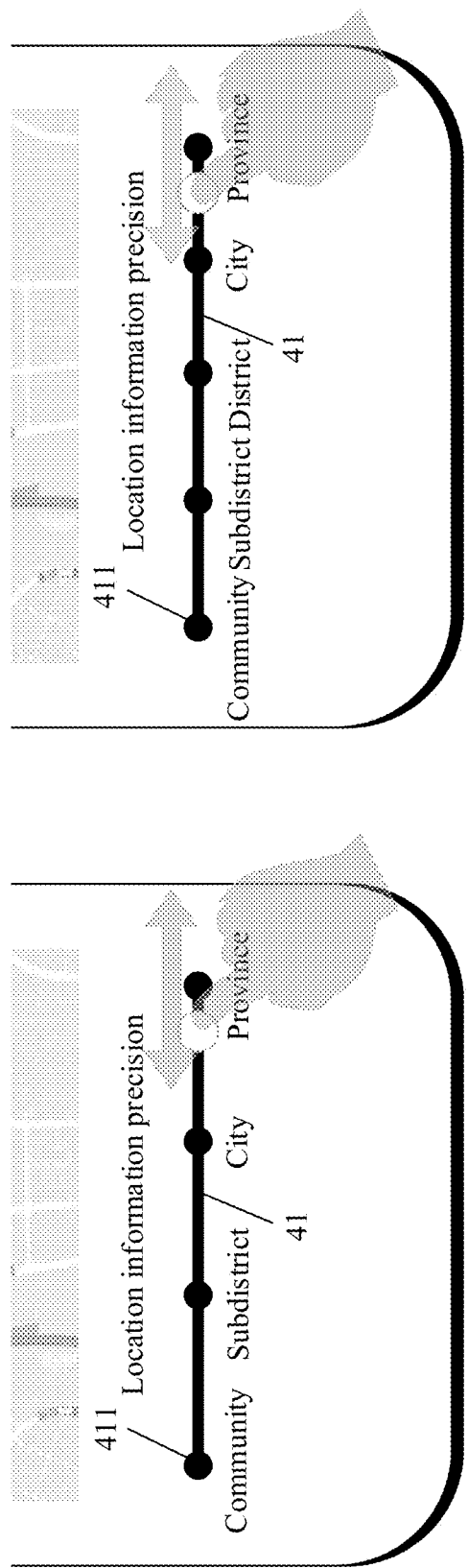
FIG. 13 is a schematic diagram of another location information settings page according to an embodiment of this disclosure.

It may be understood that when the number of stops on the slider 41 is different, an administrative region level corresponding to each stop 411 is also different. As shown in FIG. 13, if the slider 41 includes four stops 411, administrative region levels corresponding to the four stops 411 may be, from low to high, "Community (building, commercial district, enterprise park, or the like)—Subdistrict (town)—City—Province (state)", or "Subdistrict (town)—District (county)—City—Province (autonomous region)", or there may be other correspondences. If the slider 41 includes five stops 411, administrative region levels corresponding to the five stops 411 may be, from low to high, "Community (building, commercial district, enterprise park, or the like)—Subdistrict (town)—District (county)—City—Province (state)", or "Subdistrict (town)—District (county)—City—Province (autonomous region)—Country", or there may be other correspondences.

This embodiment of this disclosure does not specifically limit the number of stops 411 on the slider 41 and a corresponding division manner of administrative region levels.

Figure 14:
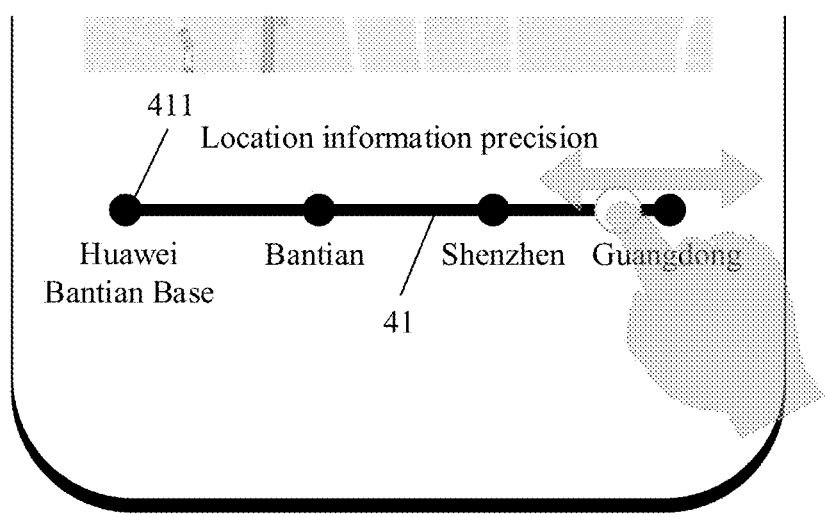
FIG. 14 is a schematic diagram of another location information settings page according to an embodiment of this disclosure.

In an implementation, to help the user to intuitively understand an adjustment result of the location information precision, the terminal device may display actual location information corresponding to its administrative region near each stop 411 of the slider 41 based on the actual location of the terminal device. As shown in FIG. 14, when the slider 41 includes four stops 411 and the terminal device is currently located in the "Huawei Bantian Base", the terminal device may display "Huawei Bantian Base", "Bantian", "Shenzhen", and "Guangdong" below the four stops 411 respectively according to an order of the location information precision from high to low. In this way, the user can intuitively understand the precision of the location information provided by the terminal device for the application under the current settings.

In an implementation, when the location information precision is divided based on the administrative region levels, there may alternatively be no stop provided on the slider. In a specific implementation, the terminal device may define a plurality of continuous sections on the slider, and each section corresponds to one administrative region level. For example, when the location information precision includes five administrative region levels, the terminal device may divide the slider into five equal sections. Section definition results may not be displayed on the slider, and therefore the slider visible to the user has no difference from a common slider. The terminal device allows the user to drag the knob to any position on the slider, and when the terminal device detects that the user drags the knob into a section, the terminal device provides the application with location information matching an administrative region level corresponding to this section.

Figure 15:
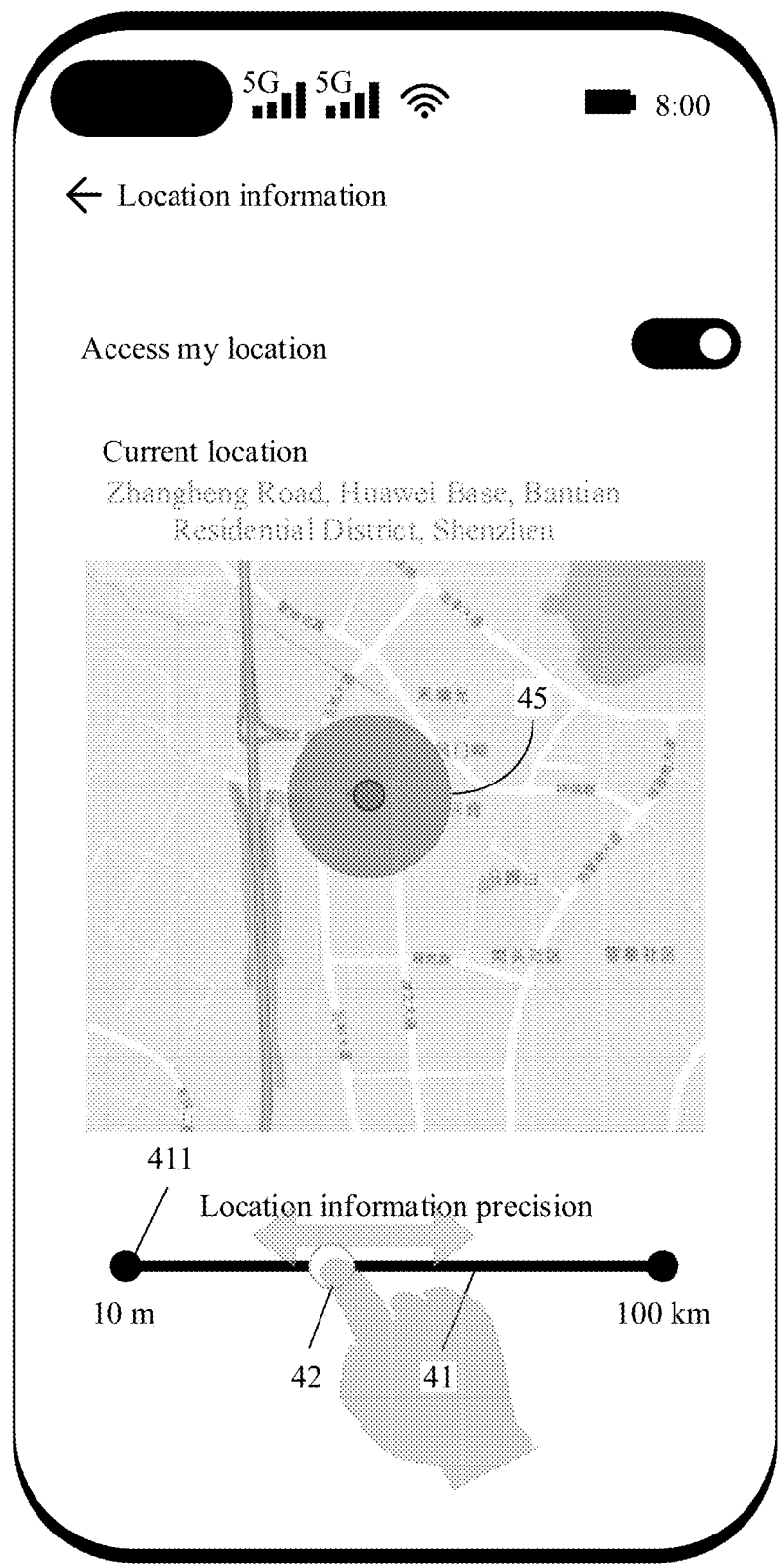
FIG. 15 is a schematic diagram of showing a location information precision in a location information settings page according to an embodiment of this disclosure.

In an implementation, as shown in FIG. 15, to help the user intuitively see a location information precision currently set when dragging the knob 42, the terminal device may display, in the map window, a circular shaded region 45 with the actual location as a center and with the distance precision of the location information precision as a radius. The circular shaded region 45 may represent the error range of the location information provided by the terminal device for the application under the current location information precision. It may be understood that when the terminal device detects that the user increases the location information precision, the radius of the circular shaded region becomes smaller, and when the terminal device detects the user lowers the location information precision, the radius of the circular shaded region becomes larger.

In an implementation, the location information settings page may include only some of the elements in FIG. 12, for example, only the permission switch 43 and the slider assembly 40, or only the permission switch 43 and the map window 44, or only the slider assembly 40, and so on.

For example, as shown in FIG. 16, when the location information page only includes the slider assembly 40, the slider 41 may further be set vertically according to the shape of the display, and the location information precision corresponding to the slider 41 gradually increases from bottom to top. The bottom end of the slider corresponds to disabling the location information permission, and the top end of the slider corresponds to the highest location information precision. In this way, based on the user's operation on the slider assembly 40, the terminal device can not only adjust the precision of the location information provided for the application, but can also enable or disable the location information permission for the application. For example, when the terminal device detects that the user drags the knob 42 on the slider 41 from bottom to top, the precision of the location information provided by the terminal device for the application is increased; when the terminal device detects that the user drags the knob 42 on the slider 41 from top to bottom, the precision of the location information provided by the terminal device for the application is reduced; when the terminal device detects that the user drags the knob 42 to the bottom end of the slider 41, the terminal device disables the location information permission for the corresponding application; and when the terminal device detects that the user drags the knob 42 up to leave the bottom end of the slider 41, the terminal device enables the location information permission for the corresponding application.

Figure 17A:
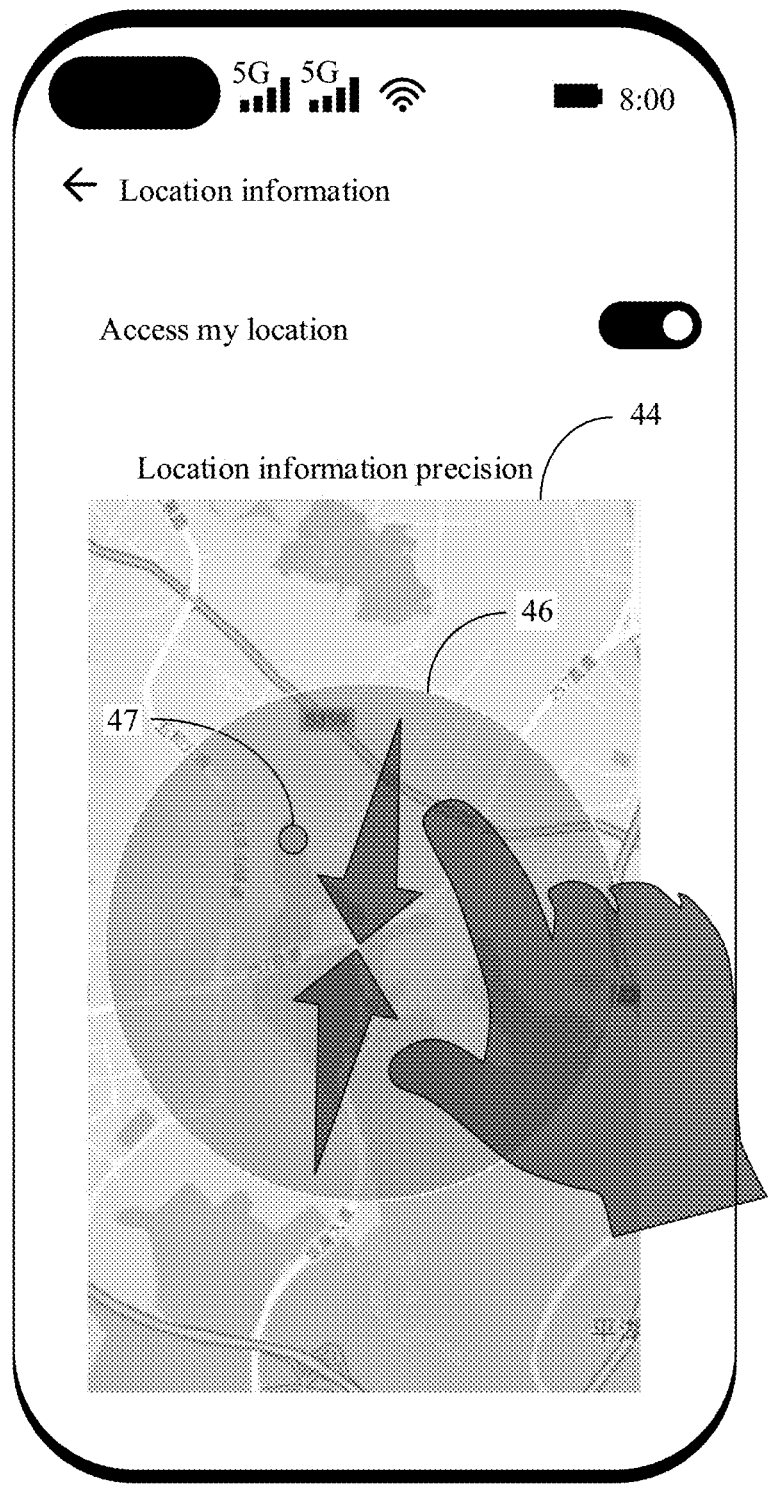
FIG. 17(a), FIG. 17(b), and FIG. 17(c) are a schematic diagram of adjusting a location information precision in a map window according to an embodiment of this disclosure.
Figure 17B:
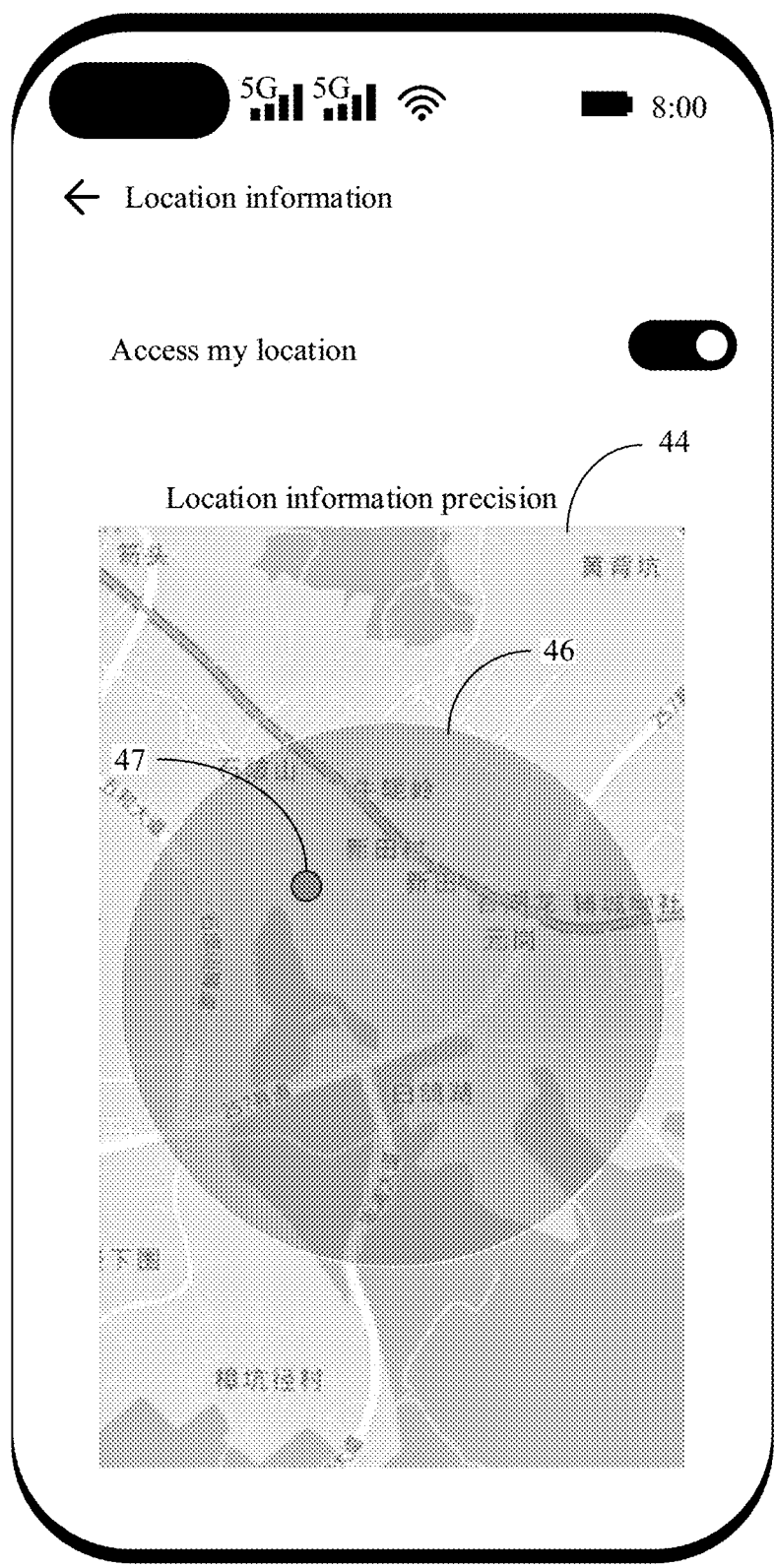
Figure 17C:
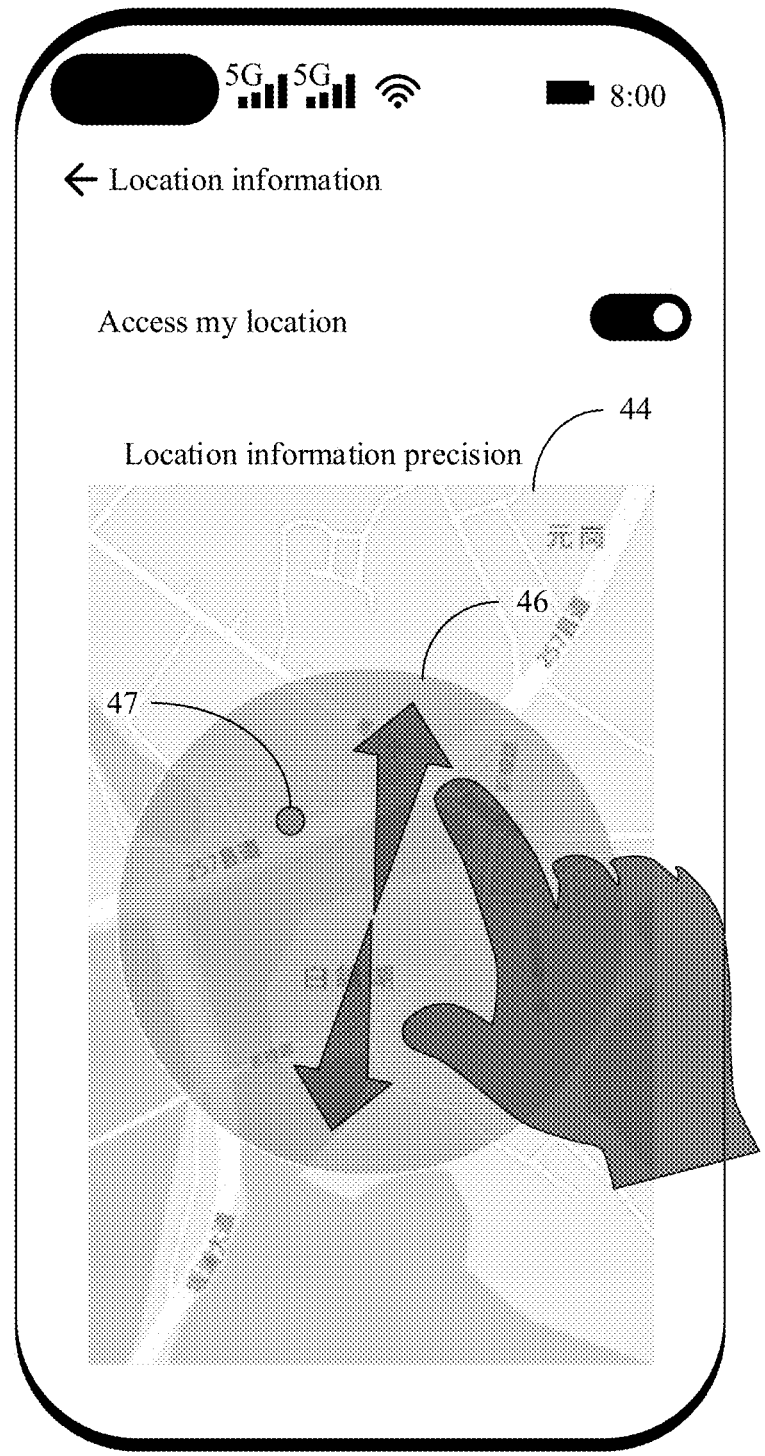

In an implementation, the location information precision may alternatively be a geographic range precision. FIG. 17(*a*), FIG. 17(*b*), and FIG. 17(*c*) are a schematic diagram of adjusting a location information precision shown in an embodiment of this disclosure. As shown in FIG. 17(*a*), FIG. 17(*b*), and FIG. 17(*c*), in the location information settings page, the map window 44 may include a shaded region 46 for indicating the location information precision. The shaded region 46 may be a circular shaded region, a square shaded region, or another shape, which is not limited in this embodiment of this disclosure. Preferably, the shaded region 46 may be a region with a fixed pixel size on the display of the terminal device, and a display area thereof does not change as the map scale is enlarged or reduced.

In this embodiment of this disclosure, the meaning of the shaded region 46 is as follows: When the location information permission for the application is enabled, if the application requests location information from the terminal device, location coordinates or a location coordinate range provided by the terminal device for the application may be distributed within this shaded region 46.

In this embodiment of this disclosure, the actual location 47 of the terminal device may be within the shaded region 46 or may be outside the shaded region 46. When the actual location 47 of the terminal device is within the shaded region 46, the actual location 47 of the terminal device may be at the center of the shaded region 46 or may deviate from the center of the shaded region 46, which is not limited in this embodiment of this disclosure.

In the location information settings page shown in FIG. 17(*a*), FIG. 17(*b*), and FIG. 17(*c*), the terminal device allows the user to perform a two-finger zoom operation in the map window 44. The two-finger zoom operation may include a two-finger zoom-in operation and a two-finger zoom-out operation. The two-finger zoom-in operation is a slide operation in which the user gradually spreads two fingers apart on the display, and the two-finger zoom-out operation is a slide operation in which the user pinches the two fingers together on the display. When the terminal device detects that the user performs the two-finger zoom-in operation in the map window 44, the scale of the map is increased, that is, the map is zoomed in. In this case, a map range covered by the shaded region 46 becomes smaller, and the corresponding precision of the location information provided by the terminal device for the application is increased. When the terminal device detects that the user performs the two-finger zoom-out operation in the map window 44, the scale of the map is reduced, that is, the map is zoomed out. In this case, a map range covered by the shaded region 46 becomes larger, and the corresponding precision of the location information provided by the terminal device for the application is reduced. The scale of the map represents a ratio of the length of a line segment on the map to the actual length of a corresponding line segment on the ground in real space.

Figure 18:
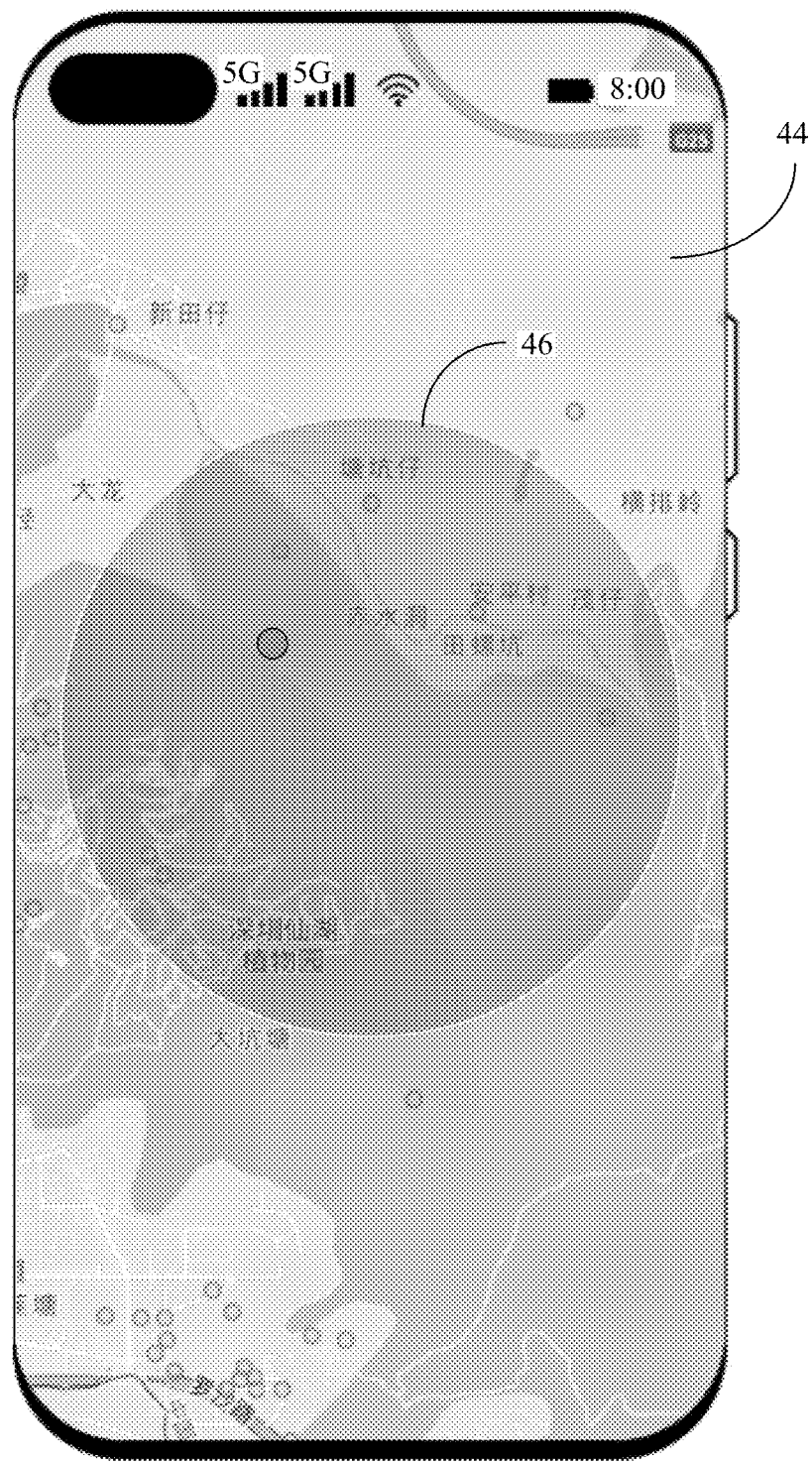
FIG. 18 is a schematic diagram of another map window according to an embodiment of this disclosure.

FIG. 18 is a schematic diagram of another map window shown in an embodiment of this disclosure. As shown in FIG. 18, the map window 44 may be displayed in full screen on the display.

In an implementation, the terminal device may allow the user to set the map window 44 to be displayed in full screen through a specific operation, including but not limited to: tapping the map window, double-tapping the map window, long-pressing the map window, or the like. For example, when the terminal device detects that the user taps the map window 44, the map window 44 is enlarged for full-screen display. When the map window 44 is displayed in full screen, the area of the map window 44 becomes larger, displaying a larger map region to the user, which can provide more information for the user, and facilitates the user in performing operations such as two-finger zooming or swiping. In addition, the terminal device may further allow the user to exit the map window 44 from the full-screen display through a specific operation, including but not limited to: tapping the map window, double-tapping the map window, long-pressing the map window, or the like. For example, when the terminal device detects that the user double-taps the map window 44 displayed in full screen, the map window 44 exits from the full-screen display.

In another implementation, the location information settings page may be directly implemented as a full-screen displayed map window 44. In this way, when the user enters the location information settings page, operations such as two-finger zooming can be directly performed on the map, to adjust the location information precision for the application.

FIG. 19 is another schematic diagram of adjusting a location information precision shown in an embodiment of this disclosure. As shown in FIG. 19, the terminal device further allows the user's finger to perform a drag operation 48 in the map window to pan the map. For example, in the map window displayed in full screen or not displayed in full screen, when the terminal device detects that the user drags the map with one finger in the map window, the map can be panned in a dragging direction of the user's finger, thereby changing the range covered by the shaded region, and changing the position of the actual location of the terminal device in the shaded region, or panning the actual location of the terminal device out of the shaded region. In this way, the location information precision can also be adjusted by panning the map. Specifically, the smaller the distance between the actual location of the terminal device and the center of the shaded region, the higher the location information precision; and the larger the distance between the actual location of the terminal device and the center of the shaded region, the lower the location information precision.

FIG. 20 is a schematic diagram of another location information settings page shown in an embodiment of this disclosure. As shown in FIG. 20, the location information settings page may include a circular color block 51 with an adjustable radius. Different radii of the circular color block 51 correspond to different location information precisions. For example, a larger radius corresponds to a lower location information precision, and a smaller radius corresponds to a higher location information precision. The terminal device allows the user to adjust the radius of the circular color block 51 through a specific operation, including but not limited to: a two-finger zoom operation on the circular color block 51, tapping the circular color block 51, double-tapping the circular color block 51, or the like. For example, when the terminal device detects that the user performs a two-finger zoom-in operation on the circular color block 51, the terminal device may follow the position of the user's fingers to increase the radius of the circular color block 51, and a corresponding precision of the location information provided by the terminal device for the application is reduced; when the terminal device detects that the user performs a two-finger zoom-out operation on the circular color block 51, the terminal device may follow the position of the user's fingers to reduce the radius of the circular color block 51, and a corresponding precision of the location information provided by the terminal device for the application is increased.

In an implementation, as shown in FIG. 20, the terminal device may display a location information precision corresponding to the current radius of the circular color block 51 in text or other forms within the circular color block 51 or outside the circular color block 51. For example, a precision such as 10 m (meters), 100 m, 1 km (kilometers), or 10 km is displayed in text.

Figure 21A:
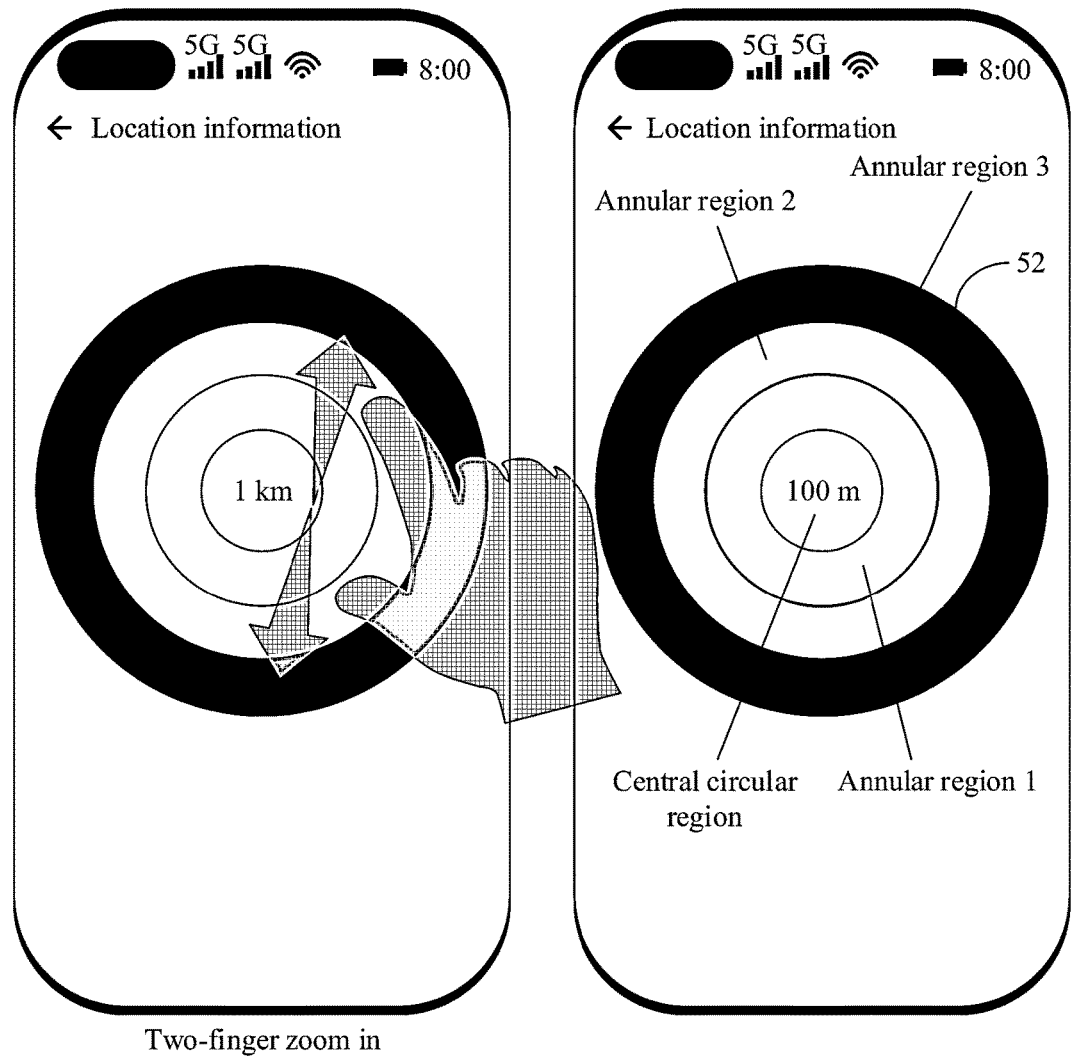
FIG. 21(a) and FIG. 21(b) are a schematic diagram of another location information settings page according to an embodiment of this disclosure.
Figure 21B:
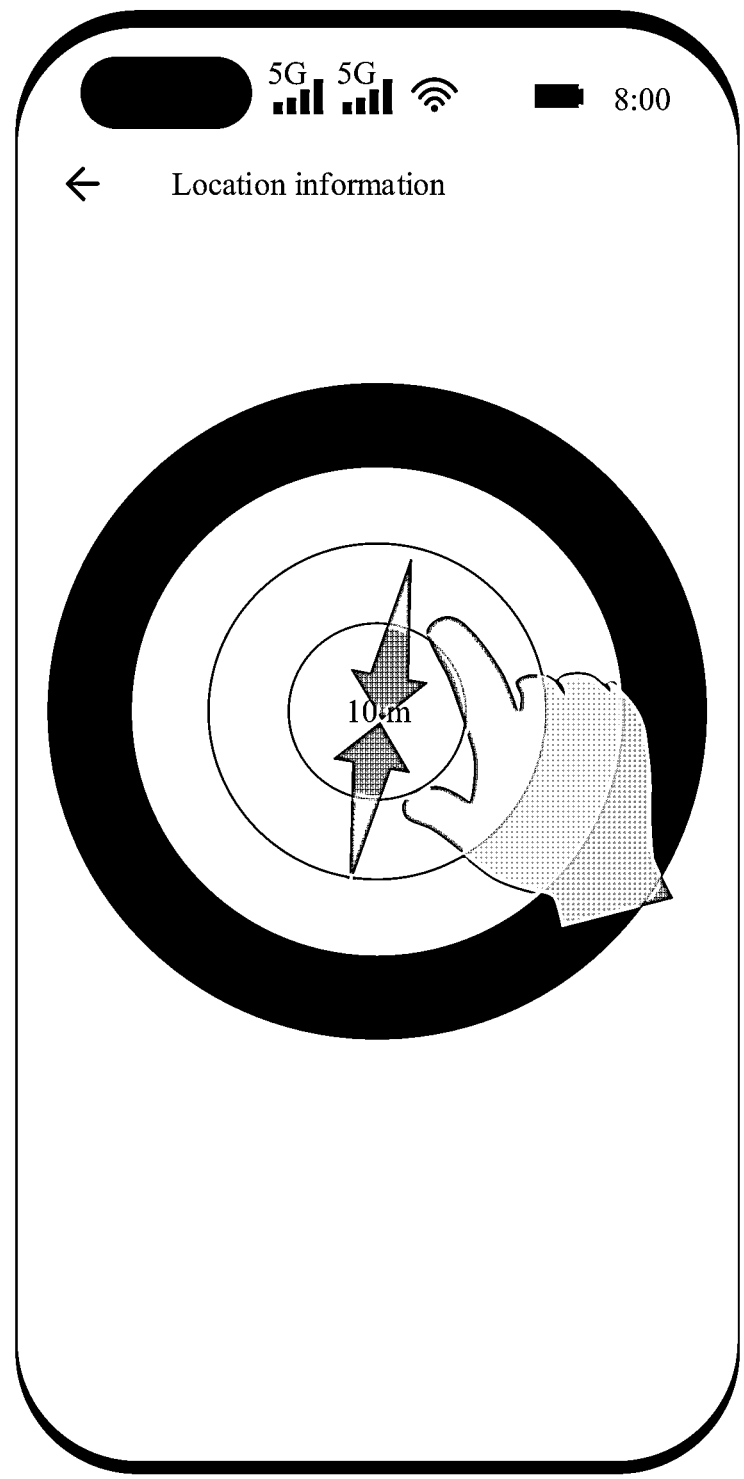

FIG. 21(a) and FIG. 21(b) are a schematic diagram of another location information settings page shown in an embodiment of this disclosure. As shown in FIG. 21(a) and FIG. 21(b), the location information settings page may include a circular color block 52 with a fixed radius. The circular color block 52 is radially divided in sequence into a central circular region and at least one annular region concentric with the central circular region that are located in different radius intervals, and each region has a different color. For example, when the radius of the circular color block 52 is 400 pixels, the terminal device may use a region with a radius of 0 to 100 as the central circular region, a region with a radius of 100 to 200 as the annular region 1, a region with a radius of 200 to 300 as the annular region 2, and a region with a radius of 300 to 400 as the annular region 3. Further, the terminal device corresponds each region to one location information precision. For example, the central circular region may correspond to a location information precision of 10 m, the annular region 1 may correspond to a location information precision of 100 m, the annular region 2 may correspond to a location information precision of 1 km, and the annular region 3 may correspond to a location information precision of 10 km.

Based on the location information settings page shown in FIG. 21(a) and FIG. 21(b), the terminal device may lighten or darken the central circular region or annular region to display to the user the precision of the location information provided by the terminal device for the application (in FIG. 21(a) and FIG. 21(b), the central circular region or annular region is lightened in white and darkened in other colors). In an implementation, the terminal device lightens at least one region from the inside to the outside, and uses a location information precision corresponding to the outermost lightened region as the precision of the location information provided for the application. For example, when only the central circular region is lightened, it indicates that the precision of the location information provided by the terminal device for the application is 10 m; when the central circular region and the annular region 1 are lightened, it indicates that the precision of the location information provided by the terminal device for the application is 100 m; when the central circular region, the annular region 1, and the annular region 2 are lightened, it indicates that the precision of the location information provided by the terminal device for the application is 1 km; and when the central circular region, the annular region 1, the annular region 2, and the annular region 3 are lightened, it indicates that the precision of the location information provided by the terminal device for the application is 10 km.

Further, the terminal device allows the user to sequentially lighten the regions from the inside to the outside or sequentially darken the regions from the outside to the inside through a specific operation, including but not limited to, a two-finger zoom operation on the circular color block 52, tapping the circular color block 52 to be lightened or darkened, double-tapping the circular color block 52 to be lightened or darkened, or the like. For example, when the terminal device detects that the user starts to perform a two-finger zoom-in operation on a lightened region on the circular color block 52, the terminal device may follow the user's fingers to expand, from the inside to the outside, the lightened region to regions passed by the user's fingers; and when the terminal device detects that the user performs a two-finger zoom-out operation on the lightened region on the circular color block 52, the terminal device may follow the user's fingers to sequentially darken, from the outside to the inside, regions outside the region in which the user's fingers are located. In this way, the terminal device can adjust, with a gradient based on the user's operation on the circular color block 52, the precision of the location information provided to the application, and intuitively present an adjustment result to the user by using lightened and darkened states of the regions.

Figure 22A:
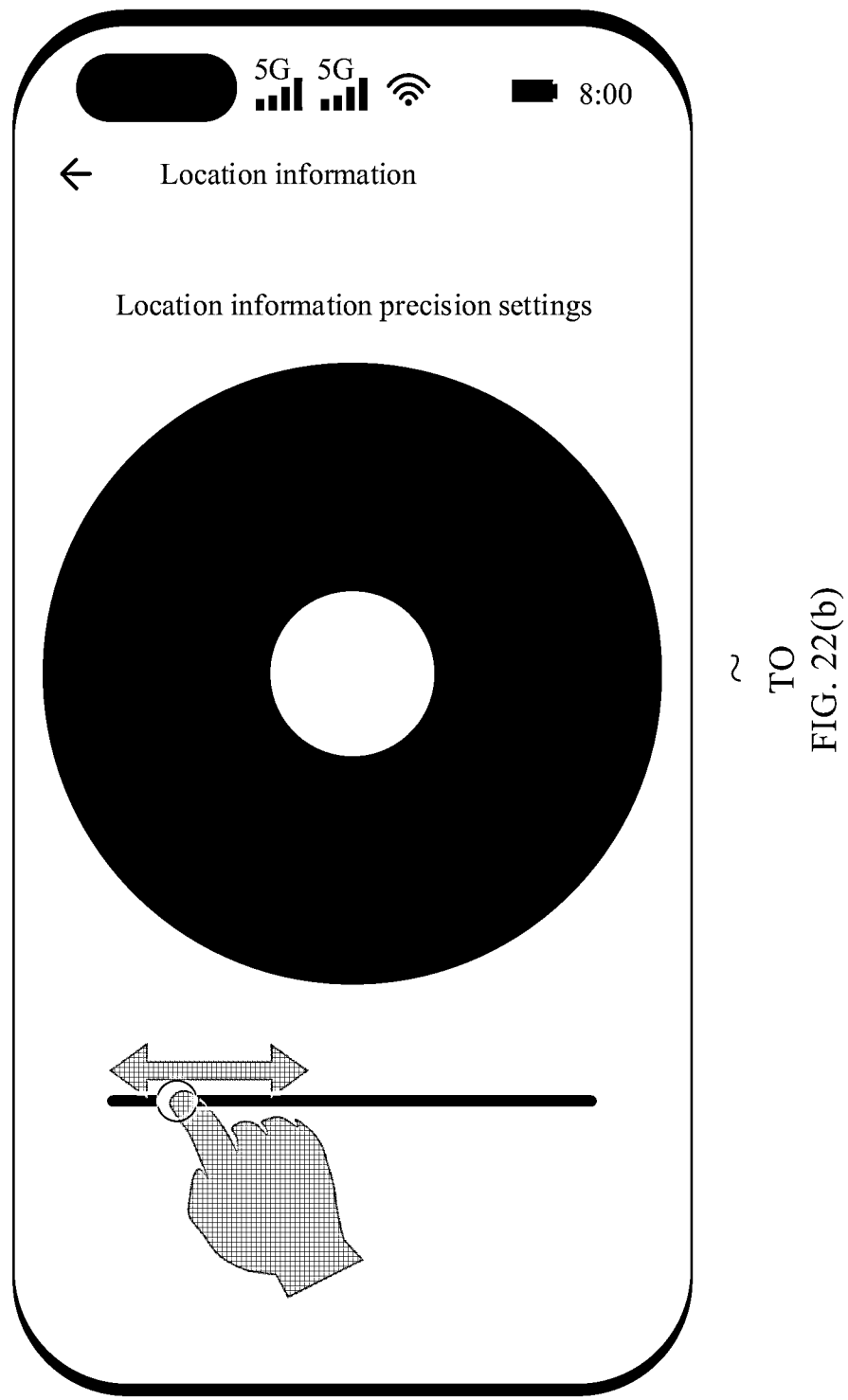
FIG. 22(a), FIG. 22(b), and FIG. 22(c) are a schematic diagram of another location information settings page according to an embodiment of this disclosure.
Figure 22B:
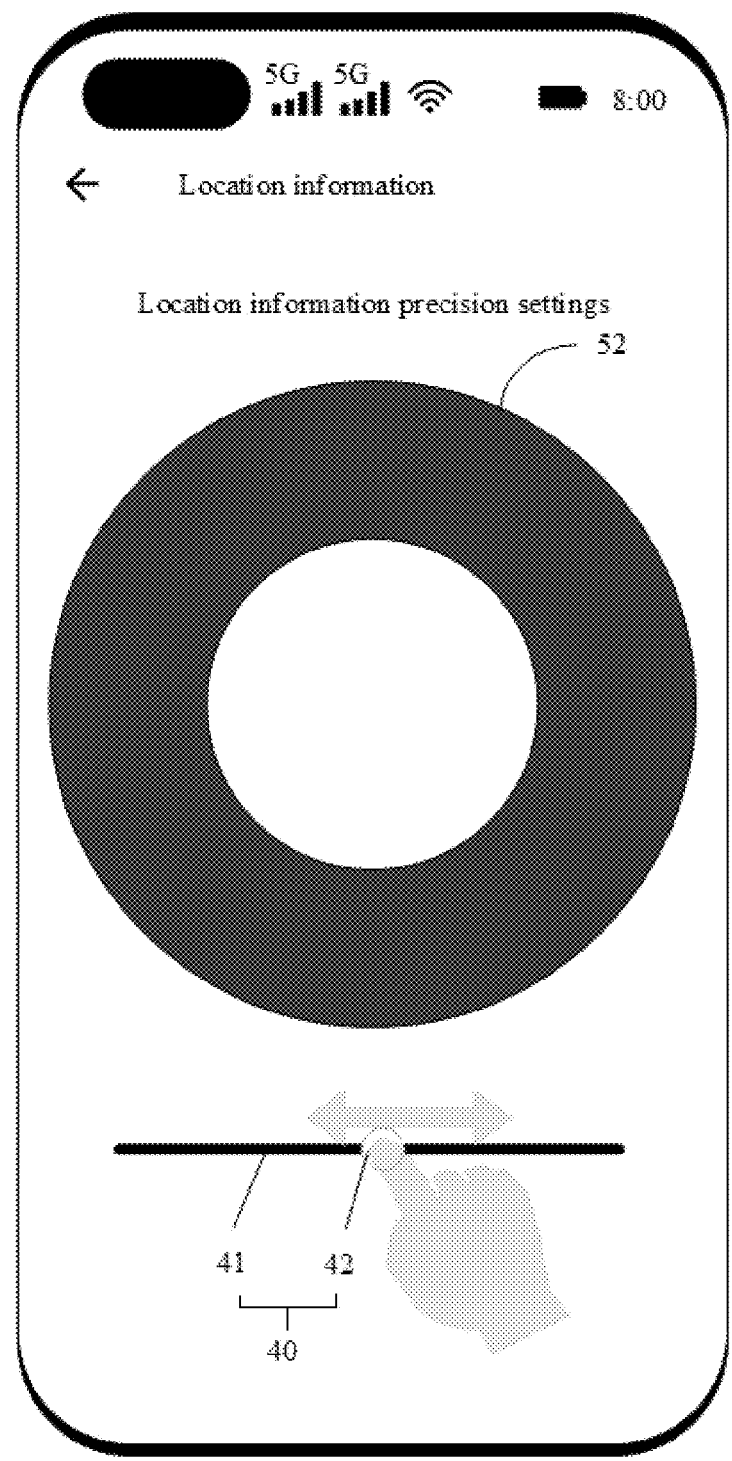
Figure 22C:
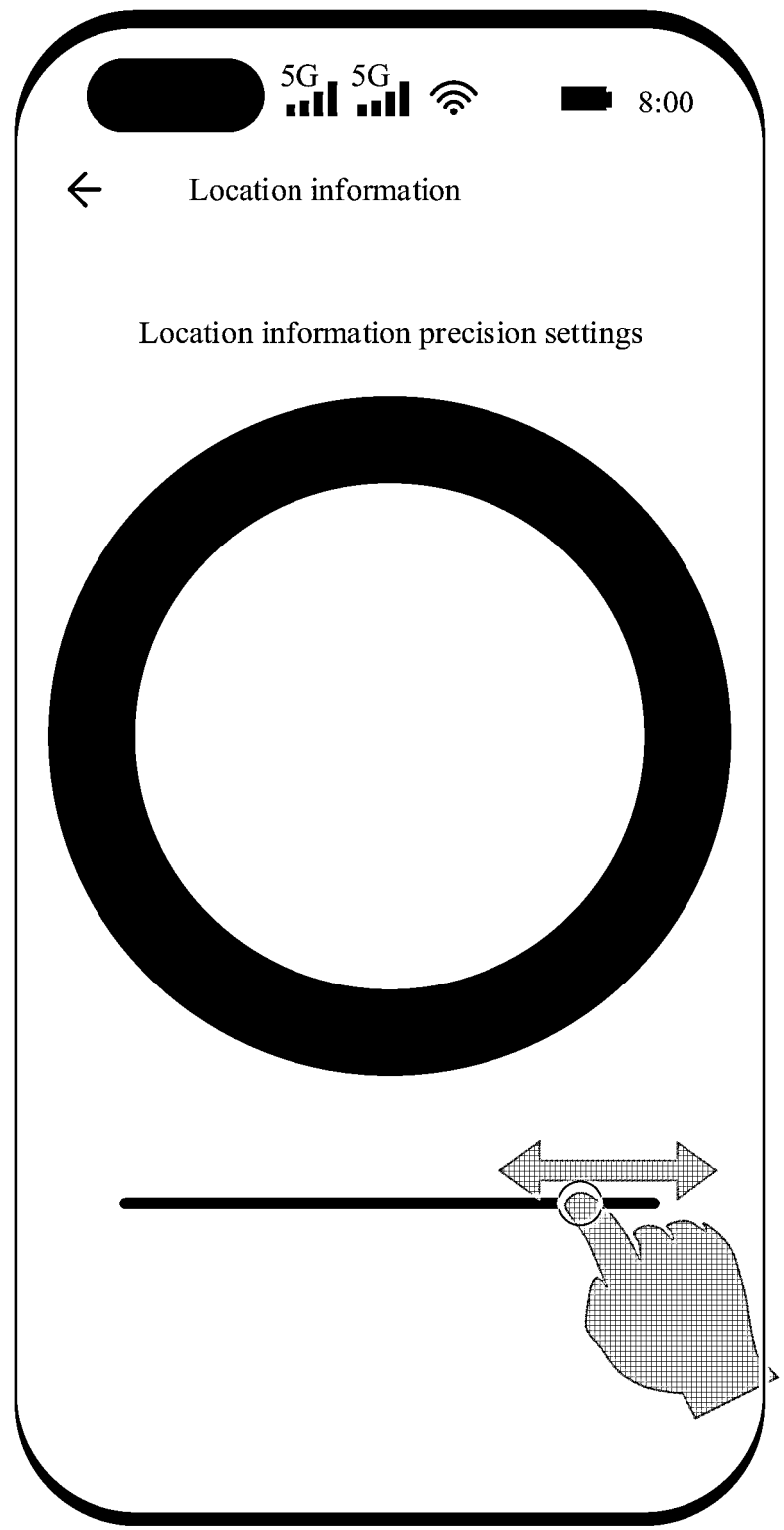

FIG. 22(a), FIG. 22(b), and FIG. 22(c) are a schematic diagram of another location information settings page shown in an embodiment of this disclosure. As shown in FIG. 22(b), the location information settings page may further include a slider assembly 40 in addition to a circular color block 52 shown in FIG. 22(b). Different positions on a slider 41 correspond to different pixel lengths. For example, the slider 41 is horizontally arranged. A radius corresponding to the slider 41 is gradually increased from left to right, a pixel length corresponding to the leftmost end of the slider 41 is 0 pixels, and a pixel length corresponding to the rightmost end of the slider 41 is equal to a radius of the circular color block 52. The terminal device lightens a circular region at the center of the circular color block 52 with a pixel length corresponding to a position of a knob 42 as a radius. In this way, when the terminal device detects that the user drags the knob 42 to the right, the radius of the lightened region of the circular color block 52 is increased, and a corresponding precision of the location information provided by the terminal device for the application is decreased; and when the terminal device detects that the user drags the knob 42 to the left, the radius of the lightened region of the circular color block 52 is reduced, and the corresponding precision of the location information provided by the terminal device for the application is increased.

Figure 23:
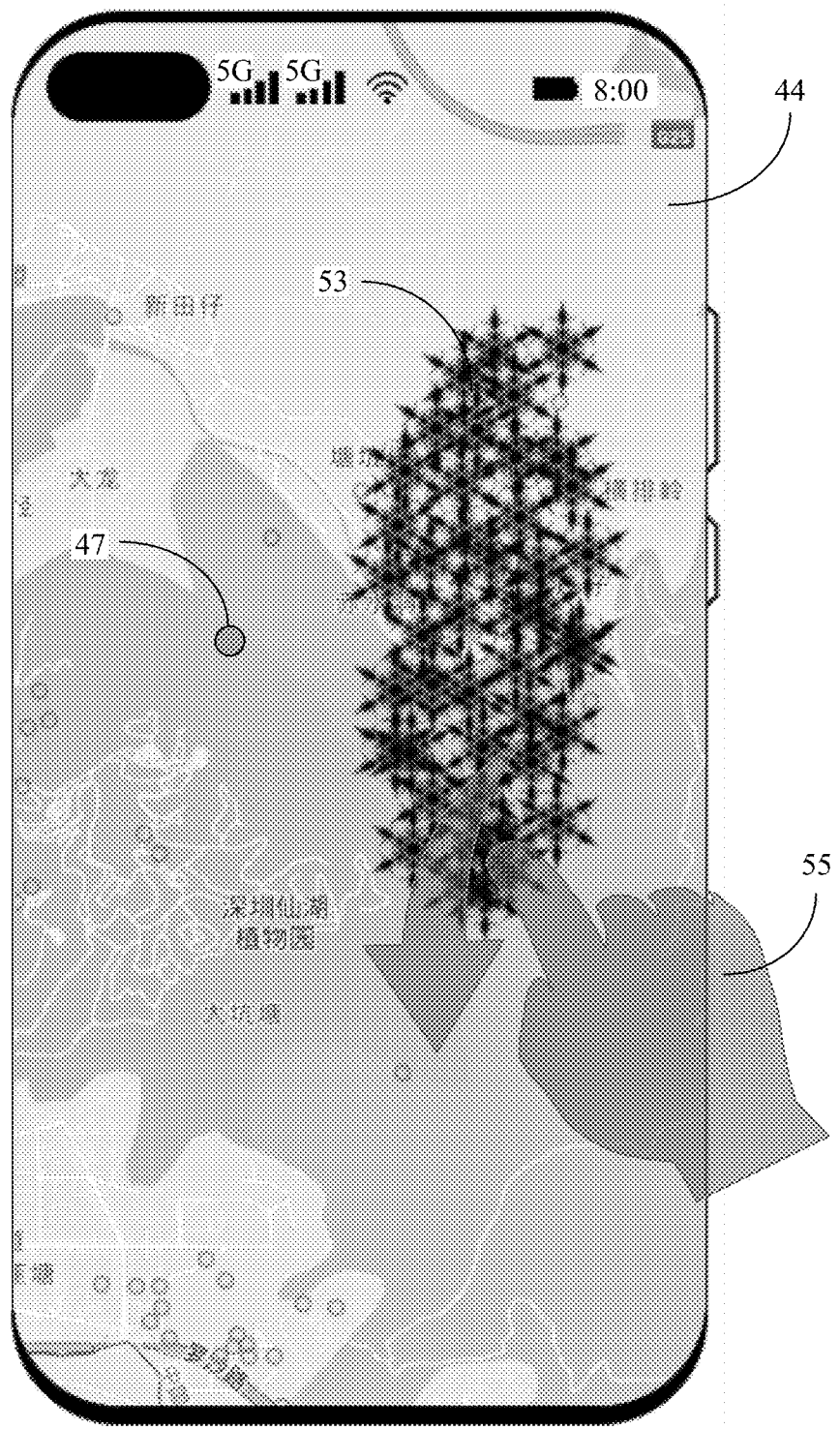
FIG. 23 is a schematic diagram of another location information settings page according to an embodiment of this disclosure.

In an implementation, the terminal device may further allow the user to customize location information of a specified geographic range provided by the terminal device for the application. FIG. 23 correspondingly provides a schematic diagram of an information settings page. As shown in FIG. 23, to facilitate the user's operation, the location information page may include a map window 44 displayed in full screen, and an actual location 47 of the terminal device is displayed on the map with a marker such as an arrow or a dot. The map window 44 may alternatively not be displayed in full screen, which is not limited herein. The terminal device allows the user to perform a one-finger or multi-finger smudge operation 55 in the map window 44, and the terminal device may use a specific pattern to cover a region on the map that is smudged by the user's finger. In this way, after the user performs the smudge operation, the map contains a covered region 53 (with the specific pattern) and an uncovered region.

In this embodiment of this disclosure, the terminal device may configure the meaning of the covered region 53 and the uncovered region in two manners.

In a first manner, when an application requests location information from the terminal device, the terminal device may provide a geographic range corresponding to the covered region 53 as the location information of the terminal device for the application; or the terminal device may select geographic coordinates (or a coordinate range) from a geographic range corresponding to the covered region 53, and provide the geographic coordinates for the application as the location information of the terminal device. In this manner, the covered region 53 may be a region that is determined by the user through a finger smudge operation 55 on the map and that the terminal device is expected to provide for the application as geographic location information. In this way, the terminal device may provide only location information of a specific geographic range for the application according to the will of the user, instead of providing location information for the application according to the actual location 47 of the terminal device, which helps protect user privacy.

In a second manner, when an application requests location information from the terminal device, the terminal device does not provide a geographic range corresponding to the covered region 53 as the location information of the terminal device for the application, but selects geographic coordinates (or a coordinate range) from the uncovered region, and provides the geographic coordinates for the application as the location information of the terminal device. In this manner, the covered region 53 may be a region that is determined by the user through a finger smudge operation 55 on the map and that the terminal device is not expected to provide for the application as geographic location information, such as a region of the user's home or company. In this way, the terminal device may not provide the covered region 55 for the application as the location information according to the will of the user, which helps protect user privacy.

Figure 24:
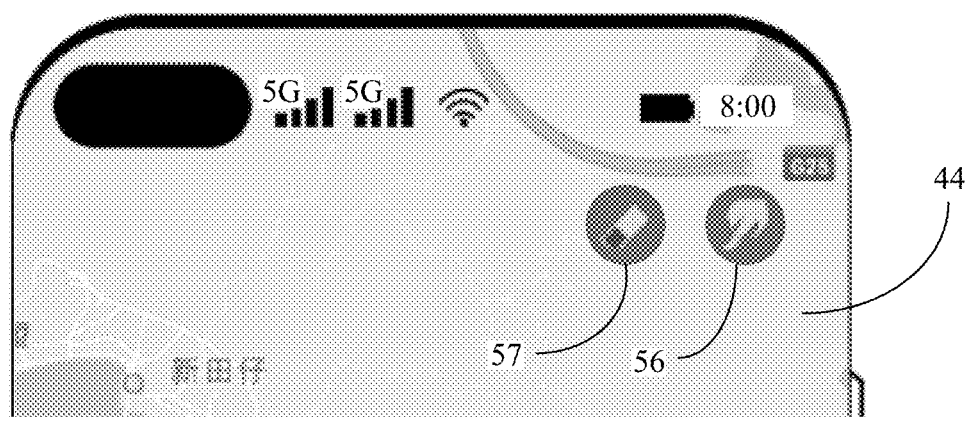
FIG. 24 is a schematic diagram of a location information settings page including a smudge icon and an erase icon according to an embodiment of this disclosure.

In an example, as shown in FIG. 24, the map window 44 may include a smudge icon 56. When the terminal device detects that the user taps the smudge icon 56, the map window 44 enters a smudge mode. In this case, the terminal device starts to detect a region in which the user's finger performs a tap or swipe operation on the display, and uses a specific pattern to cover the detected region. In addition, the map window 44 may further include an erase icon 57. When the terminal device detects that the user taps the erase icon 57, the map window 44 enters an erase mode. In this case, the terminal device starts to detect a region in which the user's finger performs a tap or swipe operation on the display, and if the region in which the user taps or swipes is a previously covered region, erases the corresponding pattern to restore the region into an uncovered region. In this way, the terminal device can freely adjust the covered region based on the user's operation in the smudge mode and the erase mode, thereby improving the flexibility of setting the covered region.

Figure 25:
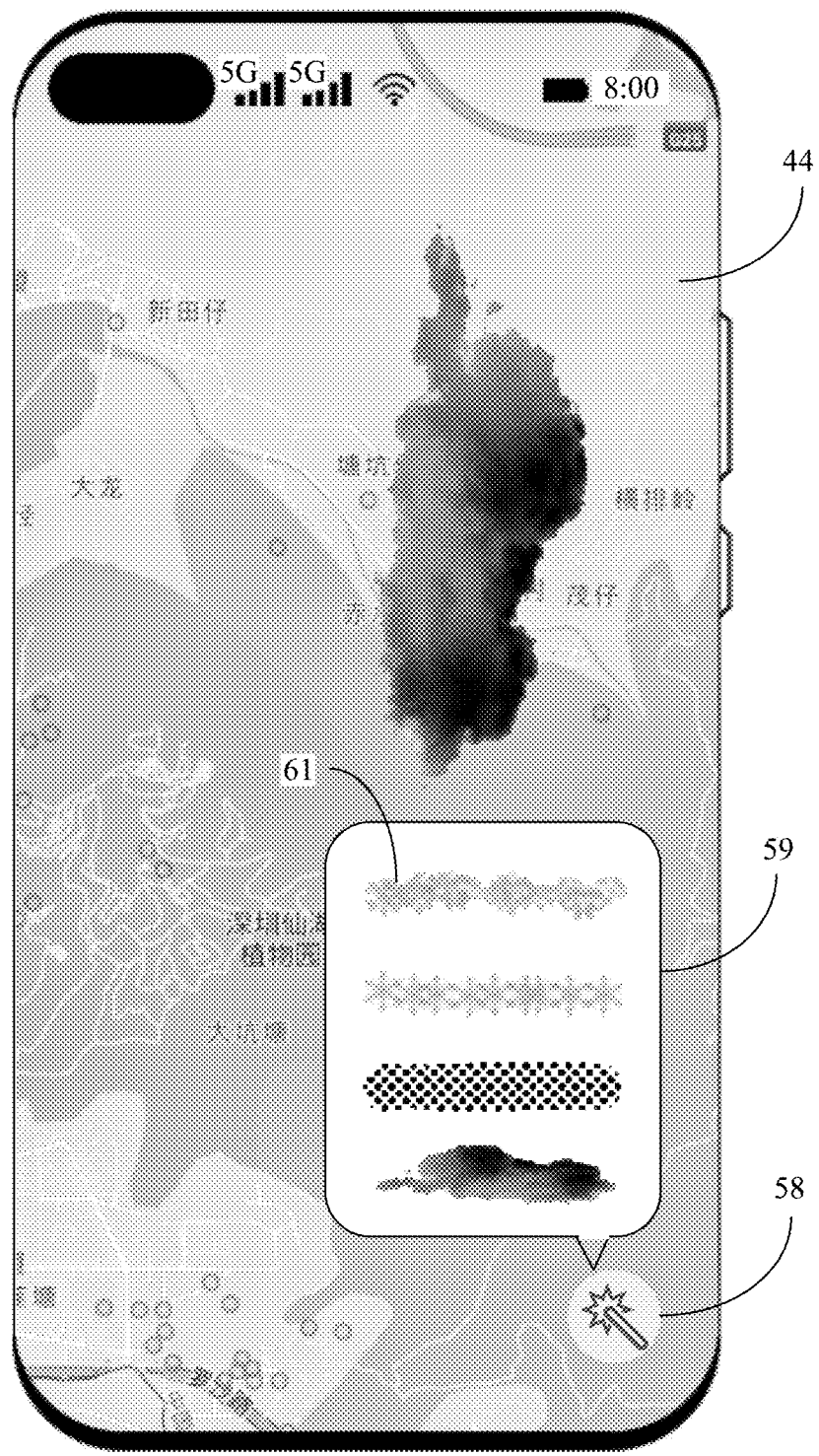
FIG. 25 is a schematic diagram of a location information settings page including a visual style icon according to an embodiment of this disclosure.

In an example, the terminal device further allows the user to select different patterns to implement the smudge process. As shown in FIG. 25, the map window may include a visual style icon 58. When the terminal device detects that the user taps the visual style icon 58, a visual style dialog box 59 pops up, and the visual style dialog box 59 may display graphical examples 61 of various patterns that can be provided by the terminal device. When the terminal device detects that the user taps a graphical example 61 of one of the patterns, the terminal device uses the corresponding pattern as the pattern subsequently used in the smudge mode.

In this embodiment of this disclosure, the pattern may include a solid color pattern or a non-solid color pattern. The solid color pattern may be, for example, a color bar including any one or more colors. The non-solid color pattern may, for example, include any geometric element, skeuomorphic element, graffiti, or the like. For example, a pattern shown in FIG. 23 is a snowflake pattern, and a pattern shown in FIG. 25 is a dark cloud pattern, which is not limited in this embodiment of this disclosure.

Figure 26:
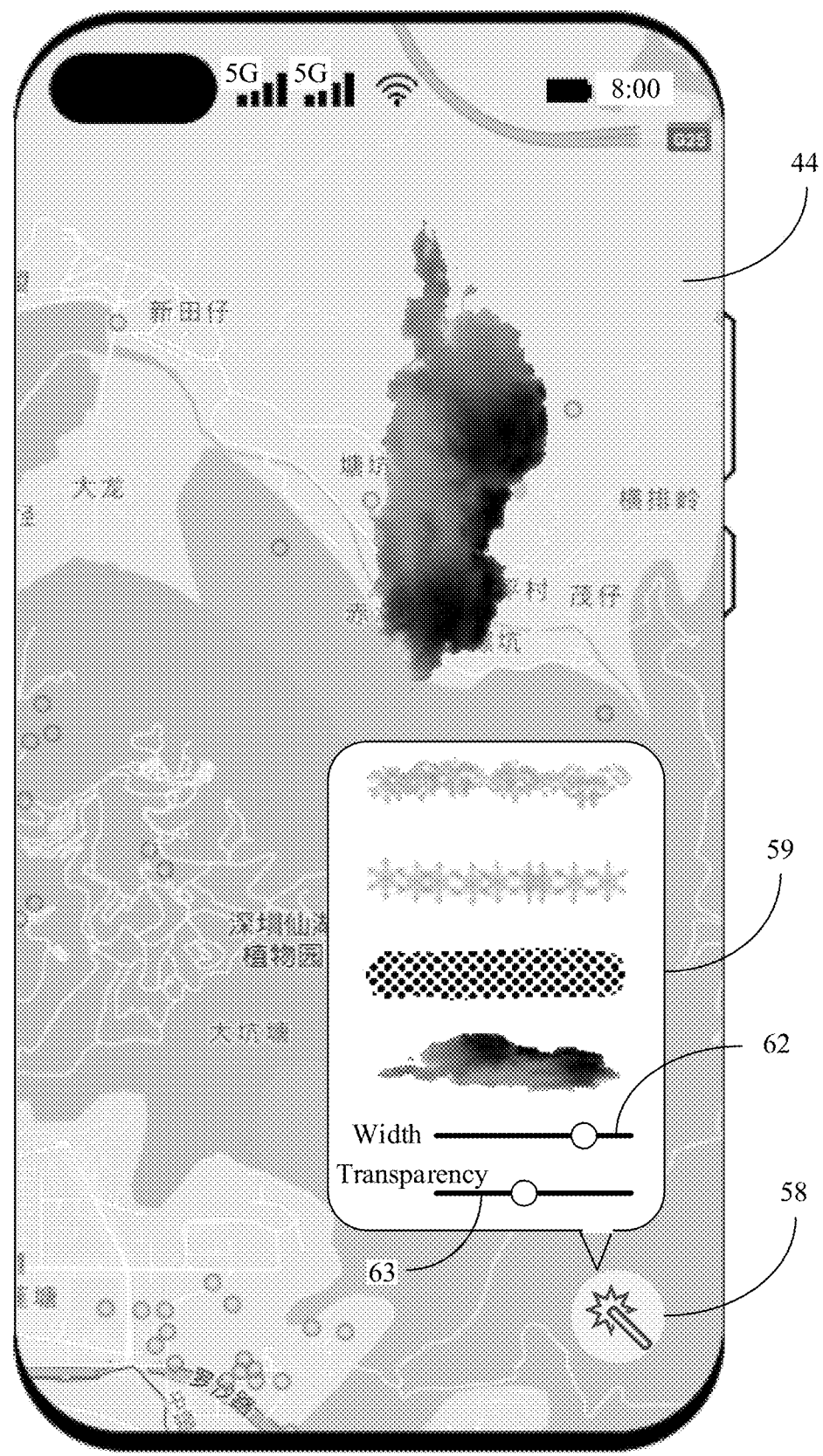
FIG. 26 is a schematic diagram of another location information settings page including a visual style icon according to an embodiment of this disclosure.

In addition, the visual style dialog box 59 may further allow the user to set a width of the pattern. As shown in FIG. 26, the visual style dialog box 59 may further include a slider assembly 62, and the slider assembly 62 may be configured to adjust the width of the pattern. For example, the slider assembly is horizontally arranged. When the terminal device detects that the user drags the knob of the slider to the right, the width of the pattern is increased, and when the terminal device detects that the user drags the knob of the slider to the left, the width of the pattern is reduced.

In addition, the visual style dialog box 59 allows the user to set a transparency of the pattern. As shown in FIG. 26, the visual style dialog box 59 may further include another slider assembly 63, and the slider assembly 63 may be configured to adjust the transparency of the pattern. For example, the slider assembly is horizontally arranged. When the terminal device detects that the user drags the knob of the slider to the right, the transparency of the pattern is increased, and when the terminal device detects that the user drags the knob of the slider to the left, the transparency of the pattern is reduced. In this embodiment of this disclosure, the terminal device may preset an adjustment range of the transparency, for example, between 0% (opaque) and 100% (completely transparent), which is not limited in this embodiment of this disclosure.

In the foregoing embodiments, the privacy settings page (for example, the location information settings page) of the application is an independent page. It may be understood that, to facilitate the user's operation and reduce the number of independent pages opened by the terminal device, the privacy settings page may alternatively be displayed directly as a dependent page in another page, or displayed in the form of a pop-up window. Next, the location information settings page is still used as an example, to provide an example description of the form of a non-independent page or a pop-up window of the privacy settings page.

In an embodiment, the terminal device allows the user to adjust the location information precision in the permission status page of the application. When the terminal device detects that the user taps the "Location information" option in the permission status page of the application, the "Location information" option may be expanded at the original position, and directly presents the location information settings page after expansion. The location information settings page, for example, includes elements such as a map window, a slider assembly, and/or a circular color block for setting an information precision.

Figure 27:
FIG. 27 is a schematic diagram of a location information settings page shown in a non-independent page according to an embodiment of this disclosure.

For example, as shown in FIG. 27, when the terminal device detects that the user taps 33 the "Location information" option in the permission status page of Weather, the "Location information" option expands downward at the original position, and a slider assembly 40, such as the slider assembly 40 shown in FIG. 11, is shown below the text of "Location information". In this way, without entering an independent location information settings page of Weather, the terminal device can adjust, based on the user's operation on the slider assembly 40, the precision of the location information provided by the terminal device for Weather.

Figure 28:
FIG. 28 is a schematic diagram of another location information settings page shown in a non-independent page according to an embodiment of this disclosure.

For example, as shown in FIG. 28, when the terminal device detects that the user taps 33 the "Location information" option in the permission status page of Weather, the "Location information" option expands downward at the original position, and a circular color block, such as the circular color block 51 shown in FIG. 20 or the circular color block 52 shown in FIG. 21(*a*), is shown below the text of "Location information". In this way, without entering an independent location information settings page of Weather, the terminal device can adjust, based on the user's operation on the circular color block, the precision of the location information provided by the terminal device for Weather.

Figure 29:
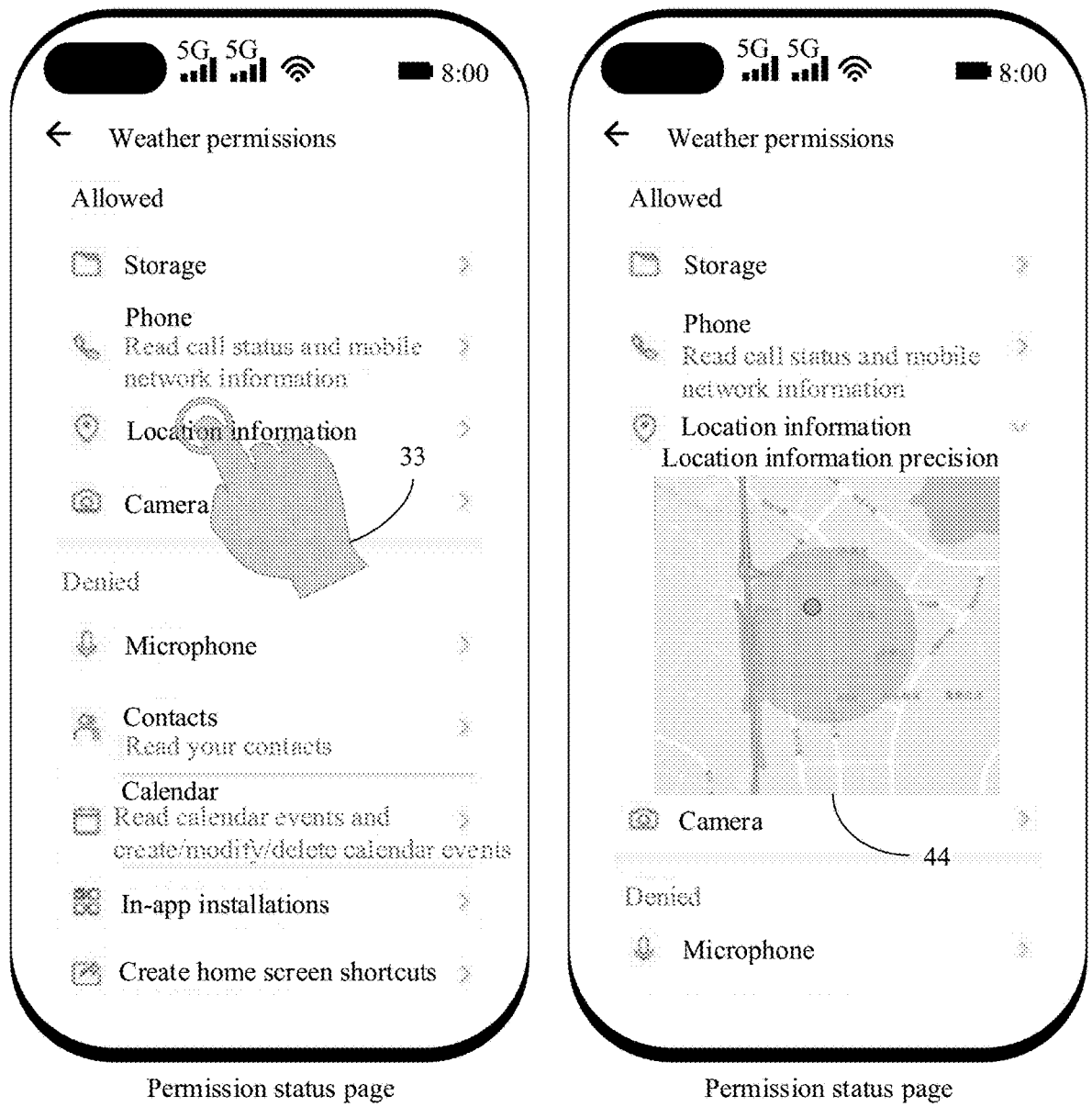
FIG. 29 is a schematic diagram of another location information settings page shown in a non-independent page according to an embodiment of this disclosure.

For example, as shown in FIG. 29, when the terminal device detects that the user taps 33 the "Location information" option in the permission status page of Weather, the "Location information" option expands downward at the original position, and a map window 44, such as the map window 44 shown in FIG. 15, is shown below the text of "Location information". In this way, without entering an independent location information settings page of Weather, the terminal device can adjust, based on the user's operation on the map window 44, the precision of the location information provided by the terminal device for Weather.

In an embodiment, the terminal device allows the user to adjust the location information precision in the permission status page of the application. When the terminal device detects that the user taps the "Location information" option in the permission status page of the application, the terminal device may generate a pop-up window on the current page, and present, in the pop-up window, elements such as a map window, a slider assembly, and/or a circular color block for setting an information precision.

Figure 30:
FIG. 30 is a schematic diagram of a location information settings page shown in a pop-up window according to an embodiment of this disclosure.

For example, as shown in FIG. 30, when the terminal device detects that the user taps 33 the "Location information" option in the permission status page of Weather, the terminal device generates a pop-up window 64 at the bottom of the current page, and displays, in the pop-up window 64, a slider assembly 40, such as the slider assembly 40 shown in FIG. 11. In this way, without entering an independent location information settings page of Weather, the terminal device can adjust, based on the user's operation on the slider assembly 40, the precision of the location information provided by the terminal device for Weather.

Figure 31:
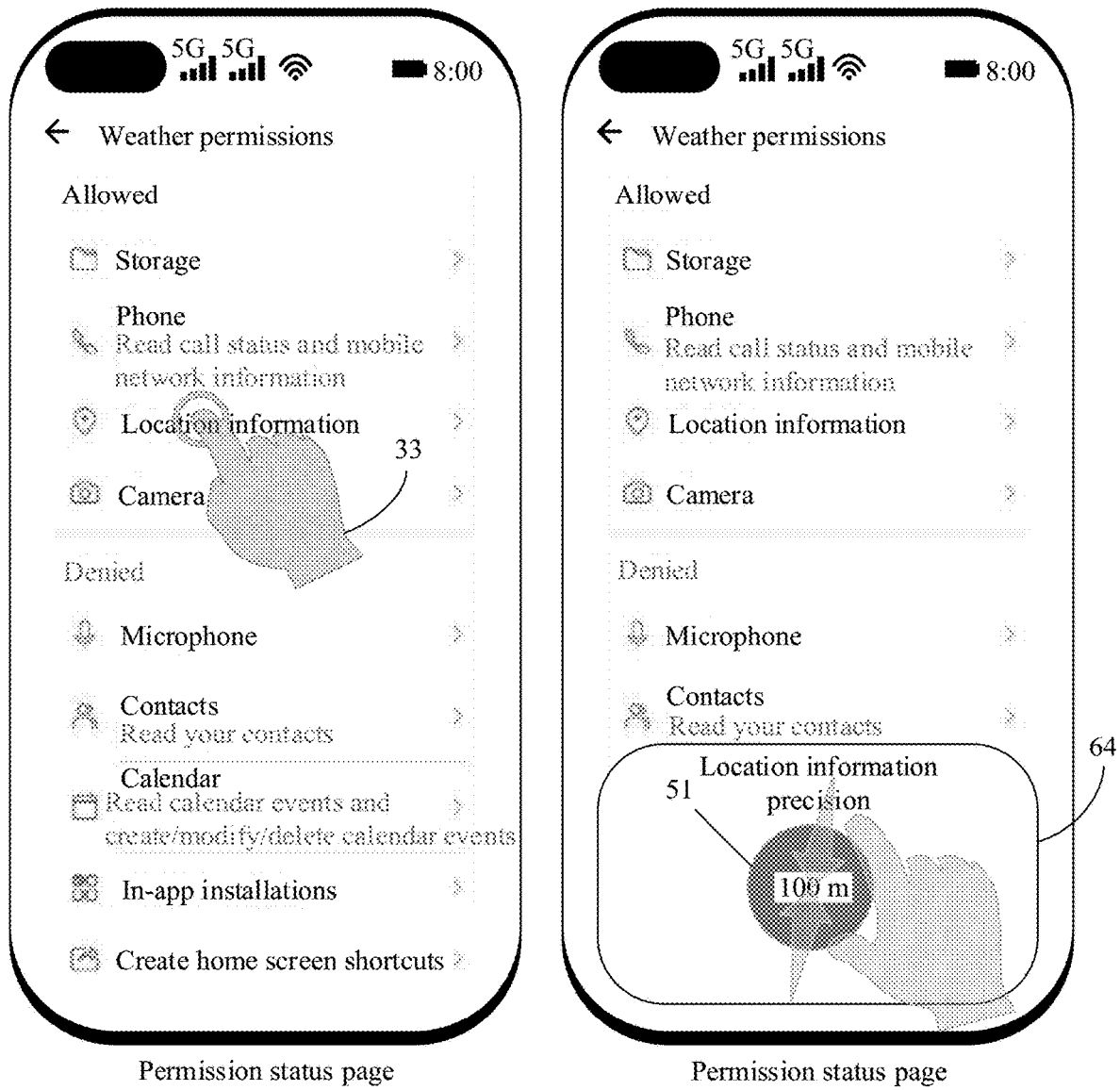
FIG. 31 is a schematic diagram of another location information settings page shown in a pop-up window according to an embodiment of this disclosure.

For example, as shown in FIG. 31, when the terminal device detects that the user taps 33 the "Location information" option in the permission status page of Weather, the terminal device generates a pop-up window 64 at the bottom of the current page, and displays, in the pop-up window 64, a circular color block, such as the circular color block 51 shown in FIG. 20 or the circular color block 52 shown in FIG. 21(*a*). In this way, without entering an independent location information settings page of Weather, the terminal device can adjust, based on the user's operation on the circular color block, the precision of the location information provided by the terminal device for Weather.

For example, as shown in FIG. 32, when the terminal device detects that the user taps 33 the "Location information" option in the permission status page of Weather, the terminal device generates a pop-up window 64 at the bottom of the current page, and displays, in the pop-up window 64, a map window 44, such as the map window 44 shown in FIG. 15. In this way, without entering an independent location information settings page of Weather, the terminal device can adjust, based on the user's operation on the map window 44, the precision of the location information provided by the terminal device for Weather.

In addition, for ease of closing the pop-up window, the pop-up window may further include a Close button or Cancel button 65, and the terminal device closes the pop-up window when detecting that the user taps the Close button or Cancel button 65.

In an embodiment, the terminal device allows the user to adjust the location information precision in the location information details page of the application. When the terminal device detects that the user taps an application name in the location information details page, the row of the application name may be expanded in the original position, and after expansion, elements such as a map window, a slider assembly, and/or a circular color block for setting an information precision are presented.

Figure 33:
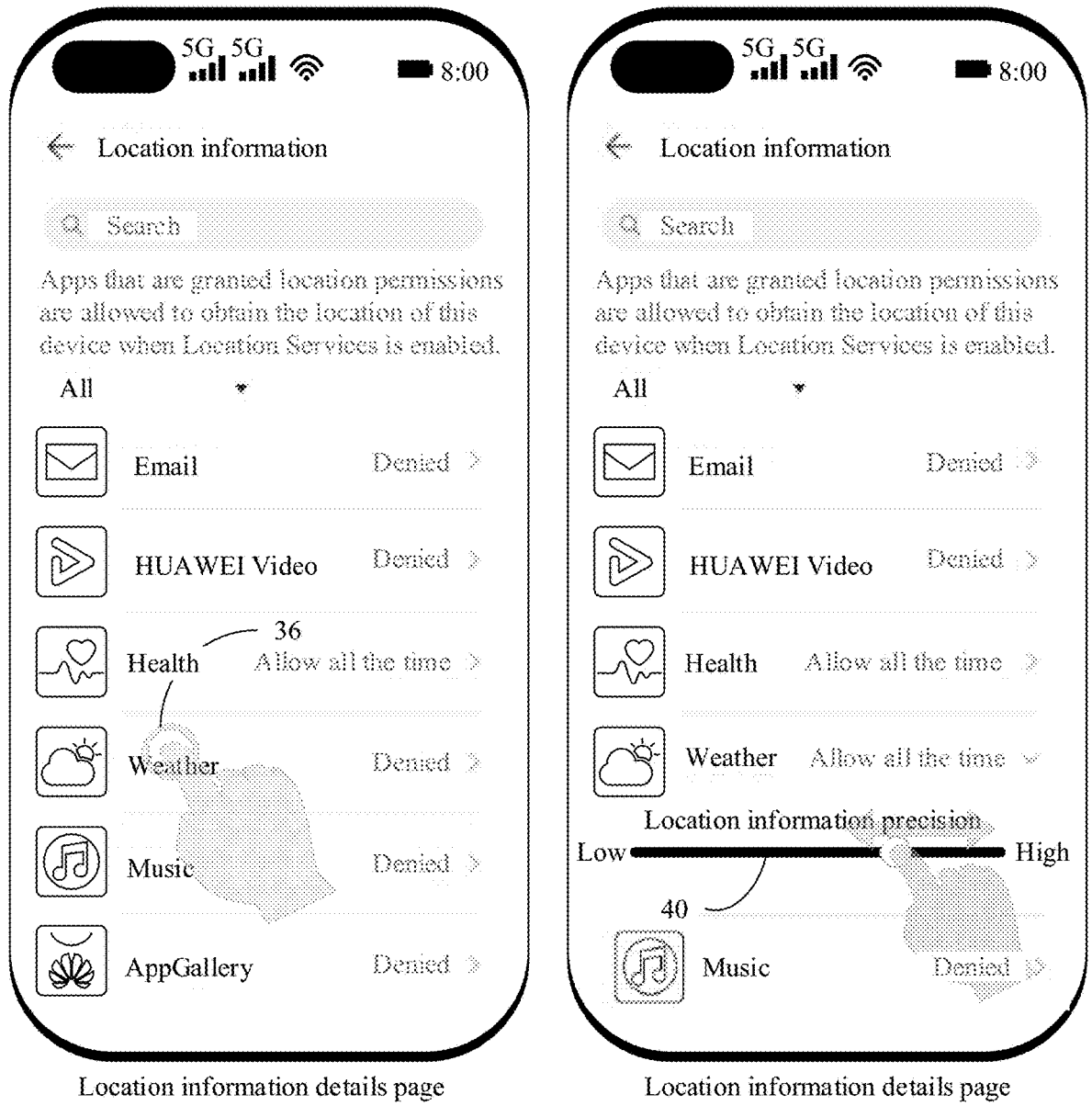
FIG. 33 is a schematic diagram of another location information settings page shown in a non-independent page according to an embodiment of this disclosure.

For example, as shown in FIG. 33, when the terminal device detects that the user taps 36 "Weather" in the location information details page, the row of "Weather" expands downward at the original position, and a slider assembly 40, such as the slider assembly 40 shown in FIG. 11, is shown below the text of "Weather". In this way, without entering an independent location information settings page of the application, the terminal device can adjust, based on the user's operation on the slider assembly 40, the precision of the location information provided by the terminal device for the application.

Figure 34:
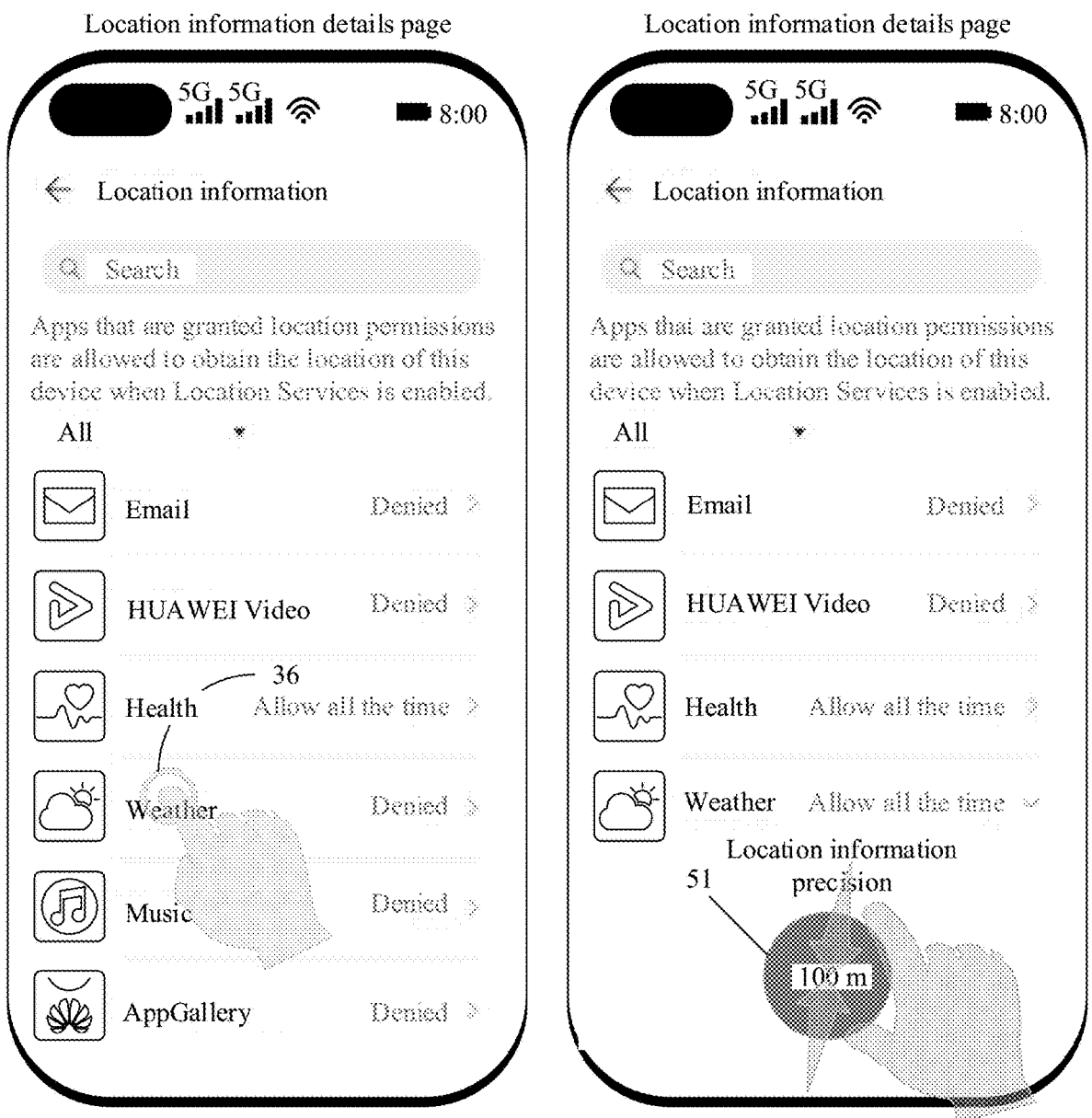
FIG. 34 is a schematic diagram of another location information settings page shown in a non-independent page according to an embodiment of this disclosure.

For example, as shown in FIG. 34, when the terminal device detects that the user taps 36 "Weather" in the location information details page, the row of "Weather" expands downward at the original position, and a circular color block, such as the circular color block 51 shown in FIG. 20 or the circular color block 52 shown in FIG. 21(*a*), is shown below the text of "Weather". In this way, without entering an independent location information settings page of the application, the terminal device can adjust, based on the user's operation on the circular color block, the precision of the location information provided by the terminal device for the application.

Figure 35:
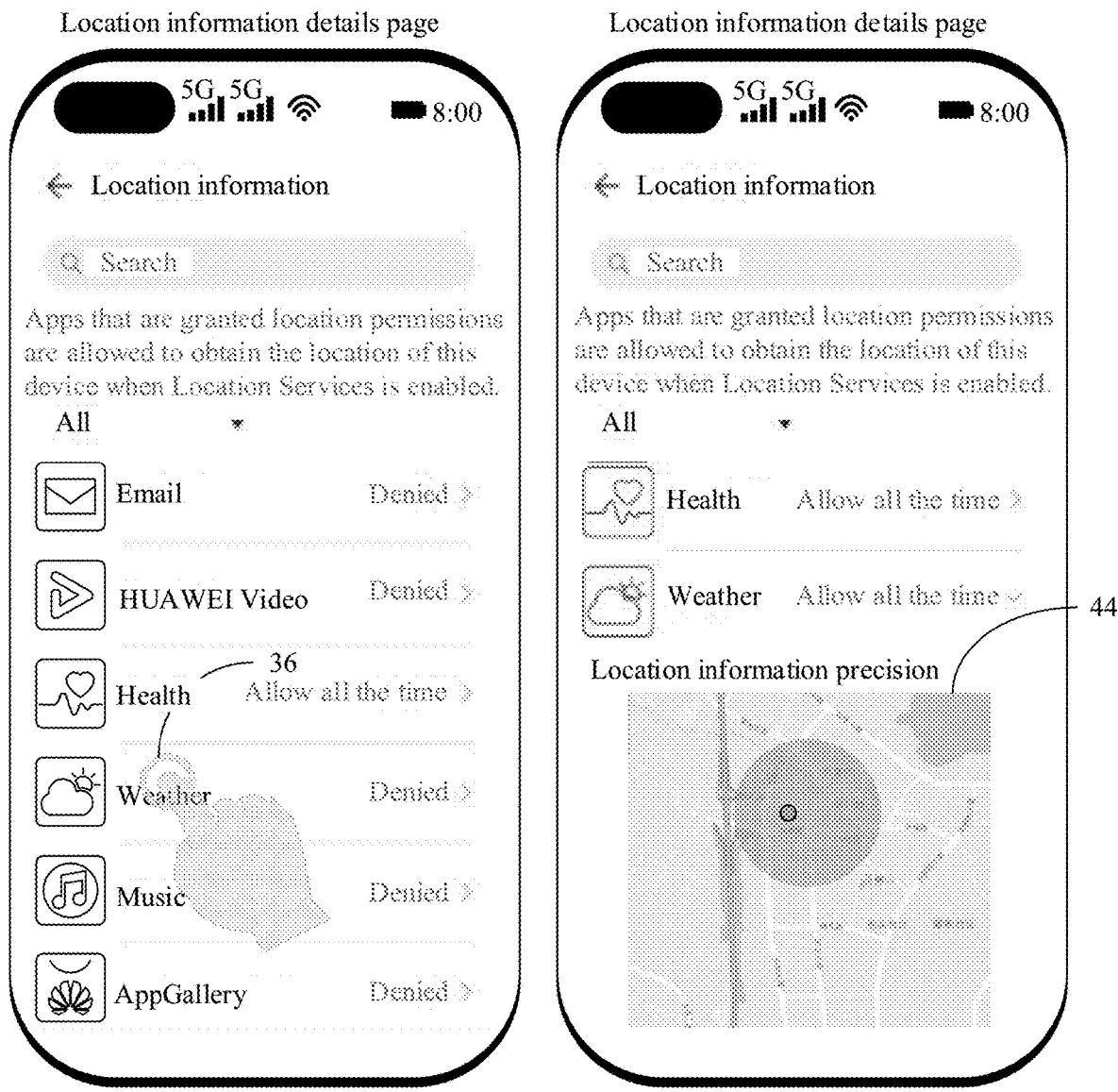
FIG. 35 is a schematic diagram of another location information settings page shown in a non-independent page according to an embodiment of this disclosure.

For example, as shown in FIG. 35, when the terminal device detects that the user taps 36 "Weather" in the location information details page, the row of "Weather" expands downward at the original position, and a map window 44, such as the map window 44 shown in FIG. 15, is shown below the text of "Weather". In this way, without entering an independent location information settings page of the application, the terminal device can adjust, based on the user's operation on the map window 44, the precision of the location information provided by the terminal device for the application.

In an embodiment, the terminal device allows the user to adjust the location information precision in a location information manager page. When the terminal device detects that the user taps an application name in the location information manager page, the terminal device may generate a pop-up window on the current page, and present, in the pop-up window, elements such as a map window, a slider assembly, and/or a circular color block for setting an information precision.

Figure 36:
FIG. 36 is a schematic diagram of another location information settings page shown in a pop-up window according to an embodiment of this disclosure.

For example, as shown in FIG. 36, when the terminal device detects that the user taps 36 "Weather" in the location information manager page, the terminal device generates a pop-up window 64 at the bottom of the current page, and displays, in the pop-up window 64, a slider assembly 40, such as the slider assembly 40 shown in FIG. 11. In this way, without entering an independent location information settings page of Weather, the terminal device can adjust, based on the user's operation on the slider assembly 40, the precision of the location information provided by the terminal device for Weather.

Figure 37:
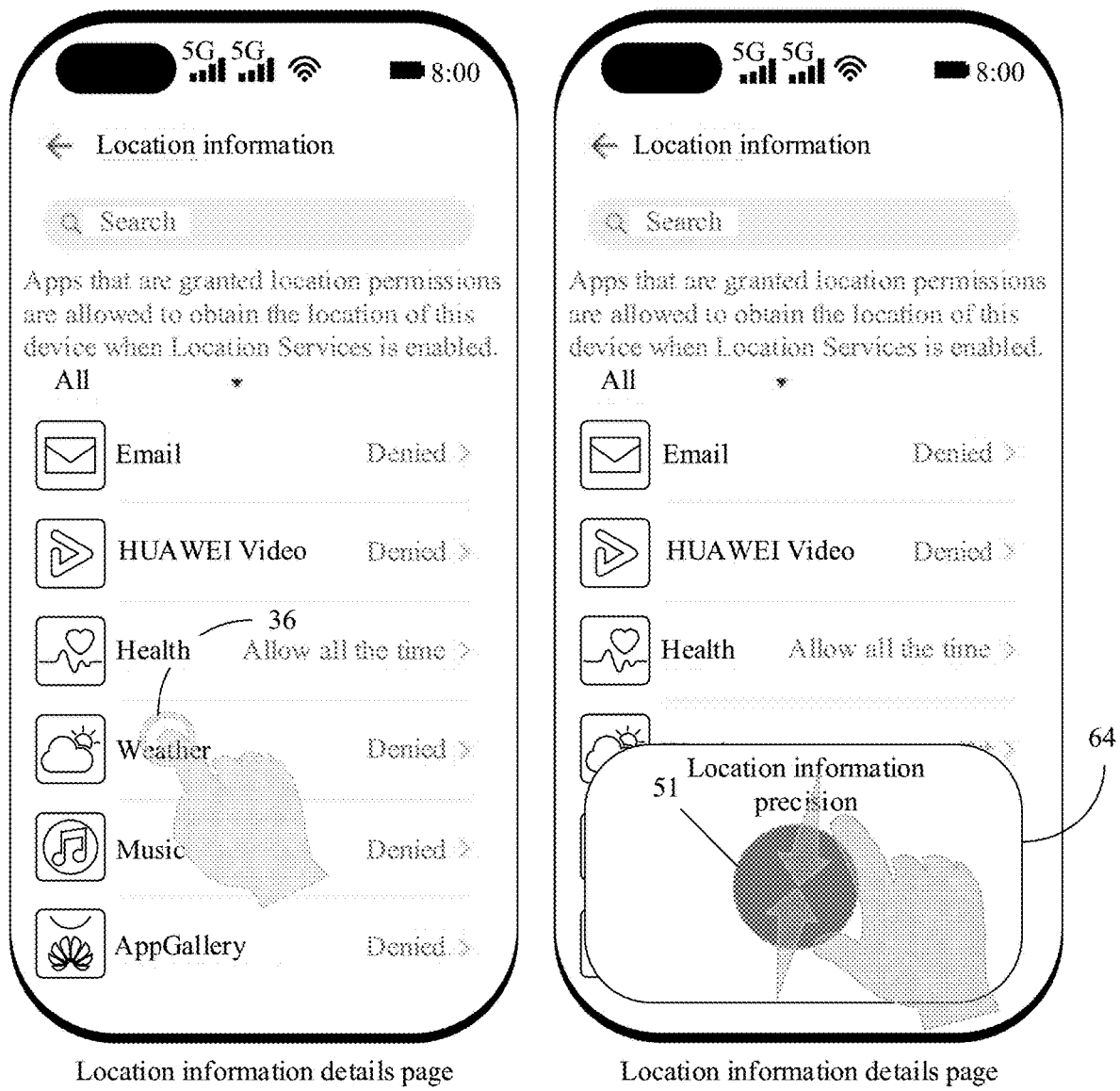
FIG. 37 is a schematic diagram of another location information settings page shown in a pop-up window according to an embodiment of this disclosure.

For example, as shown in FIG. 37, when the terminal device detects that the user taps 36 "Weather" in the location information manager page, the terminal device generates a pop-up window 64 at the bottom of the current page, and displays, in the pop-up window, a circular color block, such as the circular color block 51 shown in FIG. 20 or the circular color block 52 shown in FIG. 21(a). In this way, without entering an independent location information settings page of Weather, the terminal device can adjust, based on the user's operation on the circular color block, the precision of the location information provided by the terminal device for Weather.

Figure 38:
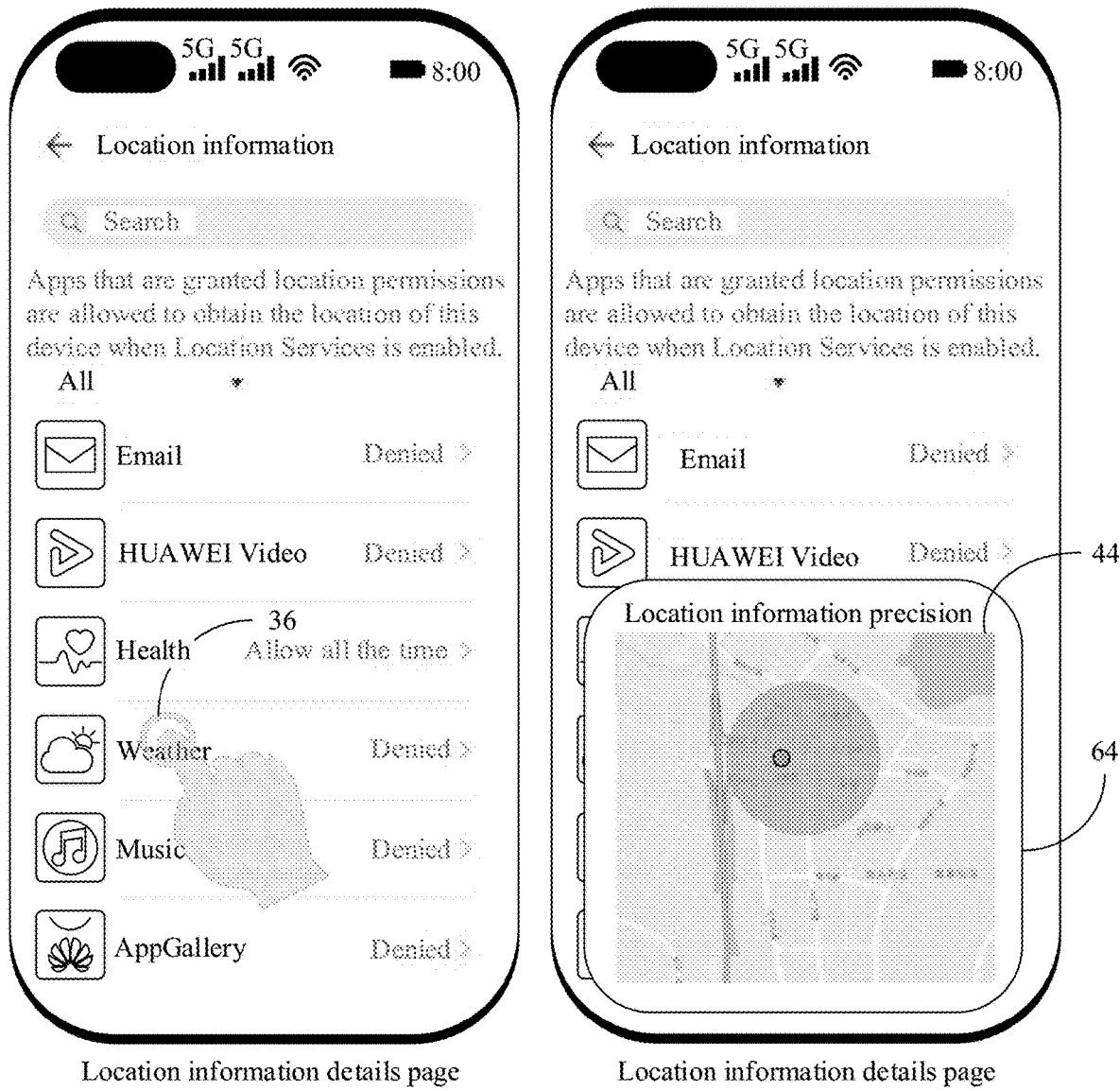
FIG. 38 is a schematic diagram of another location information settings page shown in a pop-up window according to an embodiment of this disclosure.

For example, as shown in FIG. 38, when the terminal device detects that the user taps 36 "Weather" in the location information manager page, the terminal device generates a pop-up window 64 at the bottom of the current page, and displays, in the pop-up window 64, a map window 44, such as the map window 44 shown in FIG. 15. In this way, without entering an independent location information settings page of Weather, the terminal device can adjust, based on the user's operation on the map window 44, the precision of the location information provided by the terminal device for Weather.

In an embodiment, the terminal device allows the user to adjust the location information precision for the application on the home screen of the operating system. In a specific implementation, when the terminal device detects that the user long-presses or deep-presses an application icon on the home screen of the operating system, the terminal device makes a shortcut menu pop up on the side of the application icon. The shortcut menu may include one or more shortcut functions or shortcut setting options, and the terminal device may preset a "Location information settings" option for the application in the shortcut menu. When it is detected that the user taps the "Location information settings" option, the terminal device may generate a pop-up window on the current page (namely, the page of the home screen), and present, in the pop-up window, elements such as a map window, a slider assembly, and/or a circular color block for setting an information precision.

Figure 39:
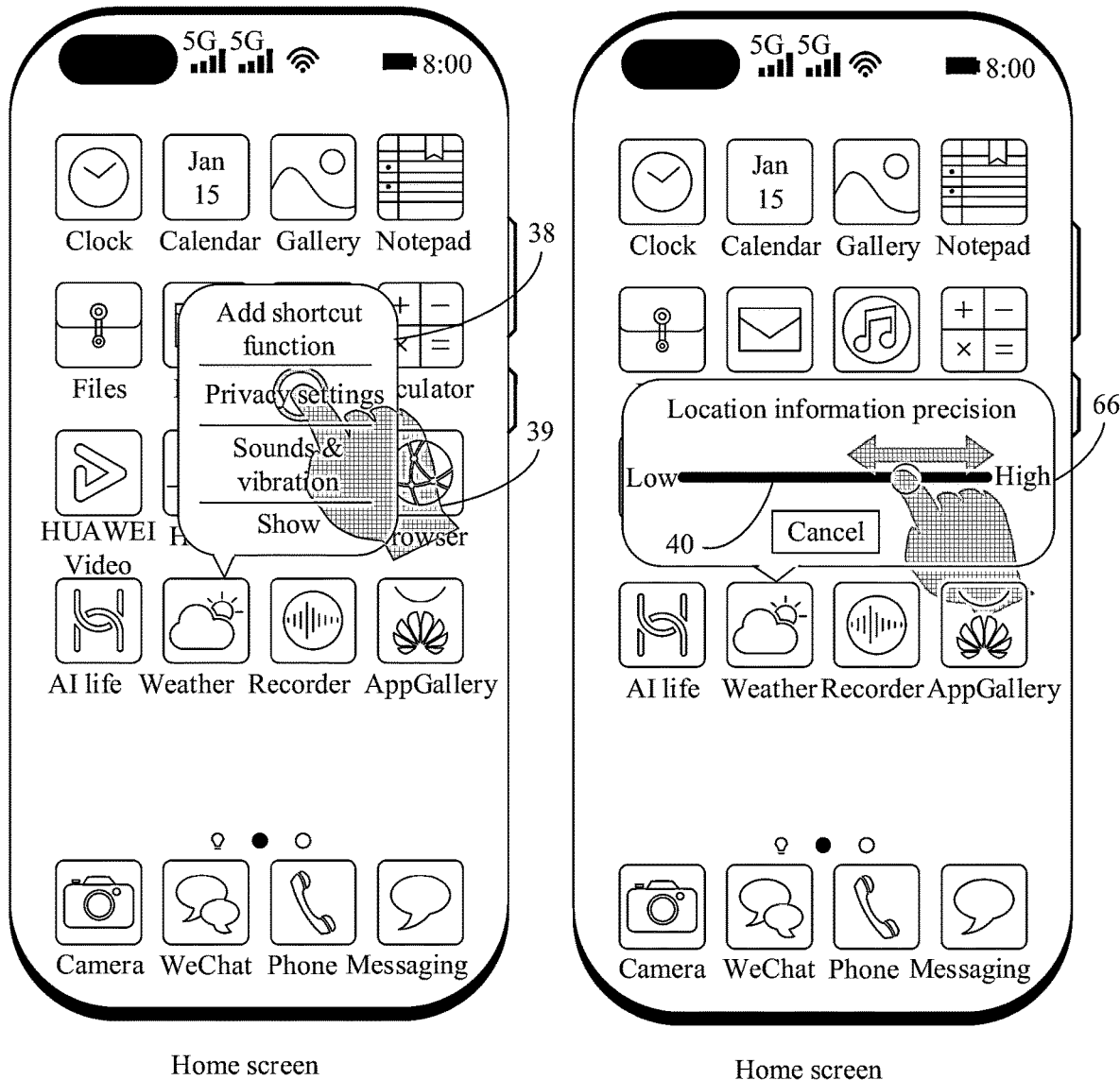
FIG. 39 is a schematic diagram of showing a location information settings page on the home screen according to an embodiment of this disclosure.

For example, as shown in FIG. 39, when the terminal device detects that the user taps 39 the "Location information settings" option in the shortcut menu 38 for the "Weather" icon, the terminal device generates a pop-up window 66 on the home screen, and displays, in the pop-up window 66, a slider assembly 40, such as the slider assembly 40 shown in FIG. 11. In this way, without entering an independent location information settings page of Weather, the terminal device can adjust, based on the user's operation on the slider assembly 40, the precision of the location information provided by the terminal device for Weather.

Figure 40:
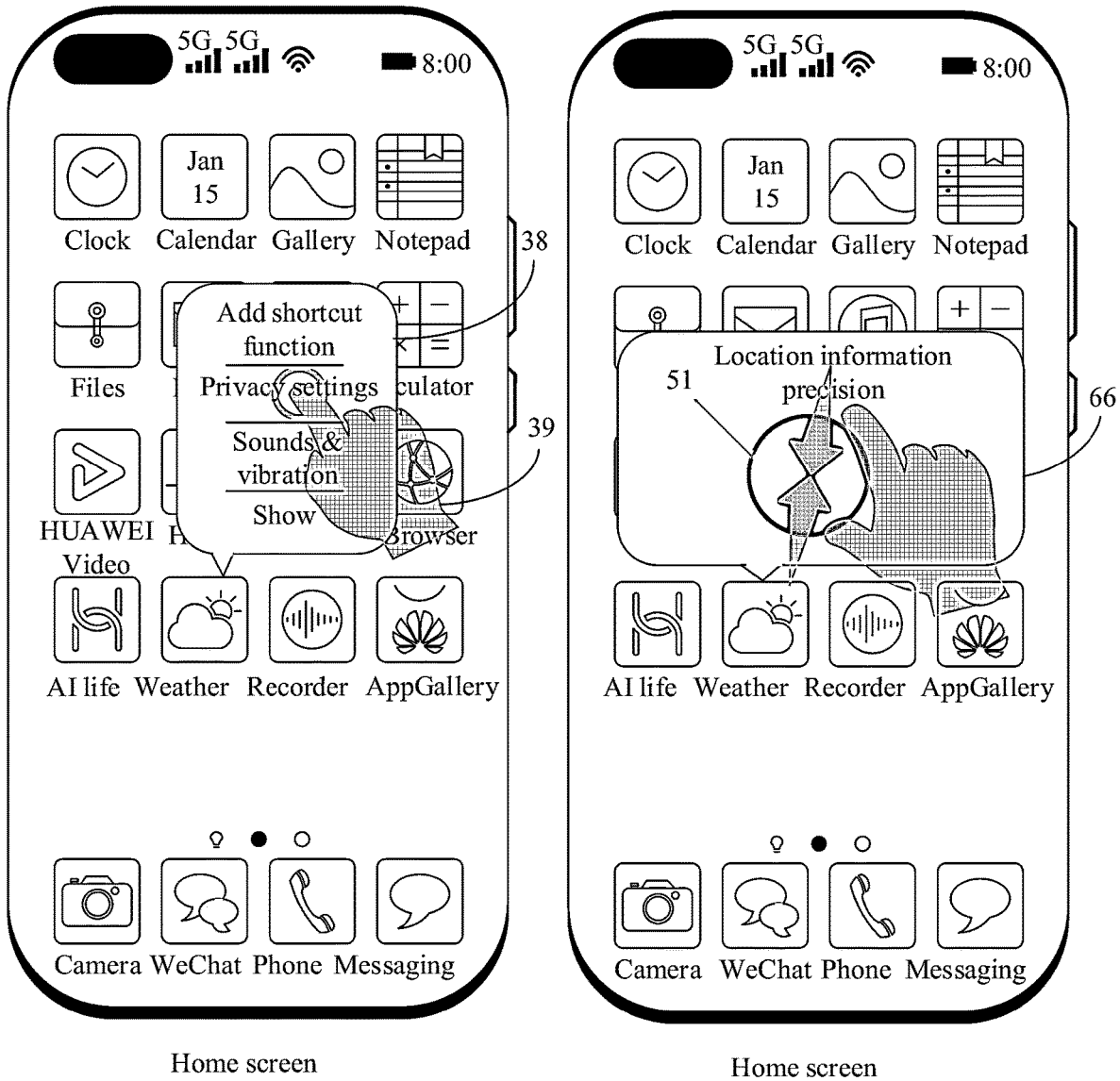
FIG. 40 is another schematic diagram of showing a location information settings page on the home screen according to an embodiment of this disclosure.

For example, as shown in FIG. 40, when the terminal device detects that the user taps 39 the "Location information settings" option in the shortcut menu 38 for the "Weather" icon, the terminal device generates a pop-up window 66 on the home screen, and displays, in the pop-up window 66, a circular color block, such as the circular color block 51 shown in FIG. 20 or the circular color block 52 shown in FIG. 21(a). In this way, without entering an independent location information settings page of Weather, the terminal device can adjust, based on the user's operation on the circular color block, the precision of the location information provided by the terminal device for Weather.

Figure 41:
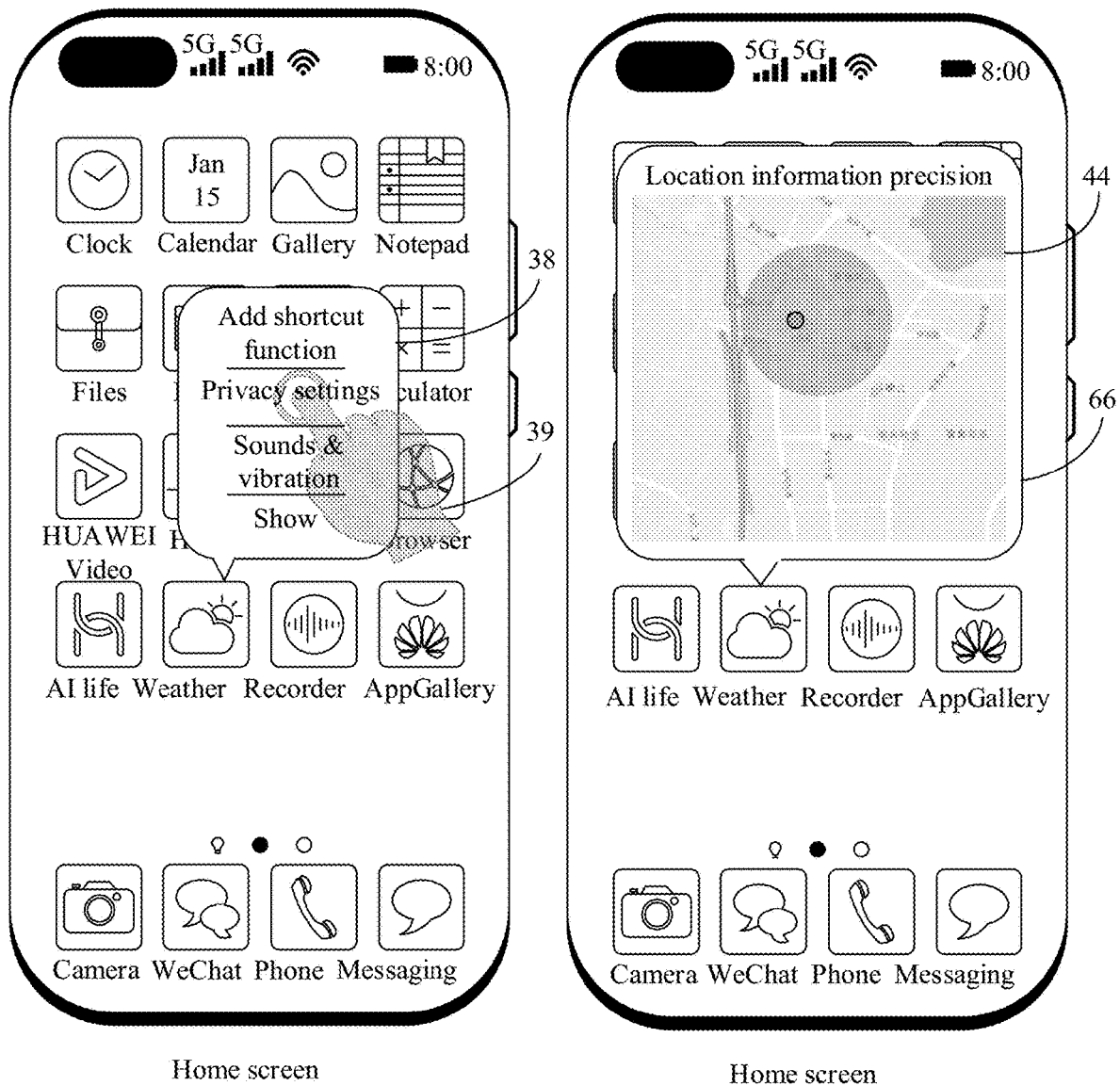
FIG. 41 is another schematic diagram of showing a location information settings page on the home screen according to an embodiment of this disclosure.

For example, as shown in FIG. 41, when the terminal device detects that the user taps 39 the "Location information settings" option in the shortcut menu 38 for the "Weather" icon, the terminal device generates a pop-up window 66 on the home screen, and displays, in the pop-up window 66, a map window 44, such as the map window 44 shown in FIG. 15. In this way, without entering an independent location information settings page of Weather, the terminal device can adjust, based on the user's operation on the map window 44, the precision of the location information provided by the terminal device for Weather.

After the terminal device adjusts a location information precision for an application in response to an operation, if the application then requests to obtain location information from the terminal device, the terminal device provides the location information for the application according to the adjusted location information precision. In a specific implementation, when an application requests to obtain location information from the terminal device, the terminal device first verifies, based on the privacy settings of the application, whether the application has the location information permission. If the application does not have the location information permission, the terminal device denies providing the location information to the application. If the terminal device verifies that the application has the location information permission, actual location information of the terminal device at this time may be obtained through a corresponding process, interface, or service of the operating system. For example, a terminal device based on the Android system may obtain an actual location of the user through the LocationManager.GPS_PROVIDER service of the Android system. Then, the terminal device blurs the actual location based on the current location information precision for the application, to obtain blurred location information. Finally, the blurred location information is provided for the terminal device.

The actual location of the terminal device may be represented as a coordinate value or a coordinate range. For example, the actual location of the terminal device may be represented as two-dimensional planar coordinates (X, Y). When an application requests to obtain location information, the terminal device may generate a blurring parameter Z based on a current location information precision for the application, and then perform offset processing on the two-dimensional planar coordinates (X, Y) based on the blurring parameter Z, to obtain blurred two-dimensional planar coordinates (X+Z, Y+Z). The blurring parameter Z may be a distance value. Therefore, the blurred two-dimensional planar coordinates (X+Z, Y+Z) may be understood as obtained by offsetting the two-dimensional planar coordinates (X, Y) of the actual location of the terminal device by the offset distance Z. A value of the blurring parameter Z is related to the current location information precision for the application. A higher location information precision indicates a smaller value of the blurring parameter Z, and a lower location precision indicates a larger value of the blurring parameter Z.

For example, when the location information precision for the application is a distance precision, for example, when the location information precision is D meters, the blurring parameter Z may be D meters, or a value range of the blurring parameter Z may be from 0 meters to D+1 meters. In a specific implementation, the value of the blurring parameter Z may be determined by taking a random number from 0 meters to D+1 meters. For example, on a terminal device based on the Android system, the value of the blurring parameter Z may be generated by using a random number Random class of the Java language, that is, Z=Random (D+1).

In addition, the terminal device performs offset processing on the two-dimensional planar coordinates (X, Y) based on the blurring parameter Z. In addition to adding Z to each of the X and Y coordinates, a method of subtraction or a combination of addition and subtraction may also be used to obtain the blurred two-dimensional planar coordinates. For example, the blurred two-dimensional planar coordinates may be (X+Z, Y−Z), (X−Z, Y+Z), or (X−Z, Y−Z), thereby increasing the randomness of the blurred two-dimensional planar coordinates.

In addition, the terminal device may also generate different blurring parameters $Z_1$ and $Z_2$ for the X-axis coordinate and the Y-axis coordinate, respectively, where the X-axis coordinate corresponds to the blurring parameter $Z_1$, and the Y-axis coordinate corresponds to the blurring parameter $Z_2$. Values of $Z_1$ and $Z_2$ may be the same or different, and the values of both Z and $Z_2$ may be determined by taking a random number from 0 m to D+1 m. Then, the blurred two-dimensional planar coordinates may also be (X+$Z_1$, Y+$Z_2$), (X+$Z_1$, Y−$Z_2$), (X−$Z_1$, Y+$Z_2$) or (X−$Z_1$, Y−$Z_2$).

In an implementation, depending on different location information precisions for the application, the location information provided by the terminal device for the application may be a coordinate value or a coordinate range. For example, when the location information precision for the application is the highest, the terminal device may provide the actual location coordinates (X, Y) to the application; and when the location information precision for the application is not the highest, the terminal device can provide the application with the blurred coordinates (for example, (X+Z, Y+Z)) or a coordinate range with the blurred coordinates as a center and D meters as a radius.

Figure 42:
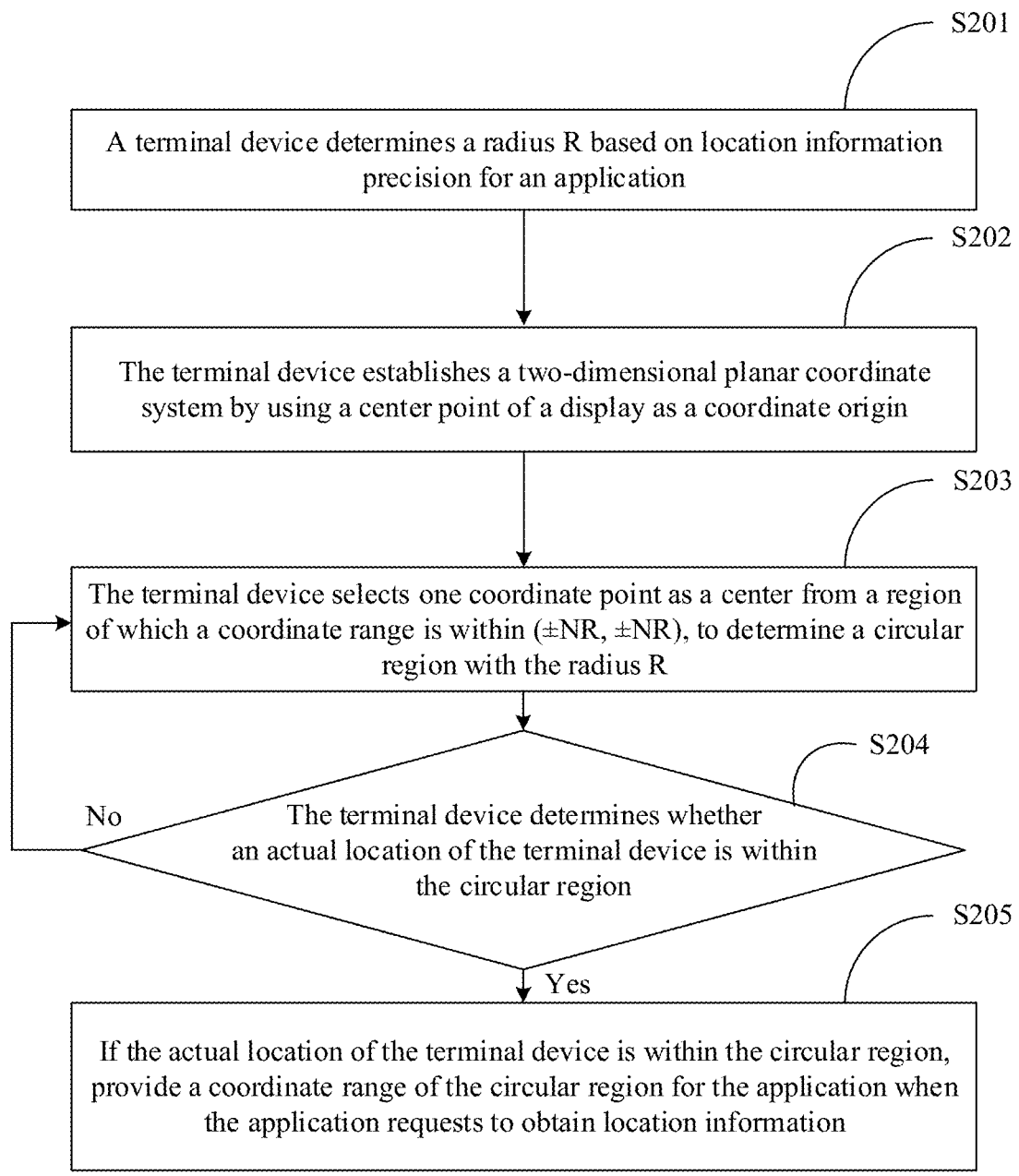
FIG. 42 is a flowchart of blurring location information according to an embodiment of this disclosure.
Figure 43:
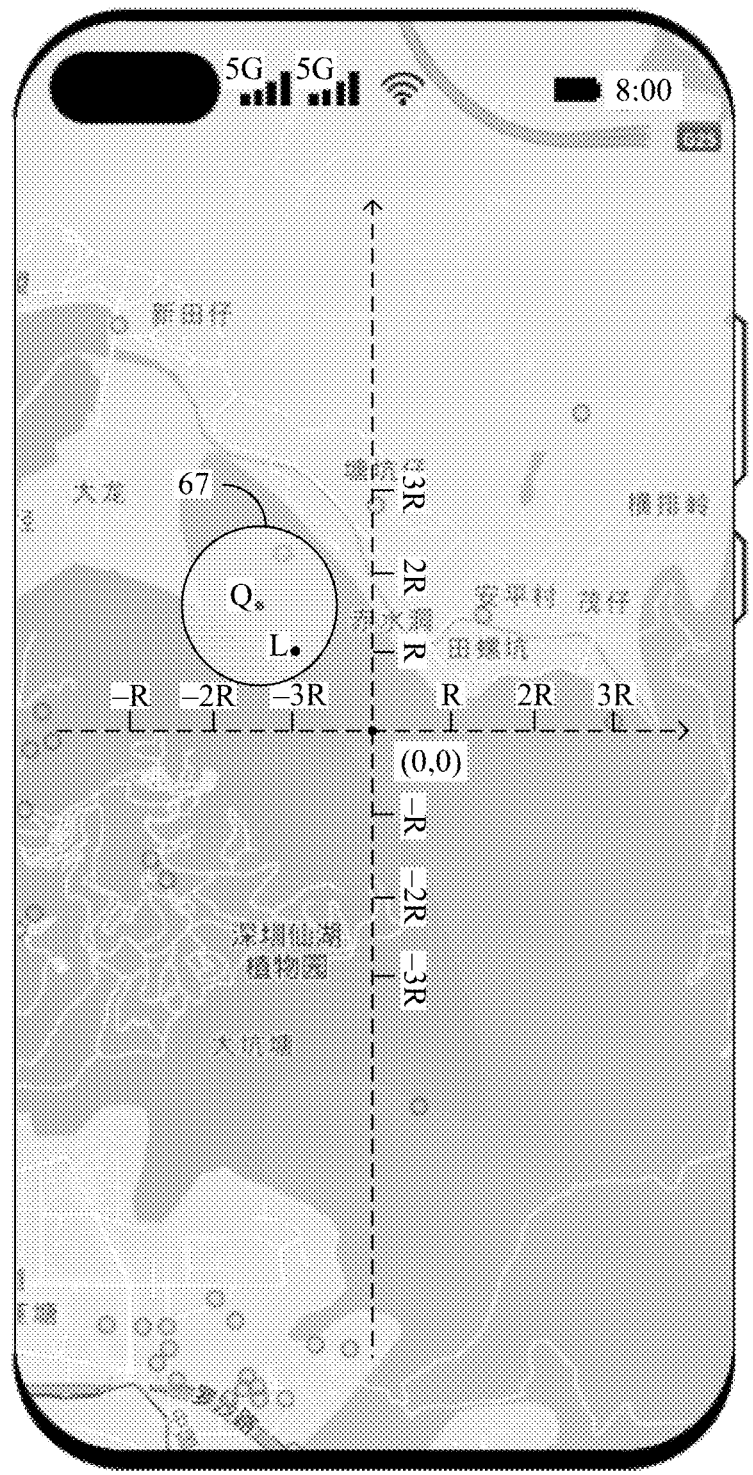
FIG. 43 is a schematic diagram of a position of a circular region 67 according to an embodiment of this disclosure.

Further, to prevent some applications from using the blurred coordinates and the location information precision D to reversely calculate the actual location coordinates of the terminal device, when the application requests to obtain the location information, the terminal device may further randomize the coordinate range provided for the application. As shown in FIG. 42 and FIG. 43, an optional randomization method may include the following steps.

Step S201: The terminal device determines a radius R based on the location information precision for the application.

The radius R may be equal to D or may be a random value less than D, which is not limited herein. In short, a higher location information precision indicates a smaller value of R, and a lower location precision indicates a larger value of R.

Step S202: The terminal device establishes a two-dimensional planar coordinate system by using a center point of a display as a coordinate origin (0, 0).

Step S203: The terminal device selects any coordinate point Q as a center from a region of which a coordinate range is within (±NR, ±NR), to determine a circular region 67 with the radius R.

The coordinate point Q may be randomly generated in the region within (±NR, ±NR). N is a real number greater than or equal to 1, and preferably N is equal to 3, or may be another value, such as 2, 2.5, 3.5, or 4, which is not limited in this embodiment of this disclosure.

Step S204: The terminal device may determine whether the actual location of the terminal device is within the circular region 67.

Step S205: If the actual location of the terminal device is within the circular region 67, the terminal device uses a coordinate range of the circular region 67 as the location information provided for the application.

If the actual location of the terminal device is not within the circular region 67, the terminal device may perform step S203 again to reselect a coordinate point as a center and re-determine a circular region 67 until the actual location of the terminal device is within this circular region 67.

In this way, the actual location of the terminal device may be randomly distributed within the coordinate range provided for the application, so that the application cannot reversely calculate the actual location of the terminal device, which helps protect the privacy of the user.

In an implementation, the location information provided by the terminal device for the application may be a location name or geographic range, such as Huawei Headquarters Base, Bantian Residential District, Longgang District, or Shenzhen City. Depending on different location information precisions for applications, even for the same location, the terminal device provides different location information for the applications. For example, it is assumed that the user travels to Baiyun Mountain Scenic Area in Guangzhou, and at the entrance ticket office of Baiyun Mountain Scenic Area, the user shares a Moments activity with location information over social software. If the current location information precision for the social software is high, the location information provided by the terminal device for the social software may be "Baiyun Mountain Scenic Area Entrance Ticket Office, Guangzhou". If the current location information precision for the social software is medium, the location information provided by the terminal device for the social software may be "Baiyun Mountain Scenic Area, Guangzhou". If the current location information precision for the social software is low, the location information provided by the terminal device for the social software may be "Guangzhou City".

The foregoing embodiments of this disclosure describe the technical solutions of the privacy information generation method in detail by using location information as an example. It may be understood that the technical features of the privacy information generation method described above by using location information as an example are also applicable to other privacy information, such as phone information, phone owner information, storage content, application list, calendar and schedules, phone account, body sensor information, physical activity information, and clipboard information.

Figure 44:
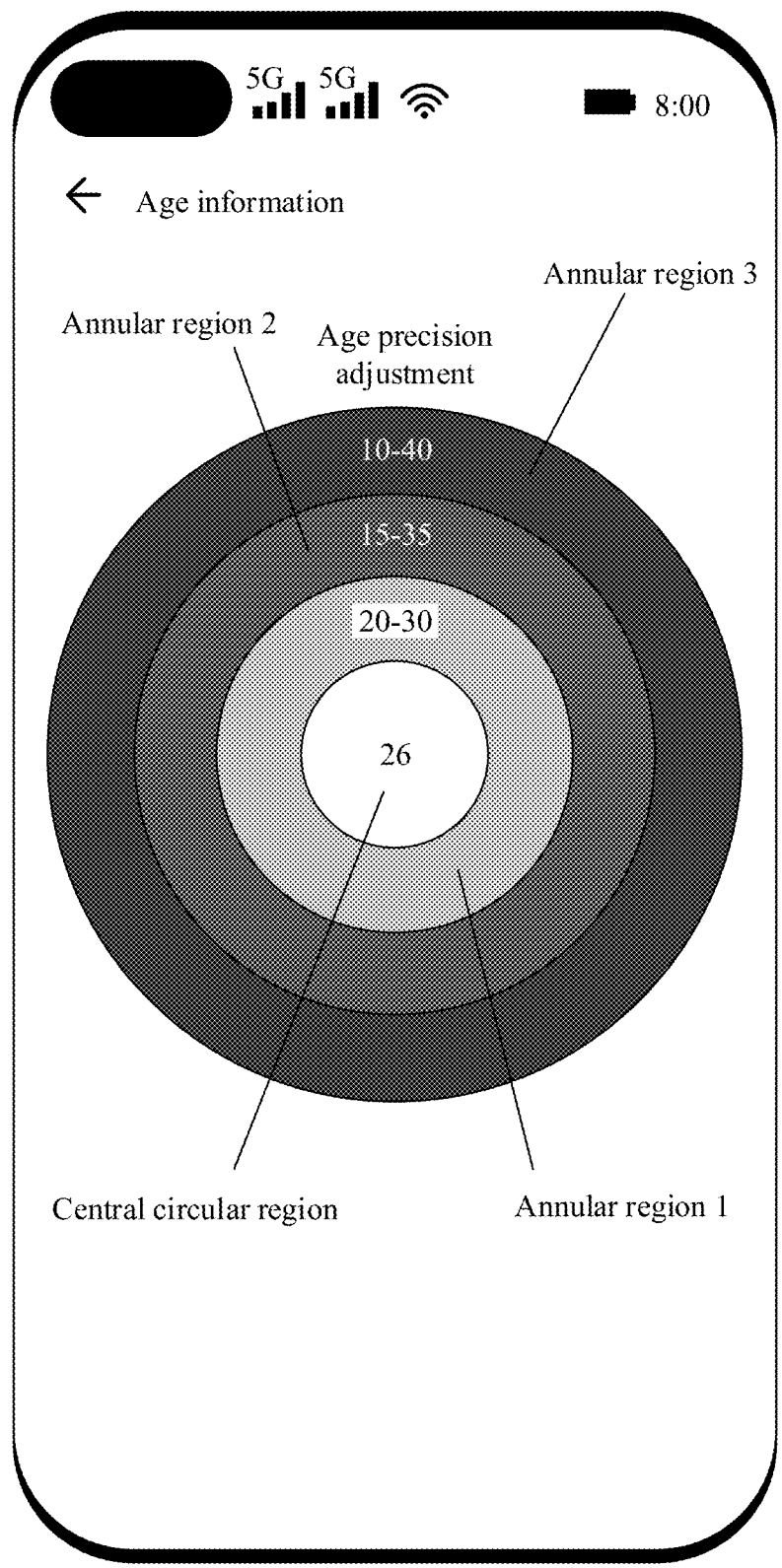
FIG. 44 is a schematic diagram of adjusting a user age precision through a circular color block according to an embodiment of this disclosure.

For example, the terminal device may allow the user to adjust a precision of a user age provided by the terminal device for the application, and adjustment is implemented by using an element, including but not limited to, a slider assembly, a circular color block, and/or the like. FIG. 44 is a schematic diagram of adjusting a user age precision through a circular color block. As shown in FIG. 44, the circular color block is similar to the circular color block shown in FIG. 21(a), including a central circular region and at least one annular region that are radially divided in sequence to be located in different radius intervals and that can be lightened or darkened. Each region corresponds to one age or age interval, and the corresponding age interval is gradually widened from the inside to the outside. For example, when the user is 26 years old, the central circular region corresponds to the age of 26, the annular region 1 corresponds to the age interval of 20 to 30 years old, the annular region 2 corresponds to the age interval of 15 to 35 years old, and so on. The terminal device allows the user to sequentially lighten the regions from the inside to the outside or sequentially darken the regions from the outside to the inside through a two-finger zoom operation, and the terminal device uses an age interval corresponding to the outermost lightened region as the precision of the user age provided for the application. For example, when only the central circular region is lightened, the user age provided by the terminal device for the application is 26 years old (that is, the true age of the user); when the central circular region and the annular region 1 are lightened, it indicates that the user age interval provided by the terminal device for the application is 20 to 30 years old; when the central circular region, the annular region 1, and the annular region 2 are lightened, it indicates that the user age interval provided by the terminal device for the application is 15 to 35 years old; and when the central circular region, the annular region 1, the annular region 2, and the annular region 3 are lightened, it indicates that the user age interval provided by the terminal device for the application is 10 to 40 years old.

Figure 45:
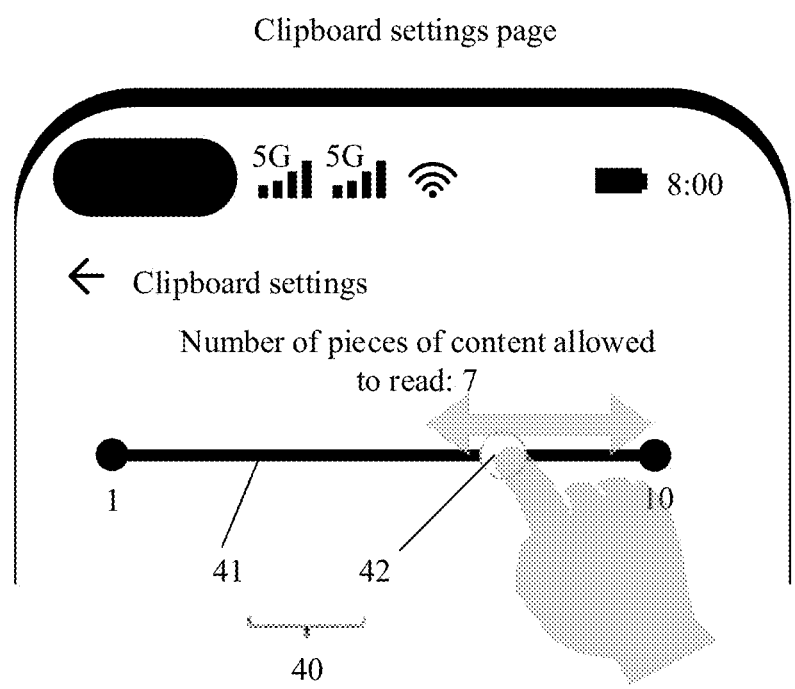
FIG. 45 is a schematic diagram of adjusting, through a slider assembly, permissions for an application to access the clipboard according to an embodiment of this disclosure.

For example, the terminal device may allow the user to adjust permissions for the application to access the clipboard, and adjustment is implemented by using an element, including but not limited to, a slider assembly, a circular color block, and/or the like. FIG. 45 is a schematic diagram of adjusting, through a slider assembly, permissions for an application to access the clipboard. As shown in FIG. 45, different positions on the slider correspond to the number of pieces of content in the clipboard that the terminal device allows the application to access. For example, the leftmost end of the slider corresponds to 0 pieces of content, indicating that the application is not allowed to access the clipboard; the rightmost end of the slider corresponds to the largest number of pieces of content, such as 10, indicating that the application is allowed to access the most recent 10 pieces of content in the clipboard; and the number of pieces of content corresponding to other positions on the slider is sequentially increased from left to right. In this way, the terminal device may determine, based on a position to which the user drags the knob, the number of pieces of content in the clipboard that the application is allowed to access. For example, when the position of the knob corresponds to seven pieces of content, the terminal device determines that the application is allowed to access the most recent seven pieces of content in the clipboard.

Figure 46:
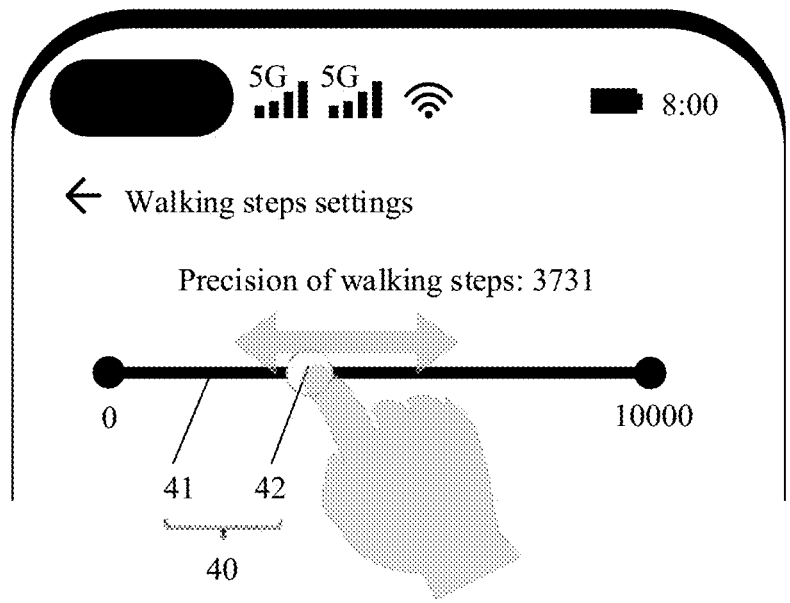
FIG. 46 is a schematic diagram of adjusting a precision of walking steps through a slider assembly according to an embodiment of this disclosure.

For example, the terminal device may allow the user to adjust a precision of physical activity information provided by the terminal device for the application, such as walking steps, heart rate, weight, blood glucose, or menstrual cycle, and adjustment is implemented by using an element, including but not limited to, a slider assembly, a circular color block, and/or the like. FIG. 46 is a schematic diagram of adjusting a precision of walking steps through a slider assembly. As shown in FIG. 46, in an example of adjusting walking steps, different positions on the slider correspond to different precisions of walking steps. For example, a value corresponding to the leftmost end of the slider is the smallest, such as 0, which corresponds to the highest precision of walking steps, indicating that an error between walking steps provided by the terminal device for the application and the user's true walking steps detected by the terminal device is 0 steps; a value corresponding to the rightmost end of the slider is the largest, for example, 10000, which corresponds to the lowest precision of walking steps, indicating that the error between the walking steps provided by the terminal device for the application and the user's true walking steps detected by the terminal device is 10000 steps; and values corresponding to other positions on the slider are sequentially increased from left to right. In this way, the terminal device may determine, based on a position to which the user drags the knob, the error between the walking steps provided by the terminal device for the application and the user's true walking steps detected by the terminal device. For example, when a value corresponding to the position of the knob is 3731, and the number of the user's true walking steps is 8066, the terminal device may add the number of the user's true walking steps and the value corresponding to the knob to obtain 11797 steps, and provide the 11797 steps for the application. For another example, when a value corresponding to the position of the knob is 3731, and the number of the user's true walking steps is 8066, the terminal device may subtract the number of the user's true walking steps and the value corresponding to the knob to obtain 4335 steps, and provide the 4335 steps for the application.

In some other embodiments, the terminal device may further automatically set the privacy precision for the application in a personalized manner for different users, different applications, different time or time periods, and other dimensions, without needing the user's operation, improving user experience.

In an implementation, the terminal device may set a privacy precision for an application based on the user's behavioral habit of using the application in a historical time period. The location information permission for the social application WeChatR is used as an example. The terminal device may determine, based on the user's behavior of using WeChat within a historical time period, whether the user is willing to provide location information to WeChat for use. If the terminal device determines that the user is willing to provide the location information to WeChat for use, the terminal device may provide high-precision location information for WeChat. If the terminal device determines that the user is unwilling to provide the location information to WeChat for use, the terminal device provides low-precision location information for WeChat.

For example, the terminal device may count the number of times the user has posted on WeChat Moments in a recent time period (such as a week or a month), and the number of times the user selects "Show location" when posting on WeChat Moments, and determine, based on a counting result, a location information precision for WeChat. Specifically, the more times the user posts on WeChat Moments in the recent time period, and the more times the user selects "Show location" when posting on WeChat Moments, the higher the precision of the location information provided by the terminal device for WeChat; the fewer times the user posts on WeChat Moments in the recent time period, and the fewer times the user selects "Show location" when posting on WeChat Moments, the lower the precision of the location information provided by the terminal device for WeChat.

Optionally, the terminal device may provide scores for the number of times the user posts on WeChat Moments and the number of times the user selects "Show location" when posting on WeChat Moments as dimensions, respectively. For each dimension, the scoring result is related to the corresponding number of times. A larger number of times indicates a higher score, and a smaller number of times indicates a lower score. The terminal device may calculate a sum or a weighted sum of scores of the two dimensions as the user's behavior score for WeChat, and set the location information precision for WeChat based on the behavior score. A higher behavior score corresponds to a higher location information precision, and a lower behavior score corresponds to a lower location information precision.

For example, it is assumed that a corresponding score each time the user posts on WeChat Moments is 5 points, and a corresponding score each time the user selects "Show location" when posting on WeChat Moments is 8 points. Then, for a user A, if the user A posted Moments 10 times and selected "Show location" 6 times in the past week, scores of the user A in the two dimensions are 50 and 48 points, respectively, and a behavior score of the user A is 98 points. For a user B, if the user B posted Moments 2 times and selected "Show location" 0 times in the past week, scores of the user B in the two dimensions are 20 and 0 points, respectively, and a behavior score of the user B is 20 points. For a user C, if the user C posted Moments 11 times and selected "Show location" 0 times in the past week, scores of the user C in the two dimensions are 55 and 0 points, respectively, and a behavior score of the user C is 55 points. Therefore, the terminal device of the user A provides highest-precision location information for WeChat, the terminal device of the user C provides medium-precision location information for WeChat, and the terminal device of the user B provides lowest-precision location information for WeChat. It can be learned that for the same application, the terminal device provides the application with location information of different precisions based on the usage behaviors of different users.

When the location information is represented from low to high by structured administrative region levels (for example, Country—Province (autonomous region)—City—District (county)—Subdistrict (town)—Neighborhood (village)—Community (building, commercial district, enterprise park, or the like)—Block—House number or the like), the user's behavior score may correspond to the administrative region levels in the form of sections from low to high, for example, 0 to 10 points correspond to Country, 11 to 20 points correspond to Province (autonomous region), 51 to 60 points correspond to Subdistrict, and 91 to 100 points correspond to Block. Therefore, the terminal device of the user A may provide location information of the Block level for WeChat, the terminal device of the user C may provide location information of the Subdistrict level for WeChat, and the terminal device of the user B may provide location information of the Province (autonomous region) level for WeChat. It should be additionally noted herein that a correspondence between the user's behavior score sections and the administrative region levels may be determined by technical personnel who implement this embodiment of this disclosure, which is not specifically limited herein.

When the location information is represented by a latitude and longitude value or a latitude and longitude range, the user's behavior score may correspond to the blurring parameter Z. In this case, a unit of the blurring parameter Z is a unit of longitude and latitude, such as degrees, minutes, and seconds. A higher behavior score corresponds to a smaller value of the blurring parameter Z, and a lower behavior score corresponds to a larger value of the blurring parameter Z. Assuming that the user A, the user B, and the user C are in the same location, with the latitude and longitude coordinates of $(X_0, Y_0)$, based on the behavior scores of the user A, the user B, and the user C, the blurring parameters of the user A, the user B, and the user C are $Z_A$, $Z_B$, and $Z_C$, respectively, where $Z_A<Z_C<Z_B$. In this way, the latitude and longitude coordinates provided by the terminal device of the user A for WeChat are $(X_0+Z_A, Y_0+Z_A)$, the latitude and longitude coordinates provided by the terminal device of the user B for WeChat are $(X_0+Z_B, Y_0+Z_B)$, and the latitude and longitude coordinates provided by the terminal device of the user C for WeChat are $(X_0+Z_C, Y_0+Z_C)$.

In some embodiments, the terminal device may preset different privacy precisions for different applications. After an application is installed on the terminal device, the terminal device automatically performs privacy settings for the application based on a preset privacy precision. The privacy precision preset for the application by the terminal device may not be lower than a minimum privacy precision required for the normal use of each function of the application.

In an implementation, the terminal device may record at least one privacy configuration list, and the privacy configuration list may include the name of at least one application and a preset privacy precision thereof. The privacy configuration list may be pre-written into the operating system of the terminal device, or may be obtained from a specified server after the terminal device is activated, or may be imported by the user, which is not limited in this embodiment of this disclosure.

Due to factors such as the large number of applications currently on various operating systems, usually in the order of hundreds of thousands or even millions, making it impossible for the privacy configuration list to cover all applications, and because a list with an excessive data volume affects its use performance, and some applications are not commonly used applications, initially, the privacy configuration list may include only the names of a small number of applications (for example, dozens of applications or hundreds of applications) and preset privacy precisions thereof. The above-mentioned small number of applications may include applications with the highest downloads in an application store of the terminal device, or may include applications with the highest number of monthly active users, or applications determined in other manners. This is not limited in this embodiment of this disclosure.

Still in the example of the location information, Table 1 shows an example form of the privacy configuration list. According to the content of Table 1, the terminal device divides the location information precision for the application into high, medium, and low. If an application in Table 1 is installed on the terminal device, the terminal device sets the location information precision for the application to a precision in Table 1. For example, when the user installs Weather on the terminal device, the terminal device sets the location information precision for Weather to be low.

TABLE 1

| Application name | Location information precision |
|---|---|
| Weather | Low |
| HUAWEI Maps | High |
| Camera | Medium |

In this way, the terminal device can automatically set a privacy precision for an application without needing the user's operation, and can provide the application with location information of the lowest possible precision while satisfying the normal use of the application, so as to protect user privacy and improve user experience.

In some embodiments, the terminal device may set different privacy precisions for different application categories. After an application in a category is installed on the terminal device, the terminal device may perform privacy settings for the application based on a privacy precision corresponding to the category. The privacy precision preset for the application in the category by the terminal device may not be lower than a minimum privacy precision required for the normal use of a function of the application in the category.

In an implementation, the terminal device may record at least one privacy configuration list, and the privacy configuration list may include the name of at least one application category and a preset privacy precision thereof. The privacy configuration list may be pre-written into the operating system of the terminal device, or may be obtained from a specified server after the terminal device is activated, or may be imported by the user, which is not limited in this embodiment of this disclosure.

Still in the example of the location information, Table 2 shows another example form of the privacy configuration list. According to the content of Table 2, application categories may, for example, include: entertainment, social communications, education, news & reading, photo & beauty, and travel & navigation. Table 2 further records the name of at least one application included in each category, and a preset location information precision for each category. If an application in Table 2 is installed in the application, the terminal device finds the corresponding category of the application from Table 2, and then sets the preset location information precision for this category in Table 2 as the location information precision for the application.

TABLE 2

| Entertainment | HUAWEI Video/HUAWEI Music . . . | Low |
|---|---|---|
| Social communications | WeChat | High |
| Education | HUAWEI Classroom . . . | Low |
| News & reading | HUAWEI News | Low |
| Photo & beauty | Camera | Low |
| Travel & navigation | HUAWEI Maps | High |
| . . . | . . . | . . . |

In this way, the terminal device can automatically set a privacy precision for an application without needing the user's operation, and can provide the application with location information of the lowest possible precision while satisfying the normal use of the application, so as to protect user privacy and improve user experience.

In some embodiments, the terminal device may set different privacy precisions for different functions of the same application. Still in the example of location information, for a catering services app, the terminal device may set a low location information precision for the homepage or business search page of the application, and set a high location information precision for the Search nearby restaurants function of the application; for a map app, the terminal device may set a low location information precision for the homepage or location search page, and when the map app starts the Navigation function or the terminal device detects that the user taps the My current location icon, the terminal device sets a high location information precision for the map app. In this way, the terminal device can provide the application with location information of the lowest possible precision while satisfying the normal use of the functions of the application, so as to protect user privacy to the greatest extent.

In some embodiments, the terminal device may predict the user's requirement for the location privacy precision when using the application, and dynamically set the privacy precision for the application. In a specific implementation, the terminal device may learn the user's habit of using the application, such as a use time, function used, and location of use, by means of machine learning, and then predict, based on the learned content, an application and function currently to be used by the user, and provide the application with location information permissions that are required for the current function to run properly. In this way, the terminal device can provide the application with location information of the lowest possible precision while satisfying the normal use of the current functions of the application, so as to protect user privacy to the greatest extent.

In the example of location information, the terminal device uses machine learning to predict that in the morning and evening hours of the working days, the user uses the navigation function of a map app while commuting by car. Therefore, in the morning and evening hours of the working days, the terminal device may provide the map app with high-precision location information; and in other hours, the terminal device may provide the map app with low-precision location information.

The foregoing embodiments provided in this disclosure have described various solutions of the privacy information generation method provided in this disclosure. It may be understood that to implement the foregoing functions, each device or apparatus, such as the terminal device, includes a corresponding hardware structure and/or software module that performs each function. A person skilled in the art should easily be aware that, in combination with units and algorithm steps of the examples described in embodiments disclosed in this specification, this disclosure may be implemented by hardware or a combination of hardware and computer software. Whether a function is performed by hardware or hardware driven by computer software depends on particular applications and design constraint conditions of the technical solutions. A person skilled in the art may use a different method to implement the described functions for each particular application, but it should not be considered that the implementation goes beyond the scope of this disclosure.

Figure 47:
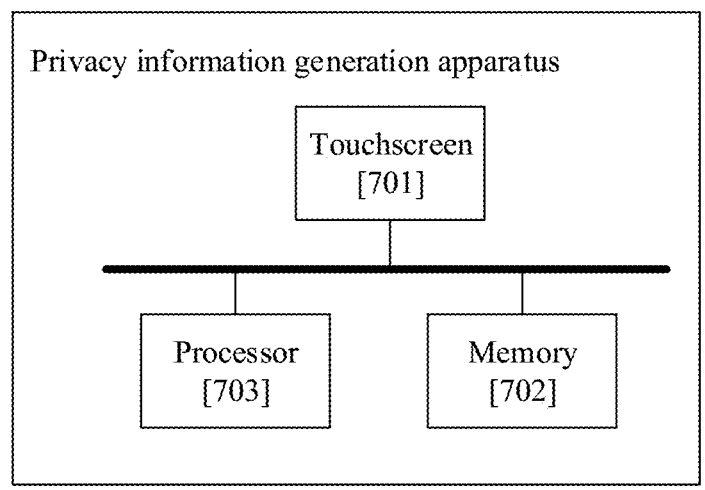
FIG. 47 is a schematic diagram of a privacy information generation apparatus according to an embodiment of this disclosure.

FIG. 47 is a schematic diagram of a structure of a privacy information generation apparatus according to an embodiment of this disclosure. In an embodiment, a terminal device may implement corresponding functions by using the hardware apparatus shown in FIG. 47. As shown in FIG. 47, the privacy information generation apparatus may include a touchscreen 701, a memory 702, and a processor 703.

In an embodiment, the touchscreen 701 may include a display and a touch sensor, where the display is configured to display an image, and the touch sensor may transfer a detected touch operation to an application processor, to determine a type of a touch event. The display provides a visual output related to the touch operation. The processor 703 may include one or more processing units. For example, the processor 703 may include an application processor, a modem processor, a graphics processor, an image signal processor, a controller, a video codec, a digital signal processor, a baseband processor, and/or a neural network processor. Different processing units may be independent components, or may be integrated into one or more processors. The memory 702 is coupled to the processor 703, and is configured to store various software programs and/or a plurality of sets of instructions. The memory 702 may include a volatile memory and/or a non-volatile memory.

When the software program and/or the plurality of sets of instructions in the memory 702 are executed by the processor 703, the terminal device is enabled to implement the following method steps: responding to a first gesture operation performed by a user on a privacy settings page of a target application, and determining a privacy precision for the target application, where the privacy settings page includes an interactive element for setting the privacy precision, and the first gesture operation includes at least one gesture operation performed by the user on the interactive element; and generating privacy information based on the privacy precision for the target application when the target application requests the privacy information. According to the foregoing technical solution, the terminal device adds an interactive element for adjusting a privacy precision for an application in a privacy settings page of the application, so that the user can set, according to their own will, a precision for privacy information provided by the terminal device for the application. In this way, a specific precision of privacy information that can be obtained by the application is under the control of the user, thereby preventing the application from excessively obtaining privacy information against the will of the user or without the knowledge of the user, and reducing a risk of disclosure of privacy information of the user.

In an embodiment, the interactive element includes a slider assembly; the slider assembly includes a slider and a knob provided on the slider; and the slider corresponds to a preset privacy precision interval, one end of the slider corresponds to the lowest privacy precision, and the other end corresponds to the highest privacy precision; and when the software program and/or the plurality of sets of instructions are executed by the processor 703, the terminal device is enabled to specifically implement the following method steps: moving the knob to a first target position in response to an operation of dragging the knob by the user; and determining a privacy precision corresponding to the first target position as the privacy precision for the target application. In this way, the terminal device allows the user to freely set the privacy precision for the application by operating the slider assembly, and the operation is simple, intuitive, and convenient.

In an embodiment, the slider includes a plurality of stops, the plurality of stops are distributed at intervals on the slider, and each stop corresponds to one preset privacy precision; and when the software program and/or the plurality of sets of instructions are executed by the processor 703, the terminal device is enabled to specifically implement the following method steps: moving the knob to a first target stop in response to the operation of dragging the knob by the user; and determining the preset privacy precision corresponding to the first target stop as the privacy precision for the target application.

In an embodiment, the interactive element includes a first circular color block with a variable radius, and the radius of the first circular color block corresponds to the privacy precision, where a larger radius of the first circular color block corresponds to a lower privacy precision, or a larger radius of the first circular color block corresponds to a higher privacy precision; and when the software program and/or the plurality of sets of instructions are executed by the processor 703, the terminal device is enabled to specifically implement the following method steps: adjusting the first circular color block to a first target radius in response to a two-finger zoom operation performed by the user on the first circular color block; and determining a privacy precision corresponding to the first target radius as the privacy precision for the target application. In this way, the terminal device allows the user to set the privacy precision for the application by operating the first circular color block, and the privacy precision can be intuitively presented to the user in the form of the radius of the first circular color block, which helps improve user experience.

In an embodiment, the interactive element includes a second circular color block with a fixed radius, the second circular color block includes a central circular region and at least one annular region concentric with the central circular region in a radius direction, and each region corresponds to one preset privacy precision; and when the software program and/or the plurality of sets of instructions are executed by the processor 703, the terminal device is enabled to specifically implement the following method steps: lightening or darkening at least one region in the second circular color block in response to a two-finger zoom operation performed by the user on the second circular color block; and using the preset privacy precision corresponding to the outermost lightened region in the second circular color block as the privacy precision for the target application.

In an embodiment, when the software program and/or the plurality of sets of instructions are executed by the processor 703, the terminal device is enabled to specifically implement the following method step: when it is detected that the user performs a two-finger zoom-in operation on a lightened region of the second circular color block, sequentially lightening, from the inside to the outside, regions passed by the user's fingers.

In an embodiment, when the software program and/or the plurality of sets of instructions are executed by the processor 703, the terminal device is enabled to specifically implement the following method step: when it is detected that the user performs a two-finger zoom-out operation on a lightened region of the second circular color block, sequentially darkening, from the outside to the inside, regions outside a region passed by the user's fingers.

In an embodiment, the interactive element includes a slider assembly and a first circular color block with a variable radius; the slider assembly includes a slider and a knob provided on the slider; different positions of the slider correspond to different radii of the first circular color block, one end of the slider corresponds to the smallest radius of the first circular color block, and the other end corresponds to the largest radius of the first circular color block; the radius of the first circular color block corresponds to the privacy precision, where a larger radius of the first circular color block corresponds to a lower privacy precision, or a larger radius of the first circular color block corresponds to a higher privacy precision; and when the software program and/or the plurality of sets of instructions are executed by the processor 703, the terminal device is enabled to specifically implement the following method steps: adjusting the first circular color block to a second target radius in response to an operation of dragging the knob by the user; and determining a privacy precision corresponding to the second target radius as the privacy precision for the target application. In this way, the terminal device allows the user to set the privacy precision for the application to any privacy precision by operating the slider assembly, and the privacy precision can be intuitively presented to the user in the form of a size of the lightened region of the first circular color block, which helps improve user experience.

In an embodiment, the privacy information includes location information, the privacy settings page includes a location information settings page, and the privacy precision includes a location information precision; and the location information settings page further includes a map window, the map window includes a map of a region around an actual location of the terminal device, and the map includes a marker used to indicate the actual location. In this way, the terminal device adds an interactive element for adjusting a location information precision for an application in a location information settings page of the application, so that the user can set, according to their own will, a precision for location information provided by the terminal device for the application. A specific precision of location information that can be obtained by the application is under the control of the user, thereby preventing the application from excessively obtaining location information against the will of the user or without the knowledge of the user, and reducing a risk of disclosure of location information of the user.

In an embodiment, the location information precision is a distance precision, and the distance precision represents a maximum error distance between location information generated by the terminal device and the actual location. In this way, the terminal device can adjust, based on a location precision set by the user, a maximum error distance between location information generated by the terminal device and the actual location of the terminal device. If the location information precision is relatively low, the terminal device may generate and provide location information with a relatively large error distance for an application, which makes it difficult for the application to obtain the actual location of the terminal device, thereby reducing a risk of disclosure of location information of the user.

In an embodiment, the map window further includes a first shaded region with the actual location as a center and with the distance precision for the target application as a radius, and the first shaded region indicates an error range of the location information generated by the terminal device relative to the actual location. In this way, an error range of the location information relative to the actual location can be intuitively presented to the user in the form of the first shaded region, so that the user intuitively understands the location information precision currently set for the application.

In an embodiment, the location information precision is a geographic range precision; and the map window further includes a second shaded region corresponding to the geographic precision, the second shaded region has a fixed pixel size, and the second shaded region indicates a geographic range for the location information generated by the terminal device; and when the software program and/or the plurality of sets of instructions are executed by the processor 703, the terminal device is enabled to specifically implement the following method step: adjusting a scale of the map in response to a two-finger zoom operation performed by the user in the map window. In this way, when the scale of the map becomes larger, a geographic range covered by the second shaded region on the map becomes smaller, which means that the terminal device may generate location information in a smaller geographic range, indicating that the location information precision is increased; when the scale of the map becomes smaller, a geographic range covered by the second shaded region on the map becomes larger, which means that the terminal device may generate location information in a larger geographic range, indicating that the location information precision is reduced.

In an embodiment, when the software program and/or the plurality of sets of instructions are executed by the processor 703, the terminal device is enabled to specifically implement the following method step: increasing the scale of the map in response to a two-finger zoom-in operation performed by the user in the map window.

In an embodiment, when the software program and/or the plurality of sets of instructions are executed by the processor 703, the terminal device is enabled to specifically implement the following method step: reducing the scale of the map in response to a two-finger zoom-out operation performed by the user in the map window.

In an embodiment, when the software program and/or the plurality of sets of instructions are executed by the processor 703, the terminal device is enabled to specifically implement the following method step: panning the map in a dragging direction of the user's finger in response to a one-finger drag operation by the user in the map window. In this way, the terminal device can adjust a geographic range covered by the second shaded region without changing the scale of the map. When the geographic range covered by the second shaded region is away from the actual location of the terminal device, it indicates that the location information precision is reduced. When the geographic range covered by the second shaded region is close to the actual location of the terminal device, it indicates that the location information precision is increased.

In an embodiment, when the software program and/or the plurality of sets of instructions are executed by the processor 703, the terminal device is enabled to specifically implement the following method step: using, in response to a one-finger or multi-finger smudge operation by the user in the map window, a preset pattern to cover a region that is smudged by the user's finger.

In an embodiment, when the software program and/or the plurality of sets of instructions are executed by the processor 703, the terminal device is further enabled to implement the following method step: when the target application requests the location information, determining and selecting geographic coordinates or a coordinate range from the region that is smudged by the user's finger as the location information provided for the target application. In this way, if it is expected that an application can obtain location information of a specific region, the user may smudge the corresponding region on the map, such that the location information obtained by the application is not related to the actual location of the terminal device, which helps protect user privacy.

In an embodiment, when the software program and/or the plurality of sets of instructions are executed by the processor 703, the terminal device is further enabled to implement the following method step: when the target application requests the location information, determining and selecting geographic coordinates or a coordinate range from a region that is not smudged by the user's finger as the location information provided for the target application. In this way, if it is not expected that the application can obtain location information of a specific region, such as a home address, the user may smudge the corresponding region on the map, such that the application cannot obtain sensitive address information of the user, which helps protect user privacy.

In an embodiment, the map window is displayed in full screen on a display of the terminal device.

In an embodiment, when the software program and/or the plurality of sets of instructions are executed by the processor 703, the terminal device is enabled to specifically implement the following method steps: generating a blurring parameter Z based on the location information precision, where the blurring parameter is a distance value; adding the blurring parameter Z to each of an X-axis coordinate and a Y-axis coordinate of two-dimensional planar coordinates (X, Y) corresponding to the actual location, to obtain two-dimensional planar coordinates (X+Z, Y+Z); and using the two-dimensional planar coordinates (X+Z, Y+Z) as the location information provided for the target application. In this way, the terminal device blurs an actual location by using the blurring parameter, which can prevent an application from obtaining actual location information, so as to protect user privacy.

In an embodiment, when the software program and/or the plurality of sets of instructions are executed by the processor 703, the terminal device is enabled to specifically implement the following method steps: determining a radius R based on the location information precision for the target application; establishing a two-dimensional planar coordinate system by using a center point of a display as a coordinate origin; selecting any coordinate point as a center from a region of which a coordinate range is within (±NR, ±NR) in the two-dimensional planar coordinate system, to determine a circular region with the radius R, where N is a real number greater than or equal to 1; determining whether the actual location is within the circular region; and if the actual location is within the circular region, using a coordinate range of the circular region as the location information provided for the target application; or if the actual location is outside the circular region, reselecting the circular region. In this way, the terminal device randomly generates location information based on a location information precision, which can prevent an application from reversely calculating the actual location of the terminal device, and more reliably protect user privacy.

Figure 48:
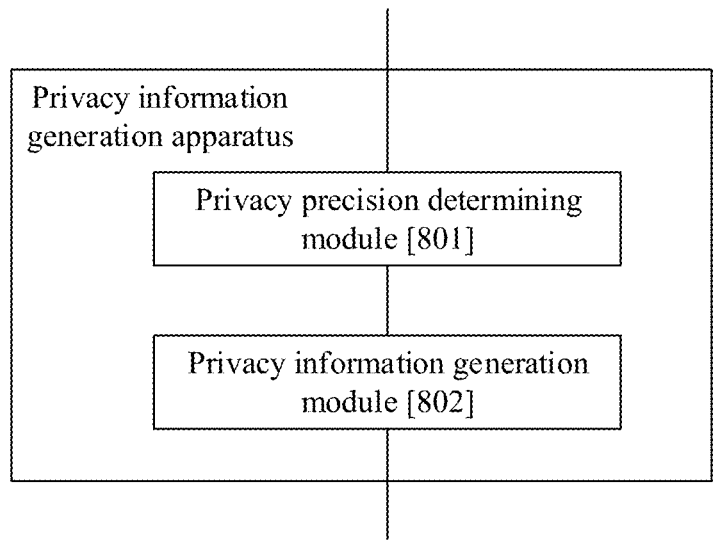
FIG. 48 is a schematic diagram of another privacy information generation apparatus according to an embodiment of this disclosure.

FIG. 48 is a schematic diagram of a structure of another privacy information generation apparatus according to an embodiment of this disclosure. In an embodiment, a terminal device may implement corresponding functions by using the software apparatus shown in FIG. 48. As shown in FIG. 48, the privacy information generation apparatus may include: a privacy precision setting module 801 and a privacy information generation module 802.

The privacy precision setting module 801 is configured to respond to a first gesture operation performed by a user on a privacy settings page of a target application, and determine a privacy precision for the target application, where the privacy settings page includes an interactive element for setting the privacy precision, and the first gesture operation includes at least one gesture operation performed by the user on the interactive element; and the privacy information generation module 802 is configured to generate privacy information based on the privacy precision for the target application when the target application requests the privacy information from the terminal device. According to the foregoing technical solution, the terminal device adds an interactive element for adjusting a privacy precision for an application in a privacy settings page of the application, so that the user can set, according to their own will, a precision for privacy information provided by the terminal device for the application. In this way, a specific precision of privacy information that can be obtained by the application is under the control of the user, thereby preventing the application from excessively obtaining privacy information against the will of the user or without the knowledge of the user, and reducing a risk of disclosure of privacy information of the user.

In an embodiment, the interactive element includes a slider assembly; the slider assembly includes a slider and a knob provided on the slider; and the slider corresponds to a preset privacy precision interval, one end of the slider corresponds to the lowest privacy precision, and the other end corresponds to the highest privacy precision; and the privacy precision setting module 801 is specifically configured to move the knob to a first target position in response to an operation of dragging the knob by the user, and determine a privacy precision corresponding to the first target position as the privacy precision for the target application. In this way, the terminal device allows the user to freely set the privacy precision for the application by operating the slider assembly, and the operation is simple, intuitive, and convenient.

In an embodiment, the slider includes a plurality of stops, the plurality of stops are distributed at intervals on the slider, and each stop corresponds to one preset privacy precision; and the privacy precision setting module 801 is specifically configured to move the knob to a first target stop in response to the operation of dragging the knob by the user, and determine the privacy precision corresponding to the first target stop as the privacy precision for the target application. In this way, the terminal device allows the user to set the privacy precision for the application to any preset privacy precision by operating the slider assembly, and the operation is simple, intuitive, and convenient, and helps reduce learning costs of the user's operation.

In an embodiment, the interactive element includes a first circular color block with a variable radius, and the radius of the first circular color block corresponds to the privacy precision, where a larger radius of the first circular color block corresponds to a lower privacy precision, or a larger radius of the first circular color block corresponds to a higher privacy precision; and the privacy precision setting module 801 is specifically configured to adjust the first circular color block to a first target radius in response to a two-finger zoom operation performed by the user on the first circular color block, and determine a privacy precision corresponding to the first target radius as the privacy precision for the target application. In this way, the terminal device allows the user to set the privacy precision for the application by operating the first circular color block, and the privacy precision can be intuitively presented to the user in the form of the radius of the first circular color block, which helps improve user experience.

In an embodiment, the interactive element includes a second circular color block with a fixed radius, the second circular color block includes a central circular region and at least one annular region concentric with the central circular region in a radius direction, and each region corresponds to one preset privacy precision; and the privacy precision setting module 801 is specifically configured to lighten or darken at least one region in the second circular color block in response to a two-finger zoom operation performed by the user on the second circular color block, and use the preset privacy precision corresponding to the outermost lightened region in the second circular color block as the privacy precision for the target application. In this way, the terminal device allows the user to set the privacy precision for the application to any preset privacy precision by operating the second circular color block, and the privacy precision can be intuitively presented to the user in the form of a size of the lightened region of the second circular color block, which helps improve user experience.

In an embodiment, the privacy precision setting module 801 is specifically configured to: when it is detected that the user performs a two-finger zoom-in operation on a lightened region of the second circular color block, sequentially lighten, from the inside to the outside, regions passed by the user's fingers.

In an embodiment, the privacy precision setting module 801 is specifically configured to: when it is detected that the user performs a two-finger zoom-out operation on a lightened region of the second circular color block, sequentially darken, from the outside to the inside, regions outside a region passed by the user's fingers.

In an embodiment, the interactive element includes a slider assembly and a first circular color block with a variable radius; the slider assembly includes a slider and a knob provided on the slider; different positions of the slider correspond to different radii of the first circular color block, one end of the slider corresponds to the smallest radius of the first circular color block, and the other end corresponds to the largest radius of the first circular color block; the radius of the first circular color block corresponds to the privacy precision, where a larger radius of the first circular color block corresponds to a lower privacy precision, or a larger radius of the first circular color block corresponds to a higher privacy precision; and the privacy precision setting module 801 is specifically configured to adjust the first circular color block to a second target radius in response to the operation of dragging the knob by the user, and determine a privacy precision corresponding to the second target radius as the privacy precision for the target application. In this way, the terminal device allows the user to set the privacy precision for the application to any privacy precision by operating the slider assembly, and the privacy precision can be intuitively presented to the user in the form of a size of the lightened region of the first circular color block, which helps improve user experience.

In an embodiment, the privacy information includes location information, the privacy settings page includes a location information settings page, and the privacy precision includes a location information precision; and the location information settings page further includes a map window, the map window includes a map of a region around an actual location of the terminal device, and the map includes a marker used to indicate the actual location. In this way, the terminal device adds an interactive element for adjusting a location information precision for an application in a location information settings page of the application, so that the user can set, according to their own will, a precision for location information provided by the terminal device for the application. A specific precision of location information that can be obtained by the application is under the control of the user, thereby preventing the application from excessively obtaining location information against the will of the user or without the knowledge of the user, and reducing a risk of disclosure of location information of the user.

In an embodiment, the location information precision is a distance precision, and the distance precision represents a maximum error distance between location information generated by the terminal device and the actual location. In this way, the terminal device can adjust, based on a location precision set by the user, a maximum error distance between location information generated by the terminal device and the actual location of the terminal device. If the location information precision is relatively low, the terminal device may generate and provide location information with a relatively large error distance for an application, which makes it difficult for the application to obtain the actual location of the terminal device, thereby reducing a risk of disclosure of location information of the user.

In an embodiment, the map window further includes a first shaded region with the actual location as a center and with the distance precision for the target application as a radius, and the first shaded region indicates an error range of the location information generated by the terminal device relative to the actual location. In this way, an error range of the location information relative to the actual location can be intuitively presented to the user in the form of the first shaded region, so that the user intuitively understands the location information precision currently set for the application.

In an embodiment, the location information precision is a geographic range precision; and the map window further includes a second shaded region corresponding to the geographic precision, the second shaded region has a fixed pixel size, and the second shaded region indicates a geographic range for the location information generated by the terminal device; and the privacy precision setting module 801 is specifically configured to adjust a scale of the map in response to a two-finger zoom operation performed by the user in the map window. In this way, when the scale of the map becomes larger, a geographic range covered by the second shaded region on the map becomes smaller, which means that the terminal device may generate location information in a smaller geographic range, indicating that the location information precision is increased; when the scale of the map becomes smaller, a geographic range covered by the second shaded region on the map becomes larger, which means that the terminal device may generate location information in a larger geographic range, indicating that the location information precision is reduced.

In an embodiment, the privacy precision setting module 801 is specifically configured to increase the scale of the map in response to a two-finger zoom-in operation performed by the user in the map window.

In an embodiment, the privacy precision setting module 801 is specifically configured to reduce the scale of the map in response to a two-finger zoom-out operation performed by the user in the map window.

In an embodiment, the privacy precision setting module 801 is specifically configured to pan the map in a dragging direction of the user's finger in response to a one-finger drag operation by the user in the map window. In this way, the terminal device can adjust a geographic range covered by the second shaded region without changing the scale of the map. When the geographic range covered by the second shaded region is away from the actual location of the terminal device, it indicates that the location information precision is reduced. When the geographic range covered by the second shaded region is close to the actual location of the terminal device, it indicates that the location information precision is increased.

In an embodiment, the privacy precision setting module 801 is specifically configured to use, in response to a one-finger or multi-finger smudge operation by the user in the map window, a preset pattern to cover a region that is smudged by the user's finger.

In an embodiment, the privacy precision setting module 801 is specifically configured to: when the target application requests the location information, determine and select geographic coordinates or a coordinate range from the region that is smudged by the user's finger as the location information provided for the target application. In this way, if it is expected that an application can obtain location information of a specific region, the user may smudge the corresponding region on the map, such that the location information obtained by the application is not related to the actual location of the terminal device, which helps protect user privacy.

In an embodiment, the privacy precision setting module 801, when the target application requests the location information, determines and selects geographic coordinates or a coordinate range from the region that is smudged by the user's finger as the location information provided for the target application. In this way, if it is not expected that the application can obtain location information of a specific region, such as a home address, the user may smudge the corresponding region on the map, such that the application cannot obtain sensitive address information of the user, which helps protect user privacy.

In an embodiment, the map window is displayed in full screen on a display of the terminal device.

In an embodiment, the privacy precision setting module 801 is specifically configured to: generate a blurring parameter Z based on the location information precision, where the blurring parameter is a distance value, and add the blurring parameter Z to each of an X-axis coordinate and a Y-axis coordinate of two-dimensional planar coordinates (X, Y) corresponding to the actual location, to obtain two-dimensional planar coordinates (X+Z, Y+Z); and use the two-dimensional planar coordinates (X+Z, Y+Z) as the location information provided for the target application. In this way, the terminal device blurs an actual location by using the blurring parameter, which can prevent an application from obtaining actual location information, so as to protect user privacy.

In an embodiment, the privacy precision setting module 801 is specifically configured to: determine a radius R based on the location information precision for the target application; establish a two-dimensional planar coordinate system by using a center point of a display as a coordinate origin; select any coordinate point as a center from a region of which a coordinate range is within (±NR, ±NR) in the two-dimensional planar coordinate system, to determine a circular region with the radius R, where N is a real number greater than or equal to 1; determine whether the actual location is within the circular region; and if the actual location is within the circular region, use a coordinate range of the circular region as the location information provided for the target application; or if the actual location is outside the circular region, reselect the circular region. In this way, the terminal device randomly generates location information based on a location information precision, which can prevent an application from reversely calculating the actual location of the terminal device, and more reliably protect user privacy.

An embodiment of this disclosure further provides a computer-readable storage medium. The computer-readable storage medium stores instructions. When the instructions are run on a computer, the computer is enabled to perform the method according to the foregoing aspects.

An embodiment of this disclosure further provides a computer program product including instructions. When the computer program product runs on a computer, the computer is enabled to perform the method according to the foregoing aspects.

Figure 49:
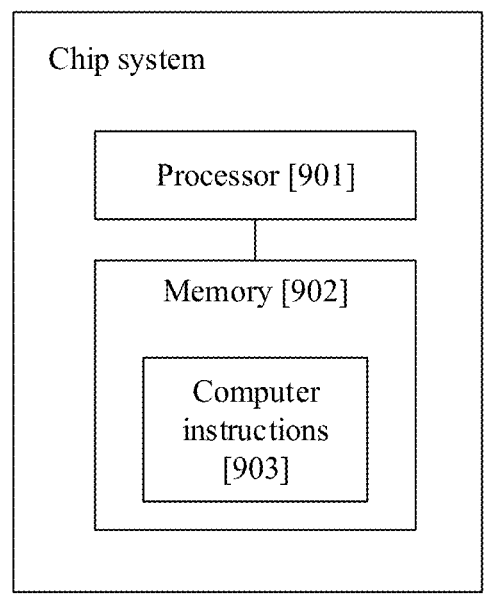
FIG. 49 is a schematic diagram of a chip system according to an embodiment of this disclosure.

An embodiment of this disclosure further provides a chip system. FIG. 49 is a schematic diagram of a structure of the chip system. The chip system includes a processor 901, configured to support the foregoing apparatus in implementing the functions in the foregoing aspects, for example, generating or processing information in the foregoing methods. In a possible design, the chip system further includes a memory 902, configured to store computer instructions 903 and data necessary for the privacy information generation apparatus. The chip system may include a chip, or may include the chip and another discrete device.

In the foregoing specific implementations, the objectives, the technical solutions, and the beneficial effects of embodiments of this disclosure are further described in detail. It should be understood that the foregoing descriptions are merely specific implementations of embodiments of this disclosure, but are not intended to limit the protection scope of embodiments of this disclosure. Any modification, equivalent replacement, or improvement made based on the technical solutions of embodiments of this disclosure shall fall within the protection scope of embodiments of this disclosure.

What is claimed is:

1. A privacy information generation method performed by a terminal device, comprising:
displaying an interactive element of a privacy setting page for a target application;
responding to a first gesture operation performed by a user on the interactive element of the privacy settings page;
determining a privacy precision for the target application according to the first gesture operation; and
generating privacy information based on the privacy precision for the target application when the target application requests the privacy information from the terminal device,
wherein the interactive element comprises a first circular color block with a variable radius, with different values of the radius of the first circular color block corresponding to different preset private precisions,
wherein the step of responding to the first gesture operation comprises:
adjusting the first circular color block to a target radius in response to a two-finger zoom operation performed by the user on the first circular color block, and
wherein the step of determining the privacy precision for the target application comprises:
setting a preset privacy precision corresponding to the target radius as the privacy precision for the target application.

2. The method according to claim 1, wherein the privacy information comprises location information, the privacy settings page comprises a location information settings page, and the privacy precision comprises a location information precision, the location information settings page comprises a map window showing a map of a region around an actual location of the terminal device, and the map comprises a marker indicating the actual location.

3. The method according to claim 2, wherein the location information precision is a distance precision representing a maximum error distance between location information generated by the terminal device and the actual location.

4. The method according to claim 3, wherein the map window comprises a shaded region with the actual location as a center and with the distance precision for the target application as a radius, and the shaded region indicates an error range of the location information generated by the terminal device relative to the actual location.

5. The method according to claim 2, wherein the location information precision is a geographic range precision, and the map window comprises a shaded region corresponding to the geographic range precision, the shaded region has a fixed pixel size and indicates a geographic range for the location information generated by the terminal device, wherein the step of responding to the first gesture operation comprises:
adjusting a scale of the map in response to a two-finger zoom operation performed by the user in the map window.

6. The method according to claim 5, wherein the step of adjusting the scale of the map increases the scale of the map in response to a two-finger zoom-in operation performed by the user in the map window.

7. The method according to claim 5, wherein the step of adjusting the scale of the map reduces the scale of the map in response to a two-finger zoom-out operation performed by the user in the map window.

8. The method according to claim 5, wherein the step of responding to the first gesture operation comprises: panning the map in a dragging direction of a one-finger drag operation by the user in the map window.

9. The method according to claim 2, comprising: displaying the map window in full screen on a display of the terminal device.

10. A privacy information generation method performed by a terminal device, comprising:
displaying an interactive element of a privacy setting page for a target application;
responding to a first gesture operation performed by a user on the interactive element of the privacy settings page;
determining a privacy precision for the target application according to the first gesture operation; and
generating privacy information based on the privacy precision for the target application when the target application requests the privacy information from the terminal device,
wherein the interactive element comprises a second circular color block with a fixed radius, the second circular color block comprises multiple regions including a central circular region and a plurality of annular regions concentric with the central circular region in a radius direction, and each region of the multiple regions corresponds to one preset privacy precision,
wherein the step of responding to the first gesture operation comprises:
lightening or darkening one or more regions in the second circular color block in response to a two-finger zoom operation performed by the user on the second circular color block, and
wherein the step of determining the privacy precision for the target application comprises:
setting a preset privacy precision corresponding to an outermost lightened region in the second circular color block as the privacy precision for the target application.

11. The method according to claim 10, wherein the step of lightening or darkening one or more regions in the second circular color block in response to the two-finger zoom operation comprises:
detecting that the user performs a two-finger zoom-in operation on a touched region of the second circular color block; and
sequentially lightening, from inside to outside, regions passed by the user's fingers.

12. The method according to claim 10, wherein the step of lightening or darkening one or more regions in the second circular color block in response to the two-finger zoom operation comprises:
detecting that the user performs a two-finger zoom-out operation on a touched region of the second circular color block;
sequentially darkening, from outside to inside, regions outside a region passed by the user's fingers.

13. A privacy information generation method performed by a terminal device, comprising:
displaying an interactive element of a privacy setting page for a target application;
responding to a first gesture operation performed by a user on the interactive element of the privacy settings page;
determining a privacy precision for the target application according to the first gesture operation; and
generating privacy information based on the privacy precision for the target application when the target application requests the privacy information from the terminal device,
wherein the interactive element comprises a slider assembly and a first circular color block with a variable radius, the slider assembly comprises a slider and a knob provided on the slider, different positions of the slider correspond to different values of the radius of the first circular color block, a first end of the slider corresponds to a smallest radius of the first circular color block, and a second end corresponds to a largest radius of the first circular color block, the radius of the first circular color block corresponds to a preset privacy precision, with a larger radius value of the first circular color block corresponding to a lower preset privacy precision, or corresponding to a higher preset privacy precision,
wherein the step of responding to the first gesture operation comprises:
adjusting the first circular color block to a target radius in response to an operation of dragging the knob by the user, and
wherein the step of determining the privacy precision for the target application comprises:
setting a preset privacy precision corresponding to the target radius as the privacy precision for the target application.

14. The method according to claim 13, wherein the step of responding to the first gesture operation comprises: setting, in response to a one-finger or multi-finger smudge operation by the user in the map window, a preset pattern to cover a region smudged by the user's finger.

15. The method according to claim 14, further comprising:
receiving a request for the location information from the target application;
determining geographic coordinates or a coordinate range from the region smudged by the user's finger as the location information provided for the target application.

16. A terminal device comprising:
a display:
a memory storing executable instructions; and
a processor configured to execute the executable instructions to perform operations of:
displaying on the display an interactive element of a privacy settings page for a target application;
responding to a first gesture operation performed by a user on the interactive element of the privacy settings page for the target application;
determining a privacy precision for the target application according to the first gesture operation; and
generating privacy information based on the privacy precision for the target application when the target application requests the privacy information, wherein the interactive element comprises a first circular color block with a variable radius, with different values of the radius of the first circular color block corresponding to different preset private precisions, wherein the operation of responding to the first gesture operation comprises:

adjusting the first circular color block to a target radius in response to a two-finger zoom operation performed by the user on the first circular color block, and wherein the operation of determining the privacy precision for the target application comprises:

setting a preset privacy precision corresponding to the target radius as the privacy precision for the target application.

\* \* \* \* \*